(12) United States Patent
Zhang et al.

(10) Patent No.: US 8,765,278 B2
(45) Date of Patent: Jul. 1, 2014

(54) HIGH-ENERGY METAL AIR BATTERIES

(71) Applicant: Battelle Memorial Institute, Richland, WA (US)

(72) Inventors: Ji-Guang Zhang, Richland, WA (US); Jie Xiao, Richland, WA (US); Wu Xu, Richland, WA (US); Deyu Wang, Richland, WA (US); Ralph E. Williford, Richland, WA (US); Jun Liu, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 52 days.

(21) Appl. No.: 13/910,065

(22) Filed: Jun. 4, 2013

(65) Prior Publication Data

US 2013/0273443 A1  Oct. 17, 2013

Related U.S. Application Data

(62) Division of application No. 12/557,452, filed on Sep. 10, 2009, now Pat. No. 8,481,187.

(51) Int. Cl.
*H01M 2/02* (2006.01)
*H01M 12/06* (2006.01)
*H01M 12/00* (2006.01)
*H01M 12/04* (2006.01)
*H01M 12/08* (2006.01)

(52) U.S. Cl.
CPC .............. *H01M 12/00* (2013.01); *H01M 12/04* (2013.01); *H01M 12/06* (2013.01); *H01M 12/08* (2013.01)
USPC .............................. 429/86; 429/176; 429/403

(58) Field of Classification Search
CPC ..... H01M 12/00; H01M 12/04; H01M 12/06; H01M 12/08
USPC .......................................... 429/403, 405, 528
See application file for complete search history.

(56) References Cited

U.S. PATENT DOCUMENTS 2,437,422 A   3/1948  Dunham
3,607,417 A * 9/1971  McRae et al. ................. 429/405

(Continued)

FOREIGN PATENT DOCUMENTS

EP    0032291     7/1981
JP    63-105469   5/1988

(Continued)

OTHER PUBLICATIONS

Abraham et al., "A Polymer Electrolyte-Based Rechargeable Lithium/Oxygen Battery," *Journal of The Electrochemical Society*, vol. 143, No. 1, 5 pages (Jan. 1996).

(Continued)

*Primary Examiner* — Barbara Gilliam
*Assistant Examiner* — Adam A Arciero
(74) *Attorney, Agent, or Firm* — Klarquist Sparkman, LLP

(57) ABSTRACT

Disclosed herein are embodiments of lithium/air batteries and methods of making and using the same. Certain embodiments are pouch-cell batteries encased within an oxygen-permeable membrane packaging material that is less than 2% of the total battery weight. Some embodiments include a hybrid air electrode comprising carbon and an ion insertion material, wherein the mass ratio of ion insertion material to carbon is 0.2 to 0.8. The air electrode may include hydrophobic, porous fibers. In particular embodiments, the air electrode is soaked with an electrolyte comprising one or more solvents including dimethyl ether, and the dimethyl ether subsequently is evacuated from the soaked electrode. In other embodiments, the electrolyte comprises 10-20% crown ether by weight.

12 Claims, 27 Drawing Sheets

(56) References Cited

U.S. PATENT DOCUMENTS

| | | | |
|---|---|---|---|
| 4,132,837 A | 1/1979 | Soffer | |
| 4,433,035 A * | 2/1984 | Wiacek | 429/405 X |
| 4,525,704 A | 6/1985 | Campbell et al. | |
| 4,659,379 A | 4/1987 | Singh et al. | |
| 4,781,889 A | 11/1988 | Fukasawa et al. | |
| 4,799,936 A | 1/1989 | Riley | |
| 4,895,774 A | 1/1990 | Ohzu et al. | |
| 5,004,715 A | 4/1991 | Hakotani et al. | |
| 5,019,263 A | 5/1991 | Haag et al. | |
| 5,110,694 A | 5/1992 | Nagasubramanian et al. | |
| 5,130,211 A | 7/1992 | Wilkinson et al. | |
| 5,206,095 A | 4/1993 | Donado et al. | |
| 5,296,318 A | 3/1994 | Gozdz et al. | |
| 5,342,704 A | 8/1994 | Vasilow et al. | |
| 5,456,000 A | 10/1995 | Gozdz et al. | |
| 5,510,209 A | 4/1996 | Abraham et al. | |
| 5,567,401 A | 10/1996 | Doddapaneni et al. | |
| 5,698,339 A | 12/1997 | Kawakami et al. | |
| 5,716,527 A | 2/1998 | Decman et al. | |
| 5,985,475 A | 11/1999 | Reynolds et al. | |
| 6,326,326 B1 | 12/2001 | Feng et al. | |
| 6,368,751 B1 | 4/2002 | Yao et al. | |
| 6,410,160 B1 | 6/2002 | Landin et al. | |
| 6,464,742 B1 | 10/2002 | Leung et al. | |
| 6,689,513 B1 | 2/2004 | Morigaki et al. | |
| 6,846,554 B2 | 1/2005 | Fryxell et al. | |
| 6,929,705 B2 | 8/2005 | Myers et al. | |
| 6,946,015 B2 | 9/2005 | Jorgensen et al. | |
| 7,014,948 B2 | 3/2006 | Lee et al. | |
| 7,396,797 B2 | 7/2008 | Tsutsumi et al. | |
| 7,399,322 B2 | 7/2008 | Yu | |
| 7,740,965 B2 | 6/2010 | Richards et al. | |
| 8,012,633 B2 * | 9/2011 | Gordon et al. | 429/405 |
| 8,119,295 B2 * | 2/2012 | Drews et al. | 429/405 |
| 8,481,187 B2 | 7/2013 | Zhang et al. | |
| 2001/0006158 A1 | 7/2001 | Ho et al. | |
| 2002/0050054 A1 | 5/2002 | Noh | |
| 2002/0132158 A1 | 9/2002 | Sassen | |
| 2004/0131934 A1 | 7/2004 | Sugnaux et al. | |
| 2004/0149127 A1 | 8/2004 | Lyons et al. | |
| 2004/0247970 A1 | 12/2004 | Irvine et al. | |
| 2004/0247996 A1 | 12/2004 | Smith et al. | |
| 2005/0003957 A1 | 1/2005 | Vaughn et al. | |
| 2005/0153178 A1 | 7/2005 | Ahmed et al. | |
| 2005/0208353 A1 | 9/2005 | Johnson | |
| 2006/0286456 A1 | 12/2006 | Fu et al. | |
| 2007/0122716 A1 | 5/2007 | Seo et al. | |
| 2007/0141473 A1 | 6/2007 | Yang et al. | |
| 2007/0160898 A1 | 7/2007 | Takamura et al. | |
| 2007/0212583 A1 | 9/2007 | Johnson | |
| 2007/0296103 A1 | 12/2007 | Hayes et al. | |
| 2008/0038641 A1 | 2/2008 | Visco et al. | |
| 2008/0070087 A1 | 3/2008 | Johnson | |
| 2008/0102358 A1 | 5/2008 | Kowalczyk et al. | |
| 2008/0115667 A1 | 5/2008 | Lee et al. | |
| 2008/0210087 A1 | 9/2008 | Ku et al. | |
| 2008/0268327 A1 | 10/2008 | Gordon et al. | |
| 2009/0053594 A1 | 2/2009 | Johnson et al. | |
| 2009/0053607 A1 | 2/2009 | Jeong et al. | |
| 2009/0061288 A1 | 3/2009 | Gordon et al. | |
| 2009/0114594 A1 | 5/2009 | Sirkar | |
| 2009/0136812 A1 | 5/2009 | Yonesato et al. | |
| 2009/0155678 A1 | 6/2009 | Less et al. | |
| 2010/0190043 A1 | 7/2010 | Nakanishi | |
| 2010/0297531 A1 | 11/2010 | Liu et al. | |
| 2011/0052466 A1 | 3/2011 | Liu | |
| 2011/0059355 A1 | 3/2011 | Zhang et al. | |
| 2011/0059364 A1 | 3/2011 | Zhang et al. | |
| 2011/0114254 A1 | 5/2011 | Xu et al. | |
| 2012/0180945 A1 | 7/2012 | Zhang et al. | |

FOREIGN PATENT DOCUMENTS

| | | |
|---|---|---|
| JP | 2001-120940 | 5/2001 |
| JP | 2008-036463 | 2/2008 |
| KR | 10-2007-0069306 | 7/2007 |
| WO | WO00/53297 | 9/2000 |
| WO | WO2006/049940 | 5/2006 |
| WO | WO2006/050531 | 5/2006 |
| WO | WO2009/005745 | 1/2009 |
| WO | WO2009/013629 | 1/2009 |

OTHER PUBLICATIONS

Bao, L. et al., "Facilitated transport of CO2 across a liquid membrane: Comparing enzyme, amine, and alkaline," *Journal of Membrane Science*, vol. 280, pp. 330-334 (Mar. 2, 2006).

Bara, J. et al., "Guide to CO2 Separations in lmidazolium-Based Room-Temperature Ionic Liquids," *Ind. Eng. Chem. Res.*, vol. 48, No. 6, pp. 2739-2751 (Feb. 11, 2009).

Barras, "Breathing batteries could store 10 times the energy," *NewScientist*, 2 pages (May 19, 2009).

Camper, D. et al., "Bulk-fluid solubility and membrane feasibility of Rmim-based room-temperature ionic liquids," *Ind. Eng. Che. Res.*, vol. 45, pp. 6279-6283 (Aug. 8, 2006).

Chen, H. et al., "Immobilized glycerol-based liquid membranes in hollow fibers for selective $CO_2$ separation from $CO_2$-$N_2$ mixtures," *Journal of Membrane Science*, vol. 183, No. 1, pp. 75-88 (Feb. 28, 2001).

Deng, L. et al., "Facilitated transport of $CO_2$ in novel PVAm/PVA blend membrane," *J. Mem. Sci.*, vol. 340, pp. 154-163 (May 23, 2009).

Dobley et al., "Non-aqueous Lithium-Air Batteries with an Advanced Cathode Structure," 4 pages (publication believed to be Dec. 7, 2004).

Dobley et al., "Lithium-Air Cells and Systems," *Proceedings of the 43rd Power Sources Conference*, pp. 23-25, Philadelphia, PA, (Jul. 7-10, 2008).

Dong, J. et al., "Multicomponent Hydrogen/Hydrocarbon Separation by MFI-Type Zeolite Membranes," *AIChE Journal*, vol. 46, No. 10, pp. 1957-1966 (Oct. 2000).

El-Azzami, L.A. et al., "Parametric Study of $CO_2$ Fixed Carrier Facilitated Transport through Swollen Chitosan Membranes," *Ind.& Eng. Chem. Res.*, vol. 48, No. 2, pp. 894-902 (Jan. 21, 2009).

Fan et al., "Microspherical Cu6Sn5 Alloy Anode for Lithium-Ion Battery," *Electrochemical and Solid-State Letters*, vol. 11, pp. A195-A197 (2008).

Fan et al., "Sn-Co alloy anode using porous Cu as current collector for lithium ion battery," *Journal of Alloys and Compounds*, vol. 476, pp. 70-73 (2009).

Favre, E., "Carbon dioxide recovery from post-combustion processes: Can gas permeation membranes compete with absorption," *Journal of Membrane Science*, vol. 294, Nos. 1-2), pp. 50-59 (Feb. 9, 2007).

Final Office action from U.S. Patent and Trademark Office for U.S. Appl. No. 12/557,455, mailed Nov. 8, 2012.

Final Office action from U.S. Patent and Trademark Office for U.S. Appl. No. 12/621,410, mailed Jul. 6, 2012.

Foster et al., "Chelating Agents as Electrolyte Additives for Lithium-Ion Batteries," Army Research Laboratory, 18 pages, Mar. 1999.

The Free Dictionary Definition of the word "embed." http://www.thefreedictionary.com/embedded (printed May 14, 2013).

Georgi, "Lithium-Air . . . the 'Ultimate' Battery," *Batteries Digest* web site, 8 pages (publication believed to be Jun. 2006).

Graff et al., "Mechanisms of vapor permeation through multilayer barrier films: Lag time versus equilibrium permeation," *Journal of Applied Physics*, vol. 96, No. 4, pp. 1840-1849 (Aug. 15, 2004).

Gu, X. et al., "Synthesis of Defects-Free FAU-Type Zeolite Membranes and Separation for Dry and Moist $CO_2$/$N_2$ Mixtures," *Ind. Eng. Chem. Res.*, vol. 44, No. 4, pp. 937-944 (Feb. 16, 2005).

Gu, Y. et al., "Ionic liquids-based catalysis with solids: state of the art," *Adv. Synth. Catal.*, vol. 351, pp. 817-847 (Apr. 6, 2009).

Hamlen et al., "Metal/Air Batteries," *Handbook of Batteries*, 3rd ed., Chapter 38, 53 pages (2002).

(56) References Cited

OTHER PUBLICATIONS

Hanioka, S. et al, "$CO_2$ separation facilitated by task-specific ionic liquids using a supported liquid membrane," *Journal of Membrane Science*, vol. 314, pp. 1-4 (Jan. 24, 2008).
Harlick, P.J.E. et al., "Applications of Pore-Expanded Mesoporous Silicas. 3. Triamine Silane Grafting for Enhanced $CO_2$ Adsorption," *Ind. Eng. Chem. Res.*, vol. 45, pp. 3248-3255 (Mar. 22, 2006).
Harlick, P.J.E. et al., "Applications of Pore-Expanded Mesoporous Silica. 5. Triamine Grafted Material with Exceptional $CO_2$ Dynamic and Equilibrium Adsorption Performance," *Ind. Eng. Chem. Res.*, vol. 46, pp. 446-458 (Jan. 17, 2007).
Harris, F. et al., "Solubilities of Carbon Dioxide and Densities off Aqueous Sodium Glycinate Solutions before and after $CO_2$ Absorption," *J. Chem. Eng. Data*, vol. 54, pp. 144-147 (Jan. 8, 2009).
Huang et al., "Electrodeposition and lithium storage performance of three-dimensional porous reticular Sn-Ni alloy electrodes," *Electrochimica Acta*, vol. 54, pp. 2693-2698 (2009).
Huang, J. et al., "Carbon Dioxide Capture Using a $CO_2$-Selective Facilitated Transport Membrane," *Ind. Eng. Chem. Res.*, vol. 47, No. 4, pp. 1261-1267 (Jan. 16, 2008).
Hwang, K. et al., "Reaction kinetics between carbon dioxide and glycidyl methacrylate using trihexylamine immobilized ionic liquid on MCM41 catalyst," *J. Ind. and Eng. Chem.*, vol. 15, pp. 854-859 (Nov. 25, 2009).
Ilconich, J. et al., "Experimental investigation of the permeability and selectivity of supported ionic liquid membranes for $CO_2$/He separation at temperatures up to 125°C," *Journal of Membrane Science*, vol. 298, pp. 41-47 (Apr. 6, 2007).
International Search Report and Written Opinion for PCT/US2010/035543 (Mailed Dec. 6, 2010).
International Search Report and Written Opinion for PCT/US2010/041213 (Mailed Feb. 8, 2011).
International Search Report and Written Opinion for PCT/US2010/041214 (Mailed Feb. 8, 2011).
International Search Report and Written Opinion for PCT/US2010/052170 (Mailed Jan. 28, 2011).
International Search Report and Written Opinion for PCT/US2010/057047 (Mailed Jul. 27, 2011).
International Search Report and Written Opinion for PCT/US2011/031342 (Mailed Jul. 27, 2011).
Kai, T. et al., "Development of cesium-incorporated carbon membranes for $CO_2$ separation under humid conditions," *Journal of Membrane Science*, vol. 342, pp. 14-21 (Jun. 17, 2009).
Ke et al., "Electroplating synthesis and electrochemical properties of macroporous Sn-Cu alloy electrode for lithium-ion batteries," *Electrochemimica Acta*, vol. 52, pp. 6741-6747 (2007).
Ke et al., "Fabrication and properties of macroporous tin-cobalt alloy film electrodes for lithium-ion batteries," *Journal of Power Sources*, vol. 170, pp. 450-455 (2007).
Ke et al., "Fabrication and properties of three dimensional macroporous Sn-Ni alloy electrodes of high preferential (1 1 0) orientation for lithium ion batteries," *Electrochemistry Communications*, vol. 9, pp. 228-232 (2007).
Koros, W. et al., "Pushing the limits on possibilities for large scale gas separation: which strategies?," *Journal of Membrane Science*, vol. 175, No. 2, pp. 181-196 (Aug. 10, 2000).
Koros, W. et al., "Pushing the limits on possibilities for large scale gas separation: which strategies?," *Journal of Membrane Science*, vol. 181, p. 141 (Jan. 15, 2001).
Kowalczk et al., "Li-air batteries: A classic example of limitations owing to solubilities," *Pure Appl. Chem.*, vol. 79, No. 5, pp. 851-860 (2007).
Li, L. et al., "Stabilization of Metal Nanoparticles in Cubic Mesostructured Silica and Its Application in Regenerable Deep Desulfurization of Warm Syngas," *Chem. Mater.*, vol. 21, pp. 5358-5364 (Oct. 22, 2009).
Li, Y. et al., "Pervaporation and vapor permeation dehydration of Fischer-Tropsch mixed-alcohols by LTA zeolite membranes," *Separation and Purification Technology*, vol. 57, p. 140-146 (Oct. 1, 2007).

Lin, H. et al., "Materials selection guidelines for membranes that remove $CO_2$ from gas mixtures," *Journal of Molecular Structure*, vol. 739, pp. 57-74 (Apr. 2005).
Littauer et al., "Corrosion of Lithium in Alkaline Solution," *Journal of the Electrochemical Society*, vol. 124, No. 6, pp. 850-855 (1977).
Liu, W. et al., "Critical Material and Process Issues for $CO_2$ Separation from Coal-Powered Plants," *JOM*, vol. 41, No. 4, pp. 36-44 (Apr. 2009).
Luis, P. et al., "Facilitated transport of $CO_2$ and $SO_2$ through Supported Ionic Liquid Membranes (SILMs)," *Desalination*, vol. 245, pp. 485-493 (Sep. 15, 2009).
Masuda, T. et al., "Preparation of hydrophilic and acid-proof silicalite-1 zeolite membrane and its application to selective separation of water from water solutions of concentrated acetic acid by pervaporation," *Separation and Purification Technology*, vol. 32, p. 181-189 (Jul. 1, 2003).
Mineo, P.G. et al., "Very fast $CO_2$ response and hydrophobic properties of novel poly(ionic liquid)s," *J. of Materials Chem.*, vol. 19, No. 46, pp. 8861-8870 (Oct. 19, 2009).
Morigami, Y. et al., "The first large-scale pervaporation plant using tubular-type module with zeolite NaA membrane," *Separation and Purification Technology*, vol. 25, p. 251-260 (Oct. 1, 2001).
National Energy Technology Laboratory (NETL) "Carbon Dioxide Capture from Existing Coal-Fired Power Plants," DOE/NETL-401/110907, Final Report (Original Issue Date, Dec. 2006), Revision Date, Nov. 2007.
National Energy Technology Laboratory (NETL), "Cost and Performance Baseline for Fossil Energy Plants," DOE/NETL-2007/1281, vol. 1: Bituminous Coal and Natural Gas to Electricity, Final Report (Original Issue Date, May 2007), Revision 1, Aug. 2007.
Notice of Allowance from U.S. Patent and Trademark Office for U.S. Appl. No. 12/557,452, mailed May 7, 2013.
Office action from U.S. Patent and Trademark Office for U.S. Appl. No. 12/470,294, mailed Apr. 26, 2012.
Office action from U.S. Patent and Trademark Office for U.S. Appl. No. 12/557,452, mailed Dec. 6, 2012.
Office action from U.S. Patent and Trademark Office for U.S. Appl. No. 12/557,455, mailed Mar. 16, 2012.
Office action from U.S. Patent and Trademark Office for U.S. Appl. No. 12/557,455, mailed Mar. 28, 2013.
Office action from U.S. Patent and Trademark Office for U.S. Appl. No. 12/621,410, mailed Jan. 20, 2012.
Office action from U.S. Patent and Trademark Office for U.S. Appl. No. 12/621,410, mailed Jun. 7, 2013.
Office action from U.S. Patent and Trademark Office for U.S. Appl. No. 13/414,641, mailed Jul. 16, 2012.
PCT Application No. PCT/US2011/031342, filed Apr. 6, 2011, 42 pages.
Read, "Characterization of the Lithium/Oxygen Organic Electrolyte," *Journal of the Electrochemical Society*, vol. 149, No. 9, pp. A1190-A1195 (2002).
Read, "Ether-Based Electrolytes for the Lithium/Oxygen Organic Electrolyte Battery," *Journal of the Electrochemical Society*, vol. 153, No. 1, pp. A96-A100 (2006).
Read, "Oxygen Transport Properties of Organic Electrolytes and Performance of Lithium/Oxygen Battery," *Journal of the Electrochemical Society*, vol. 150, No. 10, pp. A1351-A1356 (2003).
Restriction Requirement from U.S. Patent and Trademark Office for U.S. Appl. No. 12/470,294, mailed Sep. 27, 2011.
Restriction Requirement from U.S. Patent and Trademark Office for U.S. Appl. No. 12/557,452, mailed Aug. 10, 2012.
Restriction Requirement from U.S. Patent and Trademark Office for U.S. Appl. No. 12/557,455, mailed Feb. 1, 2012.
Sandru, M. et al., "Composite hollow fiber membranes for $CO_2$ capture," *Journal of Membrane Science*, vol. 346, pp. 172-186 (Jan. 1, 2010).
Sebastian, V. et al., "Zeolite membrane for $CO_2$ removal: Operating at high pressure," *Journal of Membrane Science*, vol. 292, pp. 92-97 (Jan. 24, 2007).
Shekhawat, D. et al., "A Review of Carbon Dioxide Selective Membranes," *US DOE Topical Report*, DOE/NETL-2003/1200 (Dec. 1, 2003).

(56) References Cited

OTHER PUBLICATIONS

Shin et al., "Three-Dimensional Porous Copper-Tin Alloy Electrodes for Rechargeable Lithium Batteries," *Adv. Funct. Mater.*, vol. 15, No. 4, pp. 582-586, Apr. 2005.
Takemura, D. et al., "A powder particle size effect on ceramic powder based separator for lithium rechargeable battery," *J. Power Sources*, vol. 146, Issues 1-2, pp. 779-783 (Aug. 2005).
Tamura et al., "Study on Sn-Co Alloy Anodes for Lithium Secondary Batteries," *Journal of the Electrochemical Society*, vol. 153, No. 8, pp. A1626-A1632 (2006).
Tamura et al., "Study on Sn-Co Alloy Electrodes for Lithium Secondary Batteries," *Journal of the Electrochemical Society*, vol. 153, No. 12, pp. A2227-A2231 (2006).
Tang, J. et al., "Enhanced $CO_2$ Absorption of Poly(ionic liquid)s," *Macromolecules*, vol. 38, pp. 2037-2039 (Feb. 18, 2005).
Tang, J. et al., "Low-temperature $CO_2$ sorption in ammonium-based poly(ionic liquid)s," *Polymer*, vol. 46, pp. 12460-12467 (Nov. 4, 2005).
Tarascon et al., "Performance of Bellcore's plastic rechargeable Li-ion batteries," *Solid State Ionics*, vol. 8688: pp. 49-54 (1996).
Visco, V. et al., "Lithium Fuel Cells," *The Electrochemical Society, Inc.*, Abs. 396, IMLB 12 Meeting, 1 page (2004).
Ward, W. et al, "Carbon Dioxide-Oxygen Separation: Facilitated Transport of Carbon Dioxide Across a Liquid Film," *Science*, vol. 156, pp. 1481-1484 (Jun. 16, 1967).
Wei et al., "Influence of electrode structure on the performance of a direct methanol fuel cell," *Journal of Power Sources*, vol. 106, Issues 1-2, pp. 364-369 (Apr. 2002).
Xomeritakis, G. et al, "Tubular ceramic-supported sol-gel silica-based membranes for flue gas carbon dioxide capture and sequestration," Journal of Membrane Science, vol. 341, pp. 30-36 (May 23, 2009).
Xu et al., "Optimization of Nonaqueous Electrolytes for Primary Lithium/Air Batteries Operated in Ambient Environment," *Journal of the Electrochemical Society*, vol. 156, No. 10, pp. A773-A779, (Jul. 27, 2009).
Yan, T.Y. et al., "Adsorption of $CO_2$ on the Rutile (110) Surface in Ionic Liquid. A Molecular Dynamics Simulation," *J. of Phys. Chem. C*, vol. 113, No. 45, pp. 19389-19392 (Oct. 19, 2009).
Yegani, R. et al., "Selective separation of $CO_2$ by using novel facilitated transport membrane at elevated temperatures and pressures," *Journal of Membrane Science*, vol. 291, pp. 157-164 (Jan. 18, 2007).
Yokozeki, A. et al., "Hydrogen purification using room-temperature ionic liquids," *Applied Energy*, vol. 84, pp. 351-361 (Mar. 2007).
Yu, G. et al., "Design of task-specific ionic liquids for capturing CO2: A molecular orbital study," Ind. Eng. Chem. Res, vol. 45, No. 8, pp. 2875-2880 (Feb. 24, 2006).
Yu, G.R. et al., "Structure, Interaction and Property of Amino-Functionalized Imidazolium ILs by Molecular Dynamics Simulation and Ab Initio Calculation," *AIChE J.*, vol. 53, No. 12, pp. 3210-3221 (Dec. 2007).
Zhang, J. et al., "Supported Absorption of $CO_2$ by Tetrabutylphosphonium Amino Acid Ionic Liquids," *Chem. Eur. Journal*, vol. 12, pp. 4021-4026 (May 15, 2006).
Zhang, S. et al., "Fixation and conversion of CO2 using ionic liquids," *Catalysis Today*, vol. 115, pp. 61-69 (Mar. 29, 2006).
Zhang, Y. et al., "Dual Amino-Functionalised Phosphonium Ionic Liquids for $CO_2$ Capture," *Chem. Eur. J.*, vol. 15, pp. 3003-3011 (Mar. 9, 2009).
Zhao et al., "A new process of preparing composite microstructure anode for lithium ion batteries," *Journal of Power Sources*, vol. 184, pp. 532-537 (2008).
Zheng et al, "Theoretical Energy Density of Li-Air Batteries," *Journal of the Electrochemical Society*, vol. 155, No. 6, pp. A432-A437 (2008).
Zheng, F. et al., "Ethylenediamine-Modified SBA-15 as Regenerable $CO_2$ Sorbent," *Ind. & Eng. Chem. Res.*, vol. 44, pp. 3099-3105 (Mar. 25, 2005).
Zou, J. et al., "$CO_2$-selective polymeric membranes containing amines in crosslinked poly(vinyl alcohol)," *Journal of Membrane Science*, vol. 286, pp. 310-321 (Oct. 10, 2006).

* cited by examiner

HIGH-ENERGY METAL AIR BATTERIES

CROSS REFERENCE TO RELATED APPLICATION

This application is a Divisional of U.S. patent application Ser. No. 12/557,452, filed Sep. 10, 2009, which is hereby incorporated by reference.

ACKNOWLEDGMENT OF GOVERNMENT SUPPORT

This invention was made with government support under DE-AC05-76RL01830 awarded by the U.S. Department of Energy. The government has certain rights in the invention.

FIELD

Disclosed herein are embodiments of lithium/air batteries and methods of making and using the same.

BACKGROUND

Electrochemical devices, such as batteries and fuel cells, typically incorporate an electrolyte source to provide the anions or cations necessary to produce an electrochemical reaction. Batteries and fuel cells operate on electrochemical reaction of metal/intercalation compounds, metal/air, metal/halide, metal/hydride, hydrogen/air, or other materials capable of electrochemical reaction.

Metal/air batteries, or metal/oxygen batteries, with aqueous and non-aqueous electrolytes have attracted the interest of the battery industry for many years. Zinc-air batteries with aqueous alkaline electrolytes have been used successfully for hearing aids and other markets (including military applications) which require batteries with high specific capacity. The unique property of metal/oxygen batteries compared to other batteries is that the cathode active material, oxygen, is not stored in the battery. When the battery is exposed to the environment, oxygen enters the cell through the oxygen diffusion membrane and porous air electrode and is reduced at the surface of the catalytic air electrode, forming peroxide ions and/or oxide ions in non-aqueous electrolytes or hydroxide anions in aqueous electrolytes. When the anode is lithium and non-aqueous electrolyte is used, these peroxide and/or oxide anions react with cationic species in the electrolyte and form lithium peroxide ($Li_2O_2$) or lithium oxide ($Li_2O$). The ratio of lithium peroxide to lithium oxide formed in Li/air batteries depends on several factors, such as catalyst, electrolyte selection, oxygen partial pressures.

The metal anode in metal/oxygen batteries has been studied and developed based on Fe, Zn, Al, Mg, Ca, and Li. It has been shown that metal/air batteries have much higher specific energy than that achieved by lithium metal oxide/graphite batteries. Lithium/oxygen batteries are especially attractive because the $Li/O_2$ redox couple has the highest specific energy among all known electrochemical couples. When only lithium is considered and oxygen is absorbed from the surrounding air environment, the battery has a specific energy of 11,972 Wh/kg or 11,238 Wh/kg if the reaction product is lithium peroxide ($Li_2O_2$) or lithium oxide ($Li_2O$), respectively. With internally carried oxygen, the specific energy is still as high as 3,622 Wh/kg or 5,220 Wh/kg if the reaction product is lithium peroxide ($Li_2O_2$) or lithium oxide ($Li_2O$), respectively. Even considering a more than 50% weight contribution from other inactive materials (including the air electrode, separator, electrolyte, and packaging), the specific energy of the lithium/air battery is still capable of reaching an order of magnitude larger than that of conventional lithium or lithium ion batteries.

SUMMARY

Disclosed herein are embodiments of metal/air batteries and methods of making and using the same. Particular disclosed embodiments of lithium/air batteries have a high capacity (e.g., more than 1 Ah) and can be discharged in ambient conditions for extended periods of time. In particular embodiments, the specific capacity per unit mass of carbon is more than 2,500 mAh/g carbon when operated in ambient conditions. The specific energy of the complete Li/air battery (including package) is more than 360 Wh/kg when operated in ambient conditions. Some embodiments of the disclosed batteries are pouch-cell batteries substantially completely encased within an oxygen-permeable membrane that also functions as the outer packaging material for the battery. The oxygen-permeable membrane substantially reduces the weight of the battery, resulting in an increased specific energy. In particular embodiments, the oxygen-permeable membrane is heat-sealable. In some examples, the oxygen-permeable membrane is oxygen selective with an oxygen:water vapor permeability ratio of more than 3:1. In some embodiments, the oxygen-permeable membrane is further coated with an oil layer that adjusts the oxygen permeability and/or oxygen selectivity of the membrane. The oil selectively absorbs oxygen over moisture from ambient air and/or selectively permits oxygen to pass through to the oxygen-permeable membrane. In certain embodiments, the pouch-cell batteries are double-sided and include a carbon-based air electrode on either side of the lithium anode. In some embodiments, a heat-sealable separator is used to adhere the lithium anode to the air electrode. In some embodiments, an adherent layer is coated onto a separator to improve binding between the separator and cathode as well as between the separator and anode.

Embodiments of lithium/air batteries including embodiments of hybrid air electrodes are disclosed. In some embodiments, the hybrid air electrode comprises highly conductive carbon powder (which has no significant lithium insertion capability) having a high mesopore volume. In certain embodiments, the hybrid air electrode further comprises an ion insertion material. The ion insertion material is mixed with the carbon in some embodiments. In other embodiments, the ion insertion material is a separate layer. In particular embodiments, a layer comprising carbon powder is adhered to a first side of a cathode current collector, and a layer comprising the ion insertion material is adhered to a second side of the cathode current collector. In some embodiments, the mass ratio of ion insertion material to carbon is less than or equal to 2, such as 0.1 to 2, 0.1 to 1, 0.2 to 0.8, or 0.1 to 0.3. In particular examples, the ion insertion material is carbon fluoride ($CF_x$). The air electrode may further include hydrophobic, porous fibers to facilitate oxygen diffusion into the cathode.

Embodiments of methods for making lithium/air battery embodiments including an air electrode are disclosed. In some embodiments, a first film comprising, e.g., carbon, a binder, and optionally an ion insertion material is prepared and adhered to a first side of a current collector to form a cathode. In particular embodiments, a second film is prepared and adhered to a second side of the current collector. The second film may be the same composition as the first one. The second film may also comprise an ion insertion material or a mixture of carbon powder, binder, and ion insertion material.

The cathode may be soaked with an electrolyte including a lithium salt and one or more solvents. In some embodiments, the electrolyte comprises 1 M lithium bis(trifluoromethane sulfonyl imide) in ethylene carbonate/propylene carbonate with 1:1 weight ratio. In certain embodiments, the electrolyte includes a crown ether. In particular embodiments, the electrolyte further comprises dimethyl ether, and a substantial amount of the dimethyl ether is evacuated from the soaked air electrode, thereby reducing the weight of the electrode and introducing open channels in the electrode to facilitate oxygen transport. In some embodiments, the contact angle between the electrolyte and the air electrode surface is between 30° and 60°.

The foregoing and other objects, features, and advantages of the invention will become more apparent from the following detailed description, which proceeds with reference to the accompanying figures.

DETAILED DESCRIPTION

I. Terms and Definitions

Figure 1:
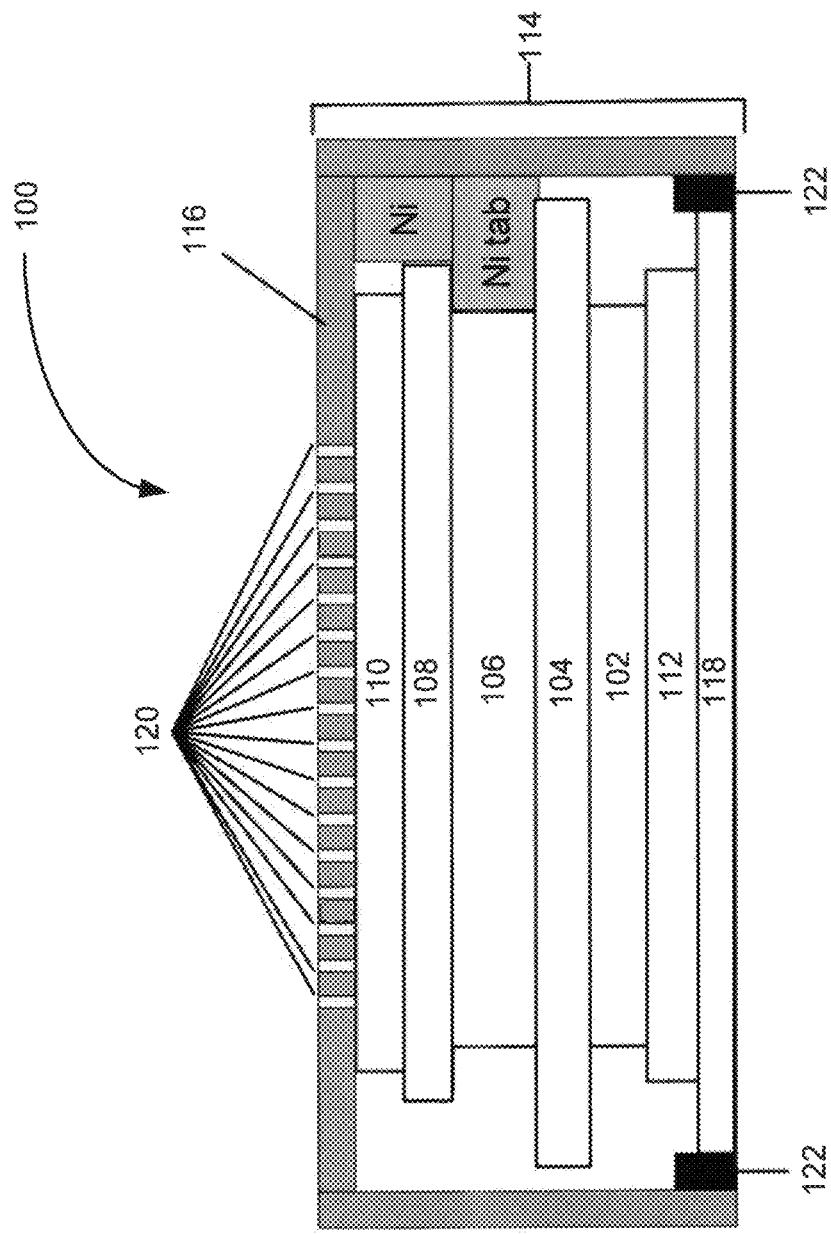
FIG. 1 is a schematic diagram of one embodiment of a coin cell.

The following explanations of terms are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

Unless otherwise indicated, all numbers expressing quantities of components, molecular weights, percentages, temperatures, times, and so forth, as used in the specification or claims are to be understood as being modified by the term "about." Accordingly, unless otherwise indicated, implicitly or explicitly, the numerical parameters set forth are approximations that may depend on the desired properties sought and/or limits of detection under standard test conditions/methods. When directly and explicitly distinguishing embodiments from discussed prior art, the embodiment numbers are not approximates unless the word "about" is recited.

In order to facilitate review of the various embodiments of the disclosure, the following explanations of specific terms are provided:

Anode: An electrode through which electric charge flows into a polarized electrical device. From an electrochemical point of view, negatively-charged anions move toward the anode and/or positively-charged cations move away from it to balance the electrons arriving from external circuitry. In a discharging battery, such as the disclosed lithium/air batteries or a galvanic cell, the anode is the negative terminal where electrons flow out. If the anode is composed of a metal, electrons that it gives up to the external circuit are accompanied by metal cations moving away from the electrode and into the electrolyte.

Capacity: The capacity of a battery is the amount of electrical charge a battery can deliver. The capacity is typically expressed in units of mAh, or Ah, and indicates the maximum constant current a battery can produce over a period of one hour. For example, a battery with a capacity of 100 mAh can deliver a current of 100 mA for one hour or a current of 5 mA for 20 hours.

Cathode: An electrode through which electric charge flows out of a polarized electrical device. From an electrochemical point of view, positively charged cations invariably move toward the cathode and/or negatively charged anions move away from it to balance the electrons arriving from external circuitry. In a discharging battery, such as the disclosed lithium/air batteries or a galvanic cell, the cathode is the positive terminal, toward the direction of conventional current. This outward charge is carried internally by positive ions moving from the electrolyte to the positive cathode.

CELGARD® 5550: A monolayer polypropylene membrane laminated to a polypropylene nonwoven fabric and surfactant-coated. Available from Celgard LLC, Charlotte, N.C.

Cell: A self-contained unit having a specific functional purpose. Examples include voltaic cells, electrolytic cells, and fuel cells, among others. A battery includes one or more cells. The terms "cell" and "battery" are used interchangeably when referring to a battery containing only one cell.

Coin cell: A small, typically circular-shaped battery. Coin cells are characterized by their diameter and thickness. For example, a type 2325 coin cell has a diameter of 23 mm and a height of 2.5 mm.

Contact angle: The angle at which a liquid/vapor interface meets a solid surface, e.g. a liquid droplet on a solid surface. A goniometer typically is used to measure the contact angle on a horizontal solid surface.

A current collector is a battery component that conducts the flow of electrons between an electrode and a battery terminal. The current collector also may provide mechanical support for the electrode's active material. For example, a metal mesh current collector may provide mechanical support for the carbon film of a carbon-based air electrode and also allows oxygen and liquid electrolyte to pass through.

Intercalation: A term referring to the insertion of a material (e.g., an ion or molecule) into the microstructure of another material. For example, lithium ions can insert, or intercalate, into graphite (C) to form lithiated graphite ($LiC_6$).

Ion insertion (or intercalation) material: A compound capable of intercalating ions reversibly without irreversible change in its microstructure. For example, a lithium ion insertion material is capable of intercalating lithium ions. One example of a lithium ion insertion material is graphite, which is often used in lithium-ion batteries. Lithium ions intercalate into the carbon structure to form $LiC_6$. Lithium ions can also be extracted from $LiC_6$ to re-form graphite without irreversible change in its microstructure.

KETJENBLACK® carbon: An electroconductive carbon powder with a unique morphology. Available from Akzo Nobel Polymer Chemicals, Chicago, Ill. In particular, KETJENBLACK® EC-600JD carbon has a density of 100-120 $kg/m^3$ and a pore volume of 4.8-5.1 $cm^3/g$ as determined by dibutyl phthalate absorption (ASTM D2414). It is especially useful in applications where high conductivity and relatively low carbon loadings are desired.

MELINEX® 301H: A bilayer membrane with a biaxially-oriented polyethylene terephthalate layer, and a terephthalate/isophthalate copolyester of ethylene glycol thermal bonding layer. Thermal bonding can be achieved by application of heat and pressure at 140-200° C. Available from DuPont Teijin Films, Wilmington, Del.

Membrane: A membrane is a thin, pliable sheet of synthetic or natural material. A permeable membrane has a porous structure that permits ions and small molecules to pass through the membrane. For a metal/air battery, the current density and operational lifetime of the battery are factors in selecting the degree of membrane permeability for the battery. Some membranes are selective membranes, through which certain ions or molecules with particular characteristics pass more readily than other ions or molecules.

Permeable: Permeable means capable of being passed through. The term permeable is used especially for materials through which gases or liquids may pass.

Pore: One of many openings or void spaces in a solid substance of any kind. Pores are characterized by their diameters. According to IUPAC notation, micropores are small pores with diameters less than 2 nm. Mesopores are mid-sized pores with diameters from 2 nm to 50 nm. Macropores are large pores with diameters greater than 50 nm. Porosity is a measure of the void spaces or openings in a material, and is measured as a fraction, between 0-1, or as a percentage between 0-100%.

Porous: A term used to describe a matrix or material that is permeable to fluids (such as liquids or gases). For example, a porous matrix is a matrix that is permeated by a network of pores (voids) that may be filled with a fluid. In some examples, both the matrix and the pore network (also known as the pore space) are continuous, so as to form two interpenetrating continua. Many materials such as cements, foams, metals and ceramics can be prepared as porous media.

Pouch cell: A pouch cell is a battery completely, or substantially completely, encased in a flexible outer covering, e.g., a heat-sealable foil, a fabric, or a polymer membrane. The term "flexible" means that the outer covering is easy to bend without breaking; accordingly, the outer covering can be wrapped around the battery components. The electrical contacts generally comprise conductive foil tabs that are welded to the electrode and sealed to the pouch material. Because a pouch cell lacks an outer hard shell, it is flexible and weighs less than conventional batteries.

Relative humidity: A measure of the amount of water in air compared with the amount of water the air can hold at a particular temperature.

Selective permeation: A process that allows only certain selected types of molecules or ions to pass through a material, such as a membrane. In some examples, the rate of passage depends on the pressure, concentration, and temperature of the molecules or solutes on either side of the membrane, as well as the permeability of the membrane to each solute. Depending on the membrane and the solute, permeability may depend on solute size, solubility, or other chemical properties. For example, the membrane may be selectively permeable to $O_2$ as compared to $H_2O$.

Separator: A battery separator is a porous sheet or film placed between the anode and cathode. It prevents physical contact between the anode and cathode while facilitating ionic transport.

Specific capacity: A term that refers to capacity per unit of mass. Specific capacity may be expressed in units of mAh/g, and often is expressed as mAh/g carbon when referring to a carbon-based electrode in Li/air batteries.

Specific energy: A term that refers to energy per unit of mass. Specific energy is commonly expressed in units of Wh/kg or J/kg. With respect to a metal/air battery, the mass typically refers to the mass of the entire battery and does not include the mass of oxygen absorbed from the atmosphere. In the case of a sealed battery with an oxygen container, the mass of oxygen and its container are included in the total mass of the battery.

Specific power: A term that refers to power per unit of mass, volume, or area. For example, specific power may be expressed in units of W/kg. With respect to a metal/air battery, the mass typically refers to the mass of the entire battery and does not include the mass of oxygen absorbed from the atmosphere. In the case of a sealed battery with an oxygen container, the mass of oxygen and its container are included in the total mass.

II. Metal/Air Batteries

Advances in the electronics industry have improved the efficiency and functionality of electronic equipment dramatically in recent years. Although devices are much smaller than before, they often require much more power to support advanced functions. On the other hand, the development of power sources, especially batteries, has lagged significantly behind other electronic improvements. There is a need for advanced battery chemistries and structures that operate at significantly higher specific energies, (much larger than the ~200 Wh/kg in conventional lithium ion batteries). However, currently available batteries do not meet these performance criteria.

Metal/air batteries have a much higher specific energy than most available primary and rechargeable batteries. These batteries are unique in that the cathode active material is not stored in the battery. Oxygen from the environment is reduced by catalytic surfaces inside the air electrode, forming either an oxide or peroxide ion that further reacts with cationic species in the electrolyte. Table 1 lists the theoretical cell voltages and specific energies obtained when an oxygen electrode is coupled with various metal anodes.

TABLE 1

Characteristics of Metal/air Batteries

| Reaction | Cell voltage (V) | Specific energy (excluding $O_2$) (Wh/kg) | Specific energy (including $O_2$) (Wh/kg) | Notes |
|---|---|---|---|---|
| $2Li + O_2 \rightarrow Li_2O_2$ | 3.1 | 11,972 | 3,622 | in non-aqueous electrolyte* |
| $4Li + O_2 \rightarrow 2Li_2O$ | 2.91 | 11,238 | 5,220 | in non-aqueous electrolyte* |
| $4Li + O_2 + 2H_2O \rightarrow 4Li(OH)$ | 3.35 | 12,938 | 6,009 | in aqueous electrolyte† |
| $2Zn + O_2 + 2H_2O \rightarrow 2Zn(OH)_2$ | 1.6 | 1,312 | 1,054 | in aqueous electrolyte† |
| $4Al + 3O_2 + 6H_2O \rightarrow 4Al(OH)_3$ | 2.7 | 8,047 | 4,258 | in aqueous electrolyte† |
| $2Ca + O_2 + 2H_2O \rightarrow 2Ca(OH)_2$ | 3.4 | 4,547 | 3,250 | in aqueous electrolyte† |

*K. M. Abraham and Z. Jiang, *J. Electrochem. Soc.*, 143-1, 1, 1996.
†D. Linden and T. B. Reddy, eds. *Handbook of Batteries*, 3rd ed. McGraw Hill, New York, 2002, page 38.2.

The $Li/O_2$ couple is especially attractive because it has the potential for the highest specific energy among all of the known electrochemical couples. When only lithium is considered and oxygen is absorbed from the surrounding air environment, it has a specific energy of 11,972 Wh/kg or 11,238 Wh/kg if the reaction product is lithium peroxide ($Li_2O_2$) or lithium oxide ($Li_2O$), respectively. Even considering internally carried oxygen, the specific energy is still as high as 3,622 Wh/kg or 5,220 Wh/kg if the reaction product is lithium peroxide ($Li_2O_2$) or lithium oxide ($Li_2O$), respectively.

Although much work has been done on the development of Li/air batteries, the available literature only reports the specific capacity per unit weight of carbon used in the electrode. However, in a typical Li/air battery, the majority of the battery weight is due to the electrolyte, packaging (e.g., a coin cell container, hard outer shell, outer pouch material with frame, etc.) and other inactive materials (e.g., current collector, air diffusion membrane, and separator), and the specific capacity of the battery as a whole is much lower than the specific capacity per unit weight of carbon. In the disclosed embodiments, the structures of Li/air batteries are optimized to significantly increase the specific energy and capacity of the complete Li/air battery. For example, in some embodiments, the weight of the packaging material is reduced. In other embodiments, the outer packaging is an $O_2$-selective permeable membrane. In still other embodiments, the amount of electrolyte is reduced, such as by evacuating a portion of the electrolyte from the soaked air electrode or by changing the composition of the air electrode so that it utilizes less electrolyte. In other embodiments, an additive (e.g., a crown ether) is included in the electrolyte. Additionally, a hybrid electrode comprising an ion insertion material was developed to improve the specific power of the Li/air batteries. In some embodiments, the electrode further comprises hydrophobic hollow fibers.

Various factors affect the performance of Li/air batteries. These factors include air electrode formulation, electrolyte composition, viscosity, $O_2$ solubility, and pressure, among others. As disclosed herein, Li/air batteries have been investigated to discover the key components that vary battery properties, such as the type of carbon in the air electrode, addition of ion insertion materials, air-stable electrolytes, and $O_2$-selective membranes. Also discovered are synergistic effects of various key battery components of the disclosed embodiments. Both coin cells and pouch cells have been developed.

In some embodiments, the battery includes a polymer membrane that serves as both the battery package and an $O_2$-diffusion membrane. In certain embodiments, the membrane weight is less than 5% of the total battery weight, less than 3% of the total battery weight, less than 2% of the total battery weight, or less than 1.5% of the total battery weight. The total battery weight includes the masses of the anode, anode current collector, separator, air electrode(s), cathode current collector, electrolyte, and oxygen diffusion membrane. In some embodiments, the total battery weight also includes the masses of additional battery components including, for example, adhesives, thread bindings, etc. The membrane also minimizes water diffusion from the atmosphere into the battery and electrolyte loss from the battery to the atmosphere.

Disclosed embodiments of the Li/air batteries do not require operation within a sealed oxygen-containing environment; in contrast, the disclosed Li/air batteries are operable under ambient conditions. Certain of the disclosed embodiments of the Li/air batteries have high capacity (e.g., more than 1 Ah) and can be discharged in ambient conditions for extended periods of time. For example, in some embodiments, the batteries can be discharged for at least 5 days in ambient conditions. In some embodiments, the batteries can be discharged for more than 14 days in ambient conditions. In particular embodiments, the batteries can be discharged for more than 33 days in ambient conditions. In particular embodiments, the specific capacity of the cells is as high as or higher than 2,300 mAh/g carbon, with a specific energy of more than 360 Wh/kg based on the mass of the complete Li/air battery (i.e., anode, anode current collector, separator, air electrode(s), cathode current collector, electrolyte solution, and outer packaging material).

In certain embodiments, the batteries include a hybrid air electrode comprising carbon fluoride $CF_x$, which provides relatively high power rates. In certain embodiments, the mesopore volume of carbon in the air electrode is varied. In some embodiments, the volume of electrolyte in the air electrode is varied.

In other embodiments, a heat-sealable separator is used to bind the lithium anode and the air electrode. The separator maintains the cell's integrity during the discharge process. In some embodiments, cell expansion and loss of contact between component layers of pouch cells have been substantially reduced or eliminated, which can lower cell impedance from more than 500 ohm to less than 1 ohm.

III. Battery Design

A. Coin Cell Battery

A schematic diagram of one embodiment of a lithium/air coin cell battery is illustrated in FIG. 1. The coin-type battery 100 includes a lithium anode 102, a separator 104, an air electrode (cathode) 106 with electrolyte, an oxygen-permeable membrane 108, a protective film 110, and a stainless steel spacer 112, all of which are encapsulated by a stainless steel coin cell container 114. The stainless steel coin cell container 114 includes a stainless steel coin cell pan 116 and a stainless coin cell cover 118. The stainless coin cell pan 116 includes a plurality of holes 120. Further, a gasket 122 is positioned between each end of the stainless coin cell cover 118 and pan 116 to assist with sealing of the container. During battery operation, air diffuses through the plurality of holes 120 providing air to the $O_2$-permeable membrane 108. The protective film 110 is optional.

Figure 2:
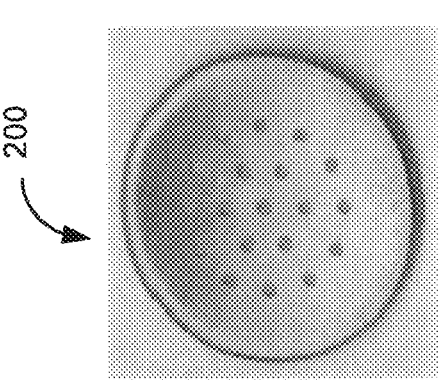
FIG. 2 is a photograph of one embodiment of a coin cell.

FIG. 2 is a photograph of a 2325-type coin cell. The designation "2325" indicates that the cell has a diameter of 23 mm and a height of 2.5 mm.

B. Pouch Cell Batteries

Figure 3:
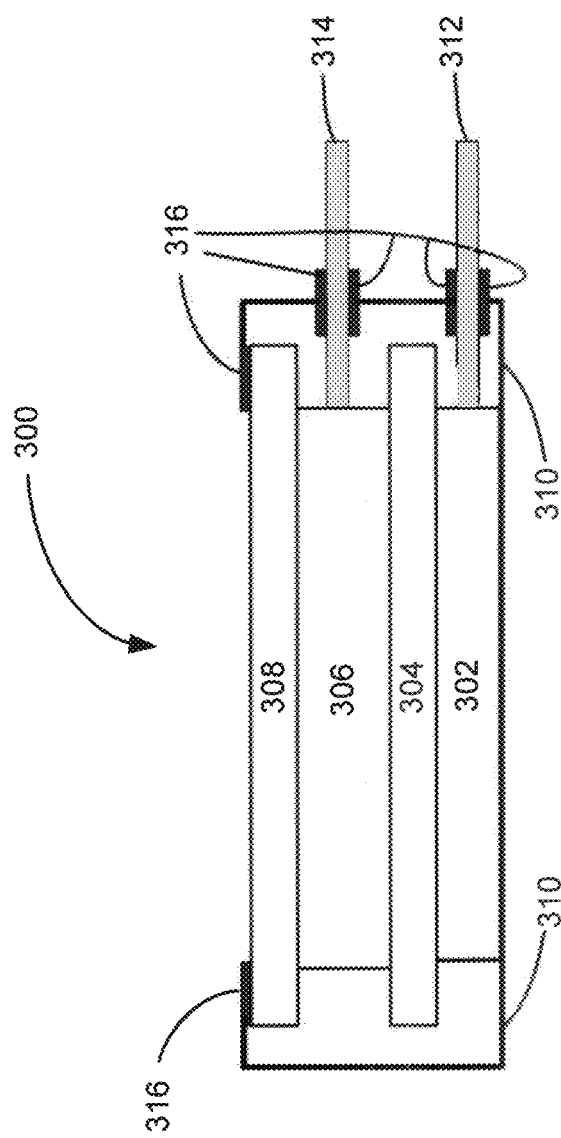
FIG. 3 is a schematic diagram of one embodiment of a pouch cell.

FIG. 3 is a schematic diagram of one embodiment of a lithium/air pouch cell battery 300. The battery 300 includes a lithium anode 302, a separator 304, an air electrode (cathode) 306 with electrolyte, a membrane 308, and an outer package material 310. The lithium anode 302 is in electrical contact with an anode current collector 312 that extends outside the battery 300. The anode current collector 312 generally extends the length of the anode 302. The anode current collector 312 may be embedded within the anode 302 as shown, or may be in electrical contact with a surface of the anode (not shown). Similarly, the air electrode 306 is in electrical contact with a cathode current collector 314 that extends outside the battery 300. The cathode current collector 314 generally extends the length of the air electrode 306. The cathode current collector 314 may be embedded within the air electrode 306 as shown, or may be in electrical contact with a surface of the air electrode (not shown). The membrane 308 is permeable to oxygen. Typically, the outer package material 310 is a multi-layer metal/polymer laminate. The outer package material 310 is attached to the cell components by any means known to one of skill in the art including an adhesive 316, such as thermal sealing adhesive glue.

Figure 4:
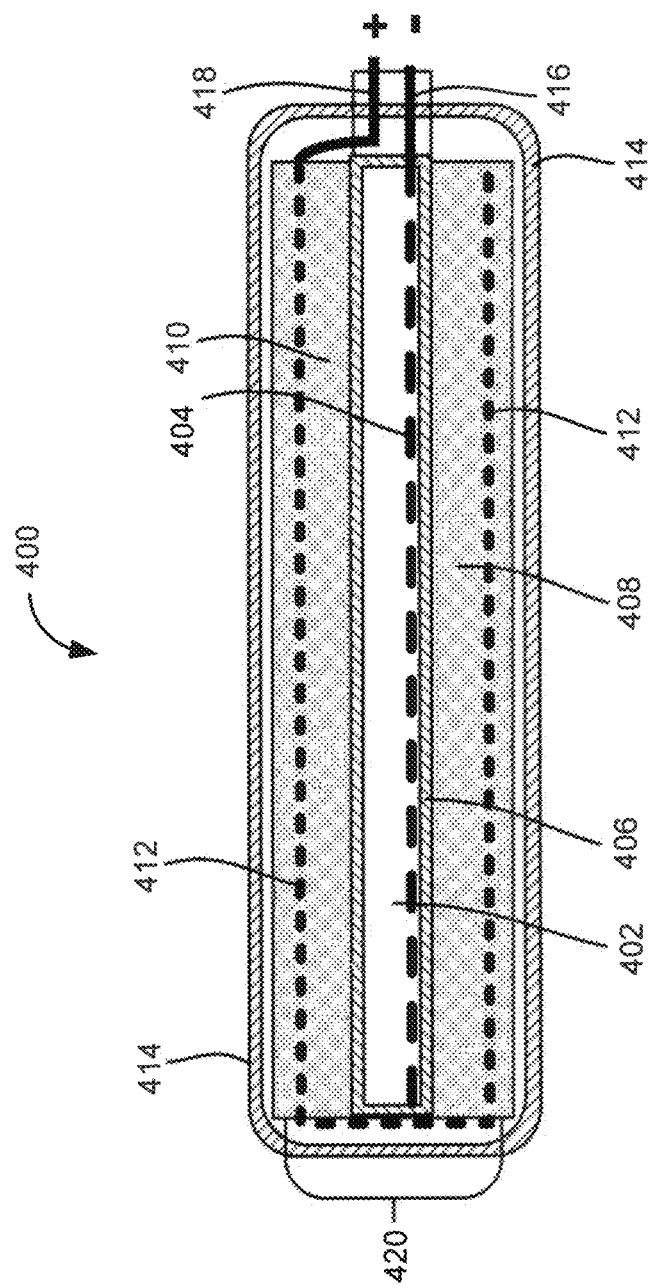
FIG. 4 is a schematic diagram of one embodiment of a double-sided pouch cell.

A double-sided pouch cell is characterized by the presence of two air electrodes with an anode disposed between the two air electrodes. FIG. 4 is a schematic diagram of one embodiment of a double-sided Li/air pouch cell battery 400. The cell 400 includes a lithium anode 402, an anode current collector 404, a separator 406, two air electrodes (cathodes) 408, 410, a cathode current collector 412, and an outer package 414. The outer package 414 is an oxygen-permeable membrane that completely, or substantially completely, encases the assembled anode 402, anode current collector 404, separator 406, air electrodes, 408, 410, and cathode current collector 412. The battery components are completely encased in the outer package 414, with the exception that one end 416 of the anode current collector 404 and one end 418 of the cathode current collector 412 extend through the outer package 414. The illustrated cathode current collector 412 is embedded within the air electrodes 408, 410. In other embodiments (not shown), the cathode current collector is in electrical contact with a surface of the air electrode. For example, the current collector may be disposed between the air electrode and the oxygen-permeable membrane.

Figure 5:
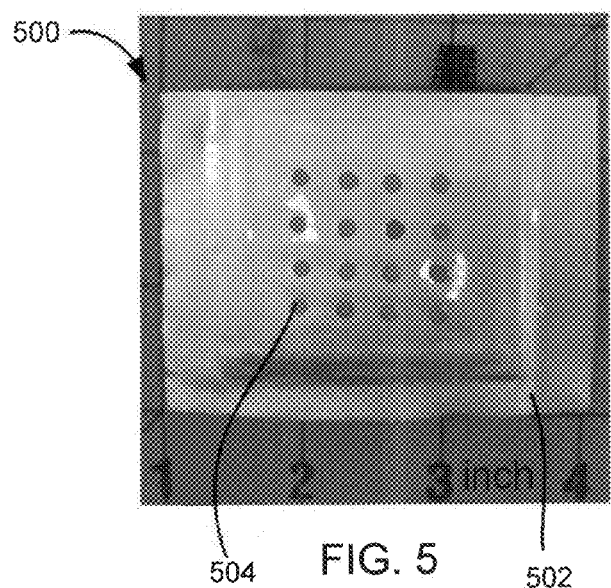
FIG. 5 is a photograph of one embodiment of a pouch cell having a single air electrode.

FIG. 5 shows a pouch cell 500 (4 cm×4 cm) similar in internal design to the disclosed coin cell and having only one air electrode. The pouch cell 500 includes an outer package 502. In some embodiments, the outer package 502 is a metal/polymer laminate. A series of holes 504 is cut into the front surface of the package 502 to allow $O_2$ to diffuse through an oxygen-permeable membrane (e.g., PTFE) underlying the holes 504 and react with lithium ions in the air electrode.

Figure 6:
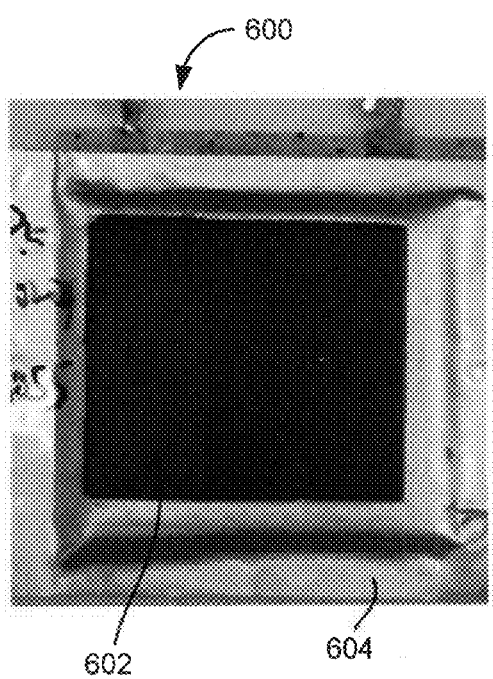
FIG. 6 is a photograph of one embodiment of a double-sided pouch cell laminated in a frame.

FIG. 6 is a photograph of another embodiment of a pouch cell 600. A high density polyethylene (HDPE) film 602 is laminated in a frame 604 made of metal/polymer laminate, e.g., an aluminum/polymer laminate (available from Nipon Inc., Japan). The cell 600 is a double-sided pouch cell (4 cm×4 cm) with two air electrodes and a polymer film window 602 on each side. The advantage of this embodiment is that an oxygen-permeable HDPE film can be heat-sealed effectively to the inner (polymer) layer of the metal/polymer laminate.

Figure 7:
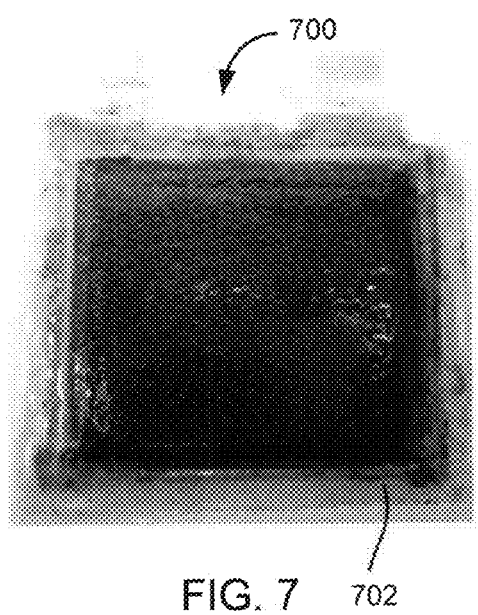
FIG. 7 is a photograph of one embodiment of a double-sided pouch cell without a frame.

In other embodiments, a heat-sealable polymer serves as both package and $O_2$-diffusion membrane, as shown in FIG. 7. The cell 700 is a double-sided pouch cell (4.6 cm×4.6 cm)

encased within a heat-sealable polymer membrane package 702. One advantage of this design is a reduced battery weight, which increases the specific capacity of the battery.

C. Hybrid Battery

Figure 8:
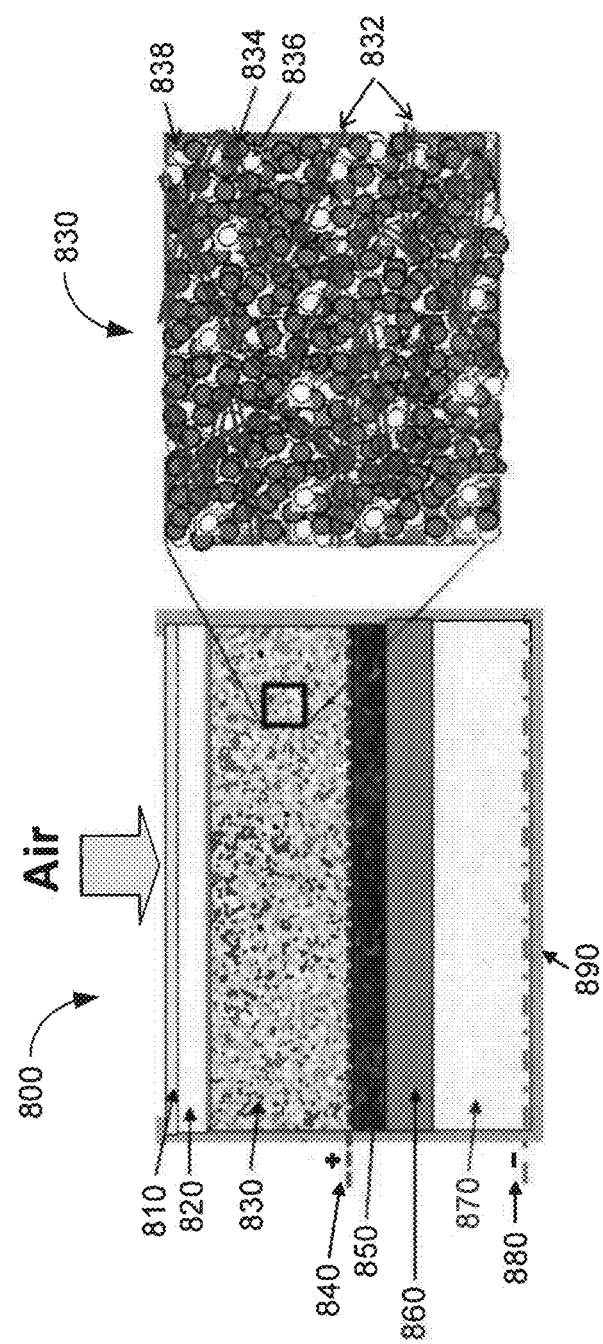
FIG. 8 is a schematic, cross-sectional diagram of one embodiment of a hybrid Li/air battery.

FIG. 8 illustrates one embodiment of the disclosed hybrid Li/air battery 800 having a relatively high power rate and discharge capacity. The battery 800 includes a gas diffusion membrane 810, a gas distribution membrane 820, a carbon-based air electrode 830, a cathode current collector 840, an ion insertion material 850, a separator 860, a lithium metal anode 870, an anode current collector 880, and an outer package 890. In certain embodiments, the battery 800 has a gas diffusion membrane 810 with selective oxygen permeability, which can minimize moisture diffusion and side reactions caused by the moisture. In particular embodiments, the addition of hydrophobic, porous fibers 832 to the air electrode 830 enhances oxygen diffusion rates inside the air electrode 830 and facilitates the utilization of thicker electrodes, thus increasing the specific energy of the Li/air battery 800. The air electrode 830 further comprises carbon 834, a binder 836, and an air-stable liquid electrolyte 838

The disclosed features combine synergistically to produce a Li/air battery with the advantages of both conventional metal/air batteries (high capacity) and lithium ion batteries (high discharge rate). For example, the selectively permeable diffusion membrane allows oxygen to diffuse into the cell while minimizing water diffusion into the cell. The reduced water diffusion extends the life of the battery by minimizing the reaction of water with the lithium anode. Oxygen diffusion into the air electrode is further facilitated by the hydrophobic, porous fibers. The increased diffusion allows the use of thicker electrodes and increases the specific energy of the battery. The hybrid electrode comprises an ion insertion material with a discharge rate more than double the discharge rates of typical air electrodes based on carbon only, which further increases the specific power of Li/air batteries. In particular embodiments, the carbon-based air electrode comprises carbon powder having a large mesopore volume of 4.8-5.1 $cm^3/1$ g carbon. Because the final $Li/O_2$ reaction occurs mainly in the mesopore spaces within the carbon particles, the high mesopore volume increases the battery's capacity. In some embodiments, the gas diffusion membrane and optional gas distribution membrane form the package material for the battery, thus substantially reducing the battery weight compared to conventional metal/air batteries, which increases the battery's specific energy and specific power. In certain embodiments, the gas distribution membrane is absent and the gas diffusion membrane itself forms the package material for the battery, further reducing the battery weight. The combination and sub-combinations of these features provide unexpectedly superior results achieved by the hybrid battery. The hybrid design described above can be applied to other metal/air batteries, such as Zn/air, Mg/air, and Al/air batteries.

IV. Battery Elements

Figure 44:
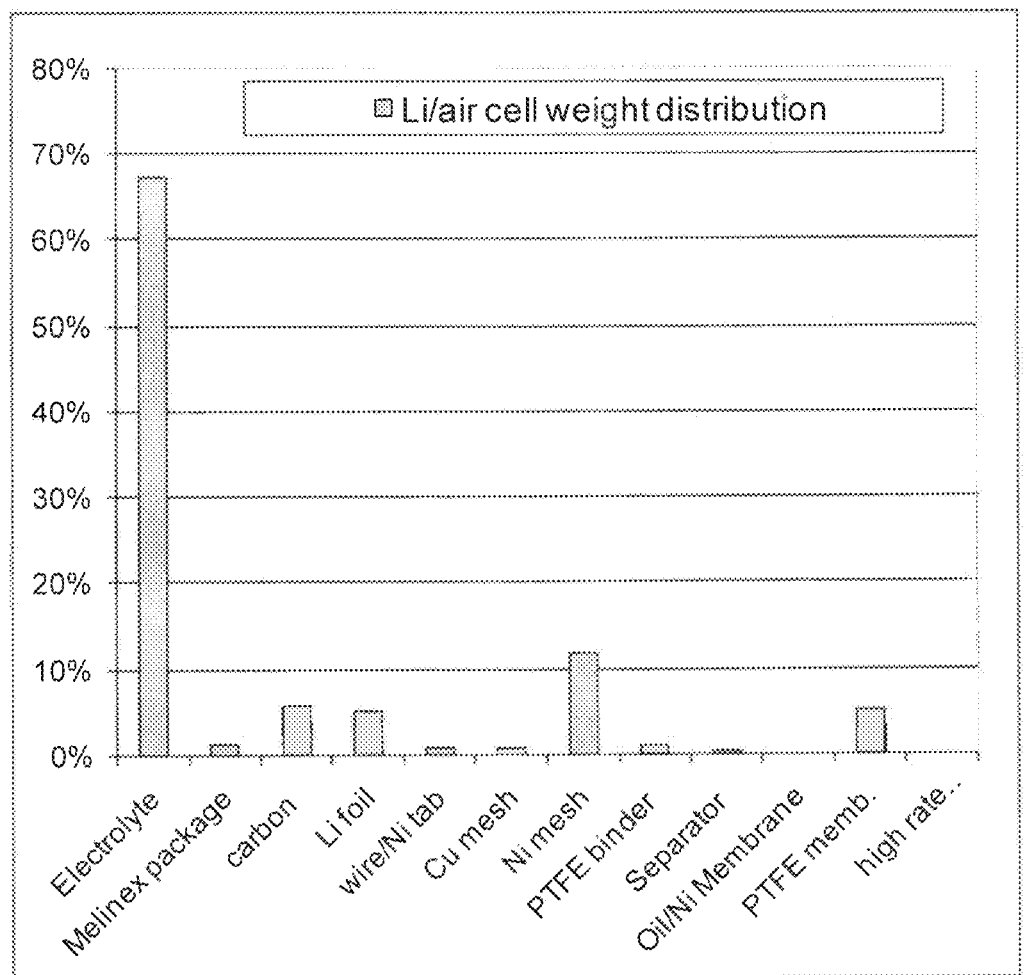
FIG. 44 is a bar graph illustrating the component weight distribution of one embodiment of a Li/air cell.

Battery component parameters and performance for one theoretical embodiment of a Li/air battery are simulated in Table 2. The weight distribution of the components is shown in Table 3 and illustrated in FIG. 44. The model describes the typical design parameters and the performance of one embodiment of a pouch cell.

TABLE 2

Simulation and Performance of Typical Li/air Batteries

| Component | Thickness (cm) | Density (g/cm$^3$) | Area Density (g/cm$^2$) |
|---|---|---|---|
| Anode: Li | 5.00E−02 | 0.531 | 0.0266 |
| Separator | 2.50E−03 | 0.500 | 0.0013 |
| Electrolyte | | 1.160 | 0.3417 |
| PTFE binder weight % | 15% | 2.160 | 0.0026 |
| carbon weight % | 85% | 2.250 | 0.0150 |
| Hybrid electrode (carbon/PTFE) | 7.00E−02 | 0.252 | 0.0176 |
| Anode current collector (Cu mesh) | 2.19E−03 | 8.710 | 0.0191 |
| Cathode current collector (Ni mesh) | 3.40E−03 | 8.824 | 0.0300 |
| Outer membrane package | 2.00E−03 | 1.350 | 0.0027 |
| PTFE membrane | 8.00E−03 | 1.675 | 0.0134 |

| Specifications | |
|---|---|
| Single side or double side | 2 |
| cell window/Li width (cm) | 4.60E+00 |
| cell window/Li length (cm) | 4.60E+00 |
| Dry air electrode porosity (%) | 88.7% |
| Separator (%) | 50% |
| Carbon mesopore volume (cm$^3$/g) | 4.95 |
| Mesopore expansion efficiency (%) | 100.0% |
| Electrolyte filling factor | 104% |
| Electrolyte volume (cm$^3$) | 6.23 |
| Electrolyte weight (g) | 7.23 |
| % of pore volume occupied by $Li_2O$ & $Li_2O_2$ | 12.0% |
| Li utilization (%) | 58.7% |
| Cell initial weight (g) | 10.765 |
| Cell thickness (cm) | 0.375 |
| Li/Cell window footprint (cm$^2$) | 21.2 |
| Cell volume (cm$^3$) | 7.928 |

| Cell Performance | |
|---|---|
| Capacity (Ah) | 1.27E+00 |
| Nominal voltage (V) | 2.67E+00 |
| Energy Density (Wh/l) | 4.290E+02 |
| Specific energy, initial (Wh/kg) | 3.16E+02 |

TABLE 3

Component Weight Distribution in a Typical Li/air Battery

| Component | Weight % | Weight (g) |
|---|---|---|
| Electrolyte | 67.16 | 7.230 |
| Outer package (MELINEX ®) | 1.27 | 0.137 |
| Carbon (in air electrode) | 5.90 | 0.635 |
| Lithium foil anode | 5.22 | 0.562 |
| binding tape/Ni tab | 0.93 | 0.100 |
| Anode current collector (Cu) | 0.93 | 0.100 |
| Cathode current collector (Ni) | 11.79 | 1.270 |
| PTFE binder (in air electrode) | 1.04 | 0.112 |
| Separator | 0.49 | 0.053 |
| PTFE membrane | 5.27 | 0.567 |
| Total | 100.00 | 10.765 |

A cross-sectional diagram of an exemplary double-sided pouch cell battery encased within a polymer membrane is shown in FIG. 4, as previously described. The battery 400 comprises an anode 402, an anode current collector 404, a separator 406, two air electrodes 408, 410, a cathode current collector 412, and an outer package 414. Each of these elements and their effects on battery performance are described in detail below.

A. Anode

In an exemplary embodiment, the anode 402 is lithium foil with a thickness of 0.5 mm. An anode current collector 404 (e.g., copper mesh) is pressed into the lithium foil anode 402. One end, or tab, 416 of the cathode current collector 404 extends through the separator 406 and the package 414 to outside the cell 400 to make electrical contact. Tab 416 may be 3-5 mm wide and 1 cm long.

B. Separator

The anode 402 and anode current collector 404 are substantially encased within, and in physical contact with, a membrane separator 406. One suitable membrane is CELGARD® 5550, available from Celgard LLC, Charlotte, N.C. The CELGARD® 5550 membrane is a monolayer polypropylene membrane with 25 μm pores, laminated to a polypropylene nonwoven fabric and surfactant-coated. In some embodiments, the CELGARD® membrane separator is coated with poly(vinylidene fluoride) before it is applied to the anode. One end 416 of the anode current collector 404 extends through the separator 406 to outside the cell 400. In other embodiments, a heat-sealable separator (T100-30, Policell Technologies, Inc., Metuchen, N.J.) is used between the air electrode and the lithium foil anode to improve interface contact. The heat-sealable membrane separator binds to both the air electrode and lithium foil at 100° C. and 500 psi. Other suitable separators include, but are not limited to, a porous monolayer/multilayer polypropylene membrane, a porous monolayer/multilayer polyethylene membrane, a porous multilayer polypropylene and polyethylene membrane, a porous monolayer polypropylene membrane laminated to a polypropylene nonwoven fabric, glass microfiber filters, and other membranes used in metal/air batteries or lithium ion batteries. Specific examples include WHATMAN® GF/D glass microfiber filter, CELGARD® A273, CELGARD® D335, CELGARD® 2500, CELGARD® 3559, CELGARD® 3401, CELGARD® 3501, CELGARD® 2400, CELGARD® 4550, SCIMAT® S450, and SCIMAT® 400.

C. Carbon-Based Air Electrodes

With continued reference to FIG. 4, two carbon-based air electrodes 408, 410 (e.g., 0.7 mm thick) are positioned in contact with the separator 406. Scientifically speaking, oxygen itself is considered to be the cathode in a lithium/air battery. Hence the carbon-based electrode is termed an air electrode rather than a cathode. A cathode current collector 412 is embedded within each carbon-based air electrode 408, 410. Cathode current collector 412 typically is a porous structure, such as a mesh, to allow passage of oxygen through the current collector. One end, or tab, 418 of the cathode current collector 412 extends through the package 414 to outside the cell 400 to make electrical contact. Tab 418 may be 3-5 mm wide and 1 cm long.

In some embodiments, two carbon/binder films are formed and adhered to a first side and a second side of the cathode current collector to form a carbon-based air electrode having an embedded current collector. In certain embodiments, a film comprising carbon and a binder is adhered to a first side of the cathode current collector, and a film comprising an ion insertion material is adhered to a second side of the cathode current collector. In other embodiments, a single carbon/binder film is formed and adhered to a first side of the cathode current collector. However, such an electrode typically is not flat due to the different bending forces of the metal mesh and carbon film. If the current collector is embedded between two similar carbon films, however, the electrode will lay flat because the bending forces of the two carbon films cancel each other.

1. Carbon

Carbon-based air electrodes as disclosed herein typically comprise activated carbon mixed with a binder (e.g., polytetrafluoroethylene (PTFE)). Examples of suitable carbons include DARCO® G60 (available from Sigma-Aldrich, St. Louis, Mo.), Calgon carbon (available from Calgon Carbon Corporation, Pittsburgh, Pa.), SUPER P® (available from TIMCAL America, Inc., Westlake, Ohio), acetylene black, and the high-efficiency, electroconductive KETJENBLACK® EC-600JD and KETJENBLACK® EC-300J (both from Akzo Nobel Polymer Chemicals, Chicago, Ill.). Carbon with a pore volume of 0.5 to 10 $cm^3/g$ is suitable for the carbon-based electrodes.

KETJENBLACK® EC-600JD has a very large pore volume (4.8-5.1 $cm^3/g$). The high mesopore volume makes this carbon an excellent air electrode candidate for Li/air batteries. In particular embodiments, 0.7-mm thick KETJENBLACK® (KB) carbon-based electrodes are used. In some embodiments, the carbon electrode composition is 85% KB/15% PTFE binder (DuPont™ TEFLON® TE-3859).

2. Cathode Current Collector

Suitable cathode current collectors include nickel mesh, aluminum mesh, and nickel-coated aluminum mesh. In some embodiments, nickel foam is used to hold more electrolyte volume. Instead of pressing a carbon film onto a nickel mesh current collector, a nickel foam disk is impregnated with a carbon slurry. Because nickel has a known catalyst effect on promoting the Li/oxygen reaction but is heavier than aluminum, nickel-coated aluminum mesh can be used as a low-weight current collector that still has good catalyst capability. The thickness of nickel coating on aluminum mesh can vary from 0.1 □M to 10 □m.

3. Air Electrode Preparation

An aqueous carbon slurry is prepared and mixed with a binder, e.g., polytetrafluoroethylene (PTFE). In some embodiments, the carbon is coated with a catalyst before mixing with the binder. The catalyst promotes oxygen reduction and the lithium/oxygen reaction, and increases the cell capacity. For example, manganese oxide ($MnO_x$) may be added to the carbon slurry. The mixture of carbon, binder, and catalyst (if included) is then dried and calendered to produce a film.

A cathode current collector is prepared by applying a conductive coating to metal mesh, e.g., nickel mesh, and then drying the coated mesh. One suitable conductive coating is Acheson EB-020A (available from Acheson Colloids Company, Port Huron, Mich.), which can be applied by spraying. The coated cathode current collector is then embedded in the carbon film. The current collector may be embedded, for example, by placing a carbon film on the current collector or placing the current collector between two carbon films, and then passing the carbon film(s) and current collector through rollers to laminate the layers together.

When preparing the carbon-based air electrode, the specific capacity per unit weight of carbon depends at least in part on the carbon loading, i.e., the mass of carbon per unit area of the electrode. Generally, the specific capacity per unit weight of carbon decreases with increasing carbon loading because oxygen permeation throughout the carbon can become blocked by the formation of $Li_2O$ or $Li_2O_2$ along the diffusion path.

Although very high capacities may be obtained at very low carbon loadings in the air electrode, the specific capacity (mAh/g carbon) often drops significantly with increased carbon loading or thickness of the electrode because oxygen permeation is hindered in the dense carbon layer by the formation of $Li_2O$ and/or $Li_2O_2$ along the diffusion path. The most advantageous carbon loading or thickness depends in part on the specific carbon used. Furthermore, in a practical Li/air battery, the specific capacity/g carbon is not an ideal indicator of battery performance if the carbon loading per unit area is small because inactive materials occupy a large portion of the battery.

A more appropriate parameter is the area-specific capacity of the electrode, i.e., mAh/cm². The specific capacity of the Li/air battery is proportional to the area-specific capacity of the electrode. This is because the operation of Li/air battery relies on absorption of oxygen from the environment, and oxygen absorption is directly proportional to the surface area of Li/air batteries. Therefore, area-specific capacity is a more relevant value to be optimized. The area-specific capacity does not have a linear relationship with the carbon loading. Instead, area-specific capacity increases to a maximum as the carbon loading increases and then falls with further increased carbon loading as oxygen diffusion through the dense carbon layer is reduced. In a working example, although the specific capacity (mAh/g carbon) decreased monotonically with carbon loading (mg/cm²), the area-specific capacity showed a maximum value of 13.1 mAh/cm² at a carbon loading of 15.1 mg/cm².

The capacity of a carbon-based air electrode increases with the mesopore volume of the carbon, which is related to intra-particle volume or volume of the mesopores within the particle. In contrast, the capacity is not very sensitive to the bulk porosity of carbon electrode, which is related to the inter-particle volume. $O_2$ and lithium ions are transported through inter-particle spaces (i.e., transport is through the bulk porosity of electrode), but the final $Li/O_2$ reaction occurs mainly in the mesopore spaces within the carbon particles.

KETJENBLACK® EC-600JD (KB) carbon has a much higher mesopore volume (4.80-5.10 cm³/g) than other commercially available activated carbons. Therefore, KB-based air electrodes as disclosed herein have a higher capacity than cathodes made with other carbon materials, making KB an excellent air electrode candidate for Li/air batteries.

KB expands significantly (e.g., more than 100%) after soaking in electrolyte. After soaking in liquid electrolyte, the mesopores fully expand and form a three-phase region to facilitate the $Li/O_2$ reaction. Reaction products (e.g., $Li_2O$, $Li_2O_2$) partially occupy these spaces after reaction.

In some working embodiments, air electrodes were prepared by mixing high-efficiency electroconductive carbon KETJENBLACK® EC600JD with Dupont Teflon® PTFE-TE3859 fluoropolymer resin aqueous dispersion (60 wt % solids). The weight ratio of KB and PTFE after drying was 85:15. The mixture was laminated into a carbon film using a calendering roller with adjustable pressure from 0 to 100 psi. Nickel mesh was embedded into the carbon layer as the current collector. To minimize moisture penetration, a porous PTFE film (3 □m thick, W. L. Gore & Associates, Inc) was laminated on the side of the air electrode that was exposed to air.

4. Ion Insertion Material

In some embodiments, a hybrid electrode is constructed wherein the air electrode further comprises a lithium ion insertion (or intercalation) material. For example, carbon fluoride facilitates the intercalation of lithium ions into the electrode (i.e., lithium intercalates into $CF_x$ and forms $Li_y$-$CF_x$. The discharge voltage range of the lithium insertion material desirably is between 1.0 V to 3.5 V vs. Li/Li⁺. For instance, vanadium pentoxide ($V_2O_5$) has discharge plateaus at 3.3 V, 3.0 V, and 2.2 V. Preferably, the majority of the discharge voltage of the material is 2 V to 3 V. More preferably, the lithium ion insertion material has a voltage plateau between 2 V to 2.8 V. Carbon fluoride, for example, has a voltage plateau at 2.5 V.

The ion insertion material desirably has a high discharge capacity at a high rate. Typically, discharge capacity decreases as the discharge rate increases. However, the addition of an ion insertion material may increase the discharge capacity at the same rate or allow the battery to be discharged at a higher rate with a comparable capacity. In some embodiments, the presence of an ion insertion material in the air electrode was found to more than double the discharge capacity compared to an air electrode without the ion insertion material that was discharged at the same rate. In other embodiments, the battery including the ion insertion material was discharged at a current density of 0.2 mA/cm² with a similar capacity as a battery without the ion insertion material that was discharged at a current density of 0.1 mA/cm².

For the disclosed primary Li/air batteries, no reversibility is required for the ion insertion material. For rechargeable Li/air batteries, the ion insertion process in the material will be reversible.

These materials can be any lithium insertion or intercalation compounds. Examples of ion insertion materials include, but are not limited to the following materials: ($CF_x$ (0.5<x<2), $Cu_4O(PO_4)_2$, $AgV_2O_{5.5}$, $Ag_2CrO_4$, $V_2O_5$, $V_6O_{13}$, $V_3O_8$, $VO_2$, $VO_x$ (0.1<x<3), $Cr_2O_5$, $Cr_3O_8$, $MnO_2$, $MnO_x$ (1<x<3), Mn-based oxide polymer, quinone polymer, $MoO_3$, $MoO_x$ (1<x<3), $TiO_2$, $TiO_x$ (1<x<3), $Li_4Ti_5O_{12}$, S, $Li_xS$ (0<x<2), and $TiS_2$. Mixtures of these materials can also be used.

In the disclosed embodiments, the mass ratio of the lithium insertion material to active carbon in air electrode (composed of active carbon, catalyst, and binder) is less than or equal to 2, such as 0.1 to 2, 0.1 to 1, 0.2 to 0.8, or 0.1 to 0.3. Advantageously, the mass ratio of the lithium insertion material to active carbon is 0.2 to 0.8. A higher ratio will give the battery a higher discharge rate, but a relatively smaller discharge capacity. A lower ratio will give the battery a higher capacity, but a lower discharge rate. In particular examples, the cathode comprises 55 wt % KB, 30 wt % ion insertion material, and 15 wt % PTFE binder.

In some embodiments, the ion insertion material(s) are mixed with the active carbon and binder to prepare a uniform electrode. In other embodiments, the ion insertion material and the air reaction material (active carbon and/or other air electrode material) can be prepared as separate films, and then laminated together as a monolithic electrode. For example, the air electrode may be a 3-layered laminated structure comprising a first film layer of active carbon, wherein the first film layer does not include an ion insertion material, a second film layer comprising an ion insertion material, and a current collector. The ion insertion layer can be laminated to the back (facing the lithium metal anode) of the air electrode, to the front (the air inlet side) of the air electrode or in the middle of the air electrode (between the active carbon layer and the current collector). Preferably, the ion insertion layer is laminated to the back (facing the lithium metal anode) of the air electrode to minimize interference with oxygen flow in the air electrode.

When the battery current density is low (such as less than 0.1 mA/cm²), the discharge process in the battery is dominated by the reaction between lithium and oxygen as shown in equations (1) or (2), assuming that the major discharge plateau of the ion insertion material/materials is at a voltage below 2.8 V:

$$4Li + O_2 \rightarrow 2Li_2O \quad E^0 = 3.05\ V \quad (1)$$

$$2Li + O_2 \rightarrow Li_2O_2 \quad E^0 = 2.96\ V \quad (2)$$

For a battery operated at high oxygen pressure (greater than 1 atm), $Li_2O_2$ is the dominant reaction product. For a battery operated at low oxygen partial pressure (approximately 0.21 atm), $Li_2O$ is the dominant reaction product. The typical operating voltage of the disclosed Li/air batteries is 2.8 V at low current densities (such as 0.05 $mA/cm^2$. In this case, the ion insertion material (with a nominal discharge voltage of less than 2.8 V) does not participate in the normal operation of the battery. However, when the battery current density is larger (such as larger than 0.05 $mA/cm^2$), not enough oxygen can get into the battery to react with lithium and provide the required current. The battery then operates in an oxygen-starved condition, and the battery voltage drops quickly. Once the battery operating voltage drops to less than the nominal operating voltage of the ion insertion material, ions will be inserted into the ion insertion material, which has a much higher discharge rate than regular lithium/air batteries. The process of ion insertion/intercalation produces a second voltage plateau. For example, if the ion insertion material is CFx, the intercalation reaction produces a voltage of 2.5 V.

For example, a carbon-based air electrode may have an area-specific capacity of 50 $mAh/cm^2$ at a current density of 0.05 $mA/cm^2$. A current density of 0.05 $mA/cm^2$ corresponds to a rate of 0.001 C (a 1 C rate means the total battery capacity can be discharged in one hour). If the ion insertion material has a capacity of 300 mAh/g at 1 C rate and an area density of 0.06 $g/cm^2$ (e.g., 3 $g/cm^3$*0.02 cm thick), then the current density of the ion insertion materials will be 18 $mA/cm^2$ (300 $mAh/g$*0.06 $g/cm^2$/1 h) at 1 C rate. Compared with the limited current density of 0.05 $mA/cm^2$ provided by the $Li/O_2$ reaction, the predominant capacity of the battery during the high-rate discharge is due to the ion insertion material. If the ion insertion material can be discharged at a 2 C rate with a similar capacity, then the current density of the battery can be as high as 36 $mA/cm^2$.

Some ion insertion materials have an initial voltage higher than 3 V, but the majority of the discharge region is below 2.8 V. A small amount of this ion insertion material may participate in the initial discharge of the battery at low discharge rates, but the majority of this ion insertion material still functions as a high-rate back-up power source for the battery.

5. Hollow Fibers

In some embodiments, the air electrode further comprises hydrophobic hollow fibers. FIG. 8 illustrates one embodiment of a lithium/air battery 800 having an air electrode 830 comprising hollow fibers 832. The air electrode 830 further includes carbon 834, a binder 836, and an air-stable liquid electrolyte 838. A hydrophobic fiber tends to generate a space between itself and the electrolyte. These spaces facilitate $O_2$ diffusion in the air electrode, enabling a thicker electrode to be used. Typically carbon-based air electrodes are 0.5-0.7 mm thick. Addition of hydrophobic fibers allows use of electrodes that are at least 1 mm thick. Suitable fibers include DuPont HOLLOFIL® (100% polyester fiber with one more holes in the core), goose down (very small, extremely light down found next to the skin of geese), PTFE fiber, and woven hollow fiber cloth, among others. KETJENBLACK® carbon can also be coated on these fibers.

D. Electrolyte

With reference to FIG. 4, the air electrodes 408, 410, cathode current collector 414, separator 406, anode 402, and anode current collector 404 collectively form a "dry cell stack" 420. The dry cell stacks 420 are soaked in an electrolyte solution.

1. Electrolyte Solution

Both aqueous- and non-aqueous-based Li/air batteries utilize an air electrode soaked with electrolyte. This electrode can provide 3-phase reaction sites and hold reaction products.

The electrolyte solution may comprise a lithium salt dissolved in a solvent. The electrolyte solution wets and expands the carbon mesopores, provides $Li^+$ ions for the reaction with oxygen, dissolves oxygen that diffuses through the outer membrane, carries the dissolved oxygen to the mesopores in which the reaction between lithium and oxygen takes place, and provides ionic conductivity between anode and cathode. Some electrolytes also dissolve $Li_2O/Li_2O_2$, which can further increase the capacity of Li/air batteries.

In certain disclosed embodiments, the lithium salt is lithium hexafluorophosphate, lithium bis(trifluoromethanesulfonyl) imide (LiTFSI), lithium perchlorate, lithium bromide, lithium trifluoromethanesulfonate, lithium tetrafluoroborate, or a mixture thereof. The lithium salt may be present in the electrolyte in a concentration of 3-30% (w/w), such as a concentration of 5-25% (w/w), or 10-20% (w/w).

A solvent that is capable of dissolving the lithium salt is employed. Desirably, the solvent has relatively high oxygen solubility, low viscosity, high conductivity, and low vapor pressure. The solvent may be aqueous or non-aqueous.

In particular disclosed embodiments, the solvent comprises one or more organic liquids selected from ethylene carbonate (EC), propylene carbonate (PC), dimethyl ether (DME), and mixtures thereof. In one embodiment, the electrolyte solvent is DME. In other embodiments, the electrolyte solvent is PC/EC (1:1 wt) or PC/DME (1:1 wt).

In some embodiments, the solvent is aqueous. In particular, a 4-7 M aqueous solution of LiOH can be used as an electrolyte in lithium/air batteries if the lithium metal electrode can be protected by a water-impermeable glass. In Zn/air batteries, a 5-7 M aqueous solution of KOH is suitable. In this case, the $OH^-$ ions conduct the charge through the separator between the anode and cathode.

In some embodiments, the electrolyte solution further includes an additive or co-solvent to increase the cell capacity and specific energy of the battery. Suitable additives or co-solvents include crown ethers, such as 12-crown-4, and 15-crown-5, which, at certain concentrations, improve the cell capacity and specific energy of Li/air batteries. The crown ether may be present in the electrolyte at a concentration of up to 30% by weight, such as 10-20% or 12-18% by weight.

2. Electrolyte Amount

It was discovered that the disclosed embodiments of air electrodes comprising high-efficiency carbon (i.e., KETJENBLACK® EC-600JD) expand significantly (greater than 100%) after soaking in electrolyte. This expansion significantly increases the amount of electrolyte used in Li/air batteries. This phenomenon for the KETJENBLACK® EC-600JD carbon air electrode is different from air electrodes comprising Darco® G-60 activated carbon, which has a much smaller volume of mesopores and expands less when soaked in liquid electrolyte. However, Darco® G-60 also holds less reaction product and has less capacity because it expands less.

The inventors developed several procedures to reduce the electrolyte amount, which both increases the specific energy of the batteries and reduces their weight. For example, binding or wrapping the dry cell stack with thread before soaking it in electrolyte reduces the amount of electrolyte in the fully soaked cell. Therefore, compacting the dry cells before electrolyte soaking is an effective approach to reduce the electrolyte amount in a fully-soaked cell. Full soaking is preferable, however, as partially soaked cells may have some dead volume in the air electrode, leading to poor contact between the electrode and the separator. If compactness of the cells is maintained during and after soaking, the amount of electrolyte required to reach all of the cell components can be reduced without loss of good contact between layers.

It was discovered that the electrolyte amount could be reduced by using hybrid KETJENBLACK® EC-600JD carbon/carbon fluoride electrodes, in which some of the KETJENBLACK® EC-600JD carbon is replaced by $CF_x$. One advantage of using $CF_x$ in the hybrid electrode is that the amount of electrolyte absorbed by the cell is reduced without negatively affecting the cell's performance. Because reducing the amount of electrolyte reduces the overall mass of the pouch cell, the specific energy of the cell is increased. For example, when the electrode comprises 55% KETJENBLACK® EC-600JD carbon and 30% $CF_x$, the overall mass of the cell is reduced 20% compared to a cell having an air electrode comprising 85% KETJENBLACK® carbon.

One novel method to reduce the electrolyte amount is to mix a high vapor pressure solvent, such as DME, with a low vapor pressure electrolyte (e.g., 1M LiTFSI in PC:EC) to fully soak the electrode, and then pump out DME in a vacuum chamber to leave PC:EC in the cell. In some embodiments, DME is added to the electrolyte to an initial concentration of 1-50 wt %, 5-30 wt %, or 15-25 wt %. After evacuation, the DME remaining in the electrolyte is less than 10 wt %, less than 5 wt %, or less than 3 wt %. This procedure not only fully soaks the electrode, but also generates open channels in the electrode to facilitate $O_2$ transport.

With high vapor pressure solvents, however, the package material should be relatively nonporous to prevent evaporation of the solvent. For example, MELINEX® 301H allows the use of electrolytes with larger vapor pressure (e.g., DME) than those used in coin cells with PTFE membranes. PTFE is more porous than MELINEX® 301H and allows DME to easily evaporate. Other membranes, such as a polyethylene membrane or a polyethylene terephthalate membrane, also may be suitable for electrolytes with high vapor pressures.

3. Electrolyte Contact Angle

The polarity of a solvent is reflected by its dielectric constant ($\in$), and a higher dielectric constant means higher polarity. As is known from the literature, ethers and glymes have dielectric constants less than 10. For example, $\in=7.7$ at 20° C. for DME, while cyclic carbonate esters have dielectric constants higher than 60 ($\in=90.5$ at 40° C. for EC, and $\in=66.3$ at 20° C. for PC). The dielectric constant of a binary solvent mixture is located in between those of the two solvents and is also dependent on the ratios of the two solvents. A higher percentage of the solvent with the higher dielectric constant will lead to a higher dielectric constant for the mixture. In some embodiments, the electrolyte includes an aprotic organic solvent or a mixture of aprotic organic solvents, wherein the dielectric constant of the solvent or solvent mixture is greater than 10, or greater than 20. In the case of a solvent mixture, the ratio of solvents in the mixture may be adjusted to vary the dielectric constant as described above.

The dielectric constant of a solvent affects its surface tension on a solid substrate. In turn, the wetting ability of the liquid to the solid can be determined by the contact angle between the liquid and solid. Larger differences between the dielectric constants of the liquid and the solid cause higher surface tension between them, resulting in a larger contact angle of the liquid on the surface of the solid. With a larger contact angle, it is more difficult for the liquid to wet the solid. On the other hand, a smaller difference between the dielectric constants of the liquid and the solid causes less surface tension between them and lowers the contact angle of the liquid on the surface of the solid. Thus, the liquid wets the solid more easily. By measuring the contact angles of the electrolytes on the surface of the carbon side of the air electrode, the wetting conditions of the electrolytes to the air electrode can be determined, which will help interpret the effect of solvent polarity on the discharge performance of Li/air batteries containing different electrolytes.

The contact angle can be measured by any suitable method known to a person skilled in the art. Typically, the contact angle is measured with a goniometer. A common method is the static sessile drop method in which the contact angle is measured by a contact angle goniometer using an optical subsystem to capture the profile of a liquid on a solid substrate. The optical subsystem may be a microscope optical system with a backlight, or it may employ high-resolution cameras and software to image and analyze the contact angle. One suitable goniometer is an NRL C. A. Goniometer, model no. 100-00-115 (Ramé-hart Instrument Co., Netcong, N.J.). Other standard methods also may be used.

The Li/oxygen reaction occurs in 3-phase regions in the electrode where gas (which provides oxygen), liquid (which provides lithium ions), and solid (which provides an active surface) meet. An electrolyte which cannot easily wet the air electrode is desired as such electrolytes provide more 3-phase regions in the electrode and hence more reaction sites. The wettability of a liquid (such as electrolyte) to solid materials (such as the air electrode) can be measured by the contact angle between the liquid and the solid. A larger contact angle means that the electrolyte cannot easily wet the air electrode and will generate more 3-phase regions. On the other hand, a fully wetted or flooded electrode will have fewer 3-phase regions, and therefore a smaller discharge capacity. A contact angle between the electrolyte and the air electrode surface of larger than 30 degrees, such as larger than 40 degrees is desired. In certain embodiments, the contact angle is between 20° and 70°, between 30° and 60°, or between 40° and 50°.

The air electrode is prepared with activated carbon, which has low polarity and is slightly hydrophobic. Electrolytes based on ethers or glymes have a low contact angle at the carbon surface, indicating these electrolytes also have low polarity, and can easily wet the low-polarity carbon surface of the air electrode. On the other hand, the air electrode is also highly porous. Thus the electrolytes with a low contact angle also will quickly enter the inner pores of the air electrode and may fill all of the pores.

It is known that $O_2$ reduction in the air electrode occurs in the tri-phase regions where the gas (i.e., $O_2$), liquid (i.e., electrolyte) and solid (i.e., carbon and catalyst) co-exist. Therefore, if the electrolyte easily floods all of the pores inside the air electrode, it can block the air pathways. This is the case for the electrolytes based on ethers and glymes. In such instances, the amount of the gas/liquid/solid tri-phase regions mainly depends on the $O_2$ amount and $O_2$ diffusivity in the electrolyte. The $O_2$ amount is determined by the $O_2$ solubility and the $O_2$ diffusivity depends on the electrolyte viscosity. Normally a low-polarity electrolyte with higher $O_2$ solubility and lower viscosity will lead to higher discharge capacity.

On the other hand, the high contact angle of electrolytes based on cyclic carbonates (e.g., EC and PC) at the carbon surface indicates that such electrolytes have high polarity and cannot easily wet the carbon surface. These electrolytes hardly fill the pores inside the air electrode. Thus, there are plenty of gaps or spaces between the liquid electrolyte and the solid carbon for $O_2$ to pass through from the surface of the air electrode to the inner side, i.e., there are lots of tri-phase regions inside the air electrode. As a result, the $O_2$ solubility in these electrolytes and the electrolyte viscosity are less critical to achieve a high discharge capacity, at least at low current densities used in the current work. For these high-polarity electrolytes, the larger the contact angle of the electrolyte, i.e., the higher polarity of the electrolyte, the higher discharge capacity the battery can achieve. In particular embodiments, the dielectric constant of the electrolyte solvent or solvent mixture is greater than 10, and the contact angle between the electrolyte and the carbon surface is between 30° and 60°.

E. Membrane/Outer Package

In some embodiments, a hydrophobic polymer-based membrane with low permeability is used with pouch cell Li/air batteries operated in an ambient environment. Although these membranes may have no significant $O_2$ selectivity, the thickness of this low-permeable membrane can be adjusted to provide appropriate $O_2$ permeability and allow Li/air batteries to operate for long time at different discharge rates. In certain embodiments, the high-rate operation of batteries is facilitated by addition of a high-rate lithium ion intercalation material (such as CFO in the air electrode.

With reference to FIG. 4, electrode stacks soaked with electrolyte are heat sealed in an oxygen-permeable polymer membrane 414 to form the disclosed pouch-cell batteries. The heat-sealed polymer membrane 414 can be used as both an outer package and an oxygen-diffusion membrane for long-term ambient operation (e.g., more than 30 days) of Li/air pouch-cell batteries. The membrane also functions as a moisture and electrolyte barrier by minimizing absorption of water from the atmosphere into the cell and evaporation of electrolyte from the cell to the atmosphere. Membrane thicknesses ranging from 5 μm to 200 μm can be used, depending on the membrane material. In some embodiments, a membrane thickness of 48 gauge to 240 gauge (0.5 mil to 2.5 mil, or 12 μm to 61 μm) is used. In certain working embodiments, a 0.8 mil (20 μm) thick polymer membrane (MELINEX® 301H) was used. In certain embodiments, the weight of the polymer membrane package 414 is 1% to 20% of the total cell weight, 1% to 5% of the total cell weight, or 1% to 3% of the total cell weight. Advantageously, the membrane weight is less than 10%, less than 5%, or less than 2% of the total cell weight. The total battery weight includes the masses of the anode, anode current collector, separator, cathode, cathode current collector, electrolyte, and package/diffusion membrane (polymer or ceramic).

If the electrolyte is not very sensitive to moisture and has a minimal evaporation rate, a membrane (polymer, ceramic or other material) with no significant $O_2$/water vapor selectivity can be utilized. In other embodiments, however, the membrane is an oxygen-selective membrane through which oxygen passes more readily than other molecules such as water. For example, a polymer or other barrier film may be selected that allows a sufficient amount of $O_2$ to diffuse into the Li/air battery and enable the battery to be discharged, but only allows a minimum amount of water vapor to diffuse into the battery. Ideally, an oxygen/water selective membrane with a selectivity ratio of $O_2$:water vapor greater than 3:1 is preferred. A membrane with a maximum oxygen diffusion rate and minimum moisture diffusion rate is preferred. A selective membrane with significant selectivity for oxygen over water (e.g., $O_2$:$H_2O$ greater than 10:1) limits moisture diffusion into the battery but allows enough oxygen to diffuse into the battery, e.g., sufficient oxygen to allow the battery to function as a lithium/air battery. Oxygen-selective membranes can be prepared, for example, by soaking a porous membrane with suitable polymeric perfluoro compounds, including perfluoropolyalkylenes such as polyperfluoropropylene oxide co-perfluoroformaldehyde (see, e.g., U.S. Pat. No. 5,985,475).

The $O_2$ diffusion rate of the membrane determines the allowable discharge rate of the battery because current density is directly proportional to the amount of oxygen needed to power the battery. The water vapor diffusion rate of the membrane affects the operating lifetime of the battery (assuming that the battery will fail when 20% of the lithium metal has reacted with water vapor).

Figure 9:
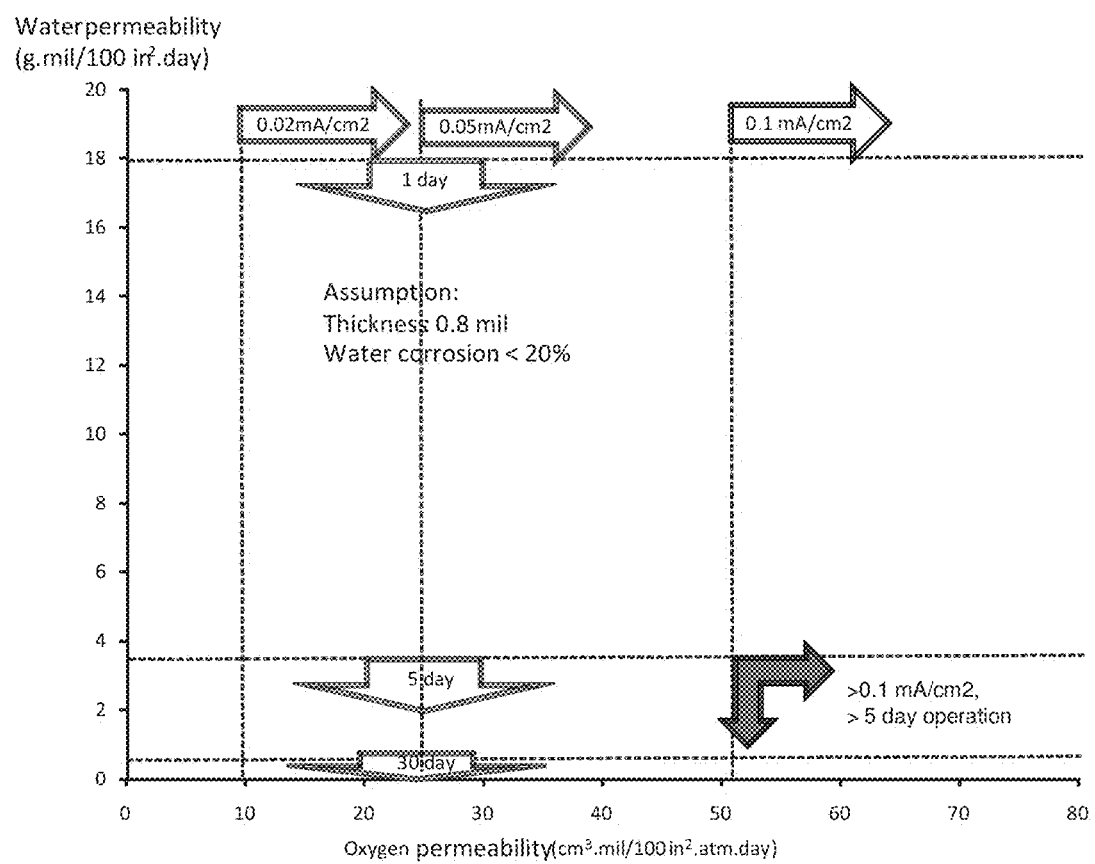
FIG. 9 is a graph of maximum water permeability and minimum oxygen permeability for membranes used with lithium electrodes at various current densities.
Figure 10A:
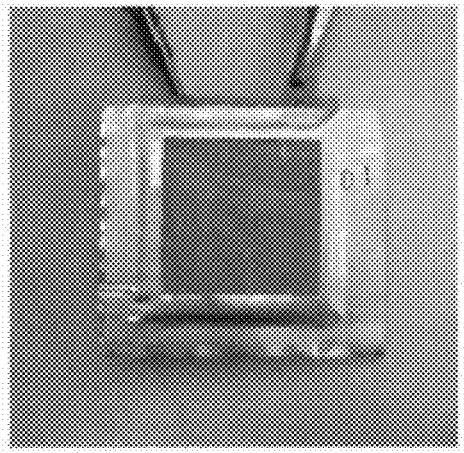
FIGS. 10A-10D are a series of photographs of embodiments of Li/air pouch cells.
Figure 10B:
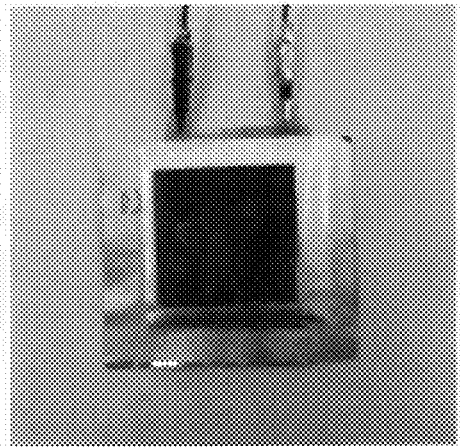
Figure 10C:
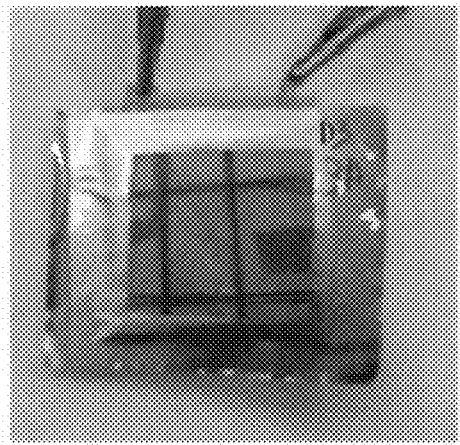
Figure 10D:
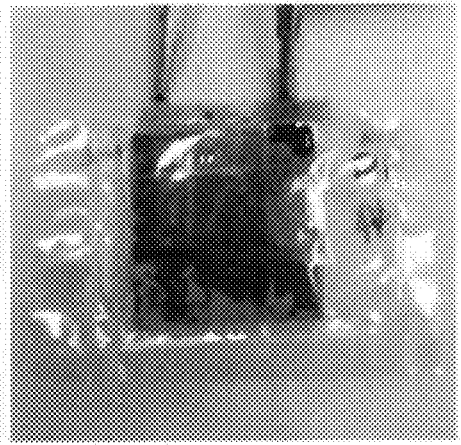

FIG. 9 shows the relationship between the membrane properties and the operation time of one embodiment of a Li/air cell having a lithium metal anode with a thickness of 0.5 mm. The selection of the membrane is determined by the desired battery performance. The values in FIG. 9 assume that the membrane has no selectivity and that reaction of 20% of the lithium metal with moisture will lead to cell failure. These calculated values are based upon equations known to a person of ordinary skill in the art. As the current density increases, the minimum oxygen permeability of the membrane required for battery operation also increases. As the desired operation time increases, the maximum water permeability of the membrane decreases to avoid premature cell failure from reaction of the lithium anode with moisture.

For example, if to operate a Li/air battery at a discharge rate of $0.05$ mA/cm$^2$ and an operational lifetime of 30 days under ambient conditions, then the preferred oxygen permeability of the membrane (assuming a thickness of 0.8 mil or 20 μm) is more than 26 cm$^3$·mil/(100 in$^2$·atm·day), and the preferred water vapor permeability is less than 0.6 g·mil/100 in$^2$·day. If such a membrane is used when the operating current density is less than 0.05 mA/cm$^2$, enough oxygen can diffuse into the battery and react with Li$^+$ in the electrolyte to form Li$_2$O (the preferred reaction product at an oxygen partial pressure of 0.21 atm), and the battery will operate as a normal Li/air battery. However, if such a membrane is used when the battery current density is larger than 0.05 mA/cm$^2$, not enough oxygen can get into the battery. As a result, the battery will operate in an oxygen-starved condition, and the battery voltage will drop quickly, which will lead to reduced discharge capacity.

The $O_2$ permeability of selective polymer membranes was measured using a MOCON® permeation system (Model OX-Tran 2/20 from Mocon, Minneapolis, Minn.). The test results are shown in column 7 of Table 4. One example of an $O_2$-permeable membrane (which is also heat sealable) is MELINEX® 301H which comprises a biaxially-oriented PET polymer film layer and a thermal bonding polymer layer comprising a terephthalate/isophthalate copolyester of ethylene glycol (commercially available from DuPont Teijin Films of Wilmington, Del.). The thickness of MELINEX® 301H (or MELINEX® 851) membranes ranges from 48 gauge to 240 gauge (0.5 mil to 2.5 mil, or 12 μm to 61 μm). Columns 5 and 6 of Table 4 compare the minimum $O_2$ flow rate at different current densities and measured $O_2$ flow rate in selected polymer membranes (assuming that the majority of reaction product is Li$_2$O at an oxygen partial pressure of 0.21 atm as indicated by Read et al., Journal of the Electrochemical Society, 149-9, A1190, 2002). The values in column 6 are calculated from the experimentally-determined values of column 7.

TABLE 4

Comparison of Minimum $O_2$ Flow Rate in at Various Current Densities and Measured $O_2$ Flow Rate in Selected Polymer Membranes

| Membrane | Current density mA/cm$^2$ | Film thickness mil | Pressure atm | Minimum $O_2$ flow mol/m$^2$/s | Membrane allowed $O_2$ flow at 25° C./ 0.21 atm mol/m$^2$/s | Measured $O_2$ permeability of membrane cc/m$^2$/day/atm |
|---|---|---|---|---|---|---|
| MELINEX® 301H, 80 gauge | 0.1 | 0.8 | 0.21 | 1.08E−07 | 7.79E−09 | 71.8 |
|  | 0.05 | 0.8 | 0.21 | 5.40E−08 | 7.79E−09 | 71.8 |
|  | 0.02 | 0.8 | 0.21 | 2.16E−08 | 7.79E−09 | 71.8 |
| MELINEX® 301H, 120 gauge | 0.05 | 1.2 | 0.21 | 5.40E−08 | 5.25E−09 | 48.4 |
| MSE-HDPE* | 0.1 | 1 | 0.21 | 1.08E−07 | 5.67E−07 | 5224 |
| Blue-HDPE** | 0.1 | 2 | 0.21 | 1.08E−07 | 6.36E−07 | 5857 |
| MSE-HDPE | 0.05 | 2 | 0.21 | 5.40E−08 | 2.80E−07 | 2577 |
| Blue-HDPE | 0.05 | 1.8 | 0.21 | 5.40E−08 | 5.49E−07 | 5055 |

*Mid South Extrusion, Inc., LA
**Blueridge Films, Inc., VA

Table 4 shows that high density polyethylene can provide enough oxygen flow at a current density of 0.05 to 0.1 mA/cm$^2$. It also suggests that PET polymer films (e.g., MELINEX® 301H) cannot provide enough oxygen for Li/oxygen reactions at the given current densities. For example, MELINEX® 301H 80-gauge is determined to provide only 14% of the required $O_2$ for a current density of 0.05 mA/cm$^2$. Surprisingly, however, the results from the disclosed pouch cell embodiments demonstrated that 0.8 mil thick MELINEX® 301H was the best choice of polymer barriers for the given applications. Without being bound by any particular theory, it is thought that this discrepancy is due to the altered gas diffusion properties of polymer membranes (MELINEX® 301H in this case) when they are soaked with the electrolyte used in the Li/air batteries. In other words, when MELINEX® 301H absorbs electrolyte, its internal pores may expand and its oxygen diffusion coefficient may be much larger than those measured in dry conditions.

In some embodiments, the oxygen selectivity of the membrane is increased by coating or soaking the membrane with an oil, such as a liquid polymeric perfluoro compound. For example, as disclosed in U.S. Pat. No. 5,985,475, a CELGARD® 2500 membrane can be soaked in PFPO (poly(perfluoropropylene oxide co-perfluoroformaldehyde)) (average MW ~1500, 3200, or 6600; available from Sigma-Aldrich, St. Louis, Mo.) to improve its oxygen to moisture selectivity. Although untreated CELGARD® 2500 membrane has no oxygen selectivity relative to water, selectivity towards oxygen increases up to 4-fold compared to water after coating the membrane with PFPO oil. In one embodiment of the current invention, prepared pouch-type Li/air batteries with a MELINEX® 301H package were dip coated in a 1% (w/w) solution of PFPO (poly(perfluoropropylene oxide co-perfluoroformaldehyde)) (average MW ~1500, 3200, or 6600; available from Sigma-Aldrich, St. Louis, Mo.) in hexane for 10-30 seconds. Increasing the membrane selectivity may increase the battery life, i.e., allow it to continue operating for a greater period of time, by preventing water from reacting with the lithium metal anode and causing it to fail.

With reference to FIG. 8, a PTFE or other porous hydrophobic film with high $O_2$ permeability (i.e., 10$^{-4}$ mol/m$^2$/s) can be used as the gas distribution membrane 820 in conjunction with the gas diffusion membrane 810 as discussed above. Other suitable materials for gas distribution membrane 820 include filter paper or glass fibers.

V. Examples

Example 1

Double-Sided Pouch Cells with Low-Permeability Membranes

Double-sided pouch cells were prepared. The package material for cells #1, #2, and #3 was a 1.8 mil or 46 □m thick HDPE membrane sealed on a metal-polymer laminate (silver bag) frame. The package material for cells #4 was a 0.8 mil or 20 □m thick PET (MELINEX® 301H) membrane with no frame.

For cells #1-4, air electrodes were prepared using DARCO® G-60 carbon with 15% PTFE binder, 4.6 cm×4.6 cm. DARCO® G-60 carbon has a lower mesopore volume than KETJENBLACK® EC-600JD carbon (KB). Therefore cells utilizing DARCO® G-60 carbon electrodes have a much lower expected capacity than the Li/air cells using KB-based electrodes. The separator was CELGARD®-5550. The anode (4 cm×4 cm) was 0.5 mm thick lithium foil pressed onto a copper mesh strip. The electrolyte was 1 M LiTFSI in EC:PC (1:1) to which 20 wt % DME was added.

Sample assembly was performed inside an argon filled glove box. The nickel tabs on the two air electrodes were welded together. After drying overnight at 60° C., the cells were transported into the glove box for further assembly. The lithium anode was wrapped with the separator (one layer), such that the separator fully encased the anode. The wrapped anode was inserted between two layers of the air electrode to form a "dry cell." To ensure the integrity of the cells during the subsequent assembly process, some dry cells were bonded by careful wrapping with cotton thread. The bonded dry cells were then immersed into electrolyte for 4 hours. After electrolyte soaking, the cells were kept under vacuum for 0.5 h in order to evacuate DME. The soaked cells were then sealed with selected package materials. After overnight relaxation, cells were discharged in an Arbin battery tester (Model BT2000, Arbin Instruments, College Station, Tex.) in ambient laboratory air (~20% relative humidity). The typical discharge current density was 0.05 mA/cm² and parameters of these cells are listed in Table 5.

TABLE 5

Key Characteristics of Initial Samples

| Cell | Dry cell (g) | L × W (cm) | Carbon (g) | Electrolyte (g) | DME left (%) | Capacity (mAh) |
|---|---|---|---|---|---|---|
| #1 | 3.816 | 4.6 × 4.6 | 2.107 | 1.726 | 3.8 | 250 |
| #2 | 3.439 | | 2.107 | 1.883 | 7.0 | 243 |
| #3 | 3.842 | | 2.107 | 1.990 | 9.9 | 237 |
| #4 | 3.355 | | 2.107 | 1.725 | 3.9 | 224 |

Figure 11:
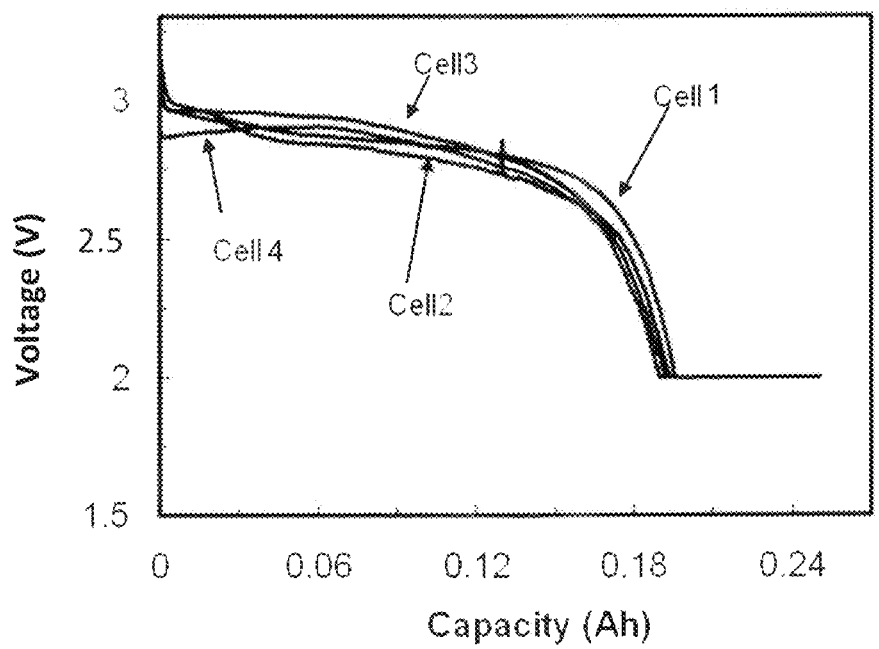
FIG. 11 is a graph of voltage versus capacity for the Li/air pouch cells shown in FIGS. 10A-10D.

FIGS. 10A-10D are photographs of cells #1-4, respectively. Their discharge curves are shown in FIG. 11. These initial samples operated in ambient conditions for more than 14 days successfully.

Further testing indicated that double-sided pouch cells with an HDPE outer membrane have a shorter lifetime than those prepared with a 0.8-mil MELINEX® 301H membrane. This may be related to higher moisture diffusion through HDPE membranes. However, Li/air cells packaged in a thicker MELINEX® 301H film (1.2 mil) had a much shorter lifetime (less than a day). This can be attributed to an insufficient $O_2$-flux through the membrane which cannot sustain a continuous $Li/O_2$ reaction for the given current density. Considering all of these factors, 0.8 mil thick MELINEX® 301H films were used in most of the cells in subsequent embodiments.

Example 2

Use of Cold Isostatic Press to Improve Interface Contact

Double-sided pouch cells were prepared using KETJENBLACK® EC-600JD carbon (KB, Akzo Nobel). The air electrode film was prepared by mixing KB with Dupont TEFLON® PTFE-TE3859 fluoropolymer resin aqueous dispersion (60 wt % solids). The weight ratio of KB and PTFE after drying was 85:15. The mixture was laminated into a whole carbon layer by using a roller with pressure of 80 psi to produce a film having a thickness of 0.7 mm. The carbon loading was ~15 mg/cm². Nickel mesh coated with a conductive paint (Acheson EB-020A, Acheson Colloids Company, Port Huron, Mich.) was embedded into the carbon layer and worked as the current collector. To minimize moisture penetration, a porous PTFE film (3 □m thick, W. L. Gore & Associates, Inc) was laminated on one side of the air electrode exposed to air in the test.

After the dry cells were soaked in electrolyte, cell #5 was placed in an argon glove box without evacuation so most of the DME would remain in the cell. Cell #6 was placed in antechamber of glove box and subjected to vacuum for 0.5 h so most of the DME would be pumped out.

Figure 12:
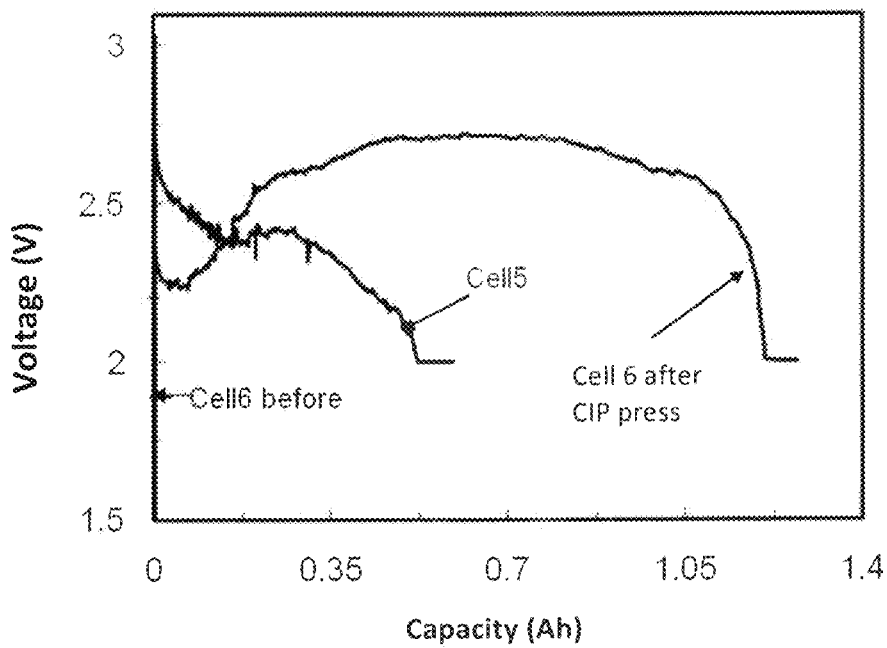
FIG. 12 is a graph of potential versus capacity for one embodiment of a Li/air pouch cell.

After cells #5 and #6 were discharged, the voltage of cell #6 quickly dropped to its cut-off voltage as shown in FIG. 12 and demonstrated a capacity of only 3 mAh. It was thought that this quick fade was due to loss of contact between the electrode and the separator. Therefore, cell #6 was placed into a Cold Isostatic Press (CIP) and pressed under a pressure of 10,000 lb. The failed cell #6 was tested again between two plastic plates (with air diffusion holes) after CIP treatment and demonstrated very good capacity (1272 mAh). This test clearly indicated the importance of good contact between component layers in a Li/air battery. Table 6 shows the key parameters of investigated cells. FIG. 12 shows the discharge profile and capacity of cells #5, #6, and #6-CIP (pressed using CIP after initial failure of cell #6). This experiment indicated that CIP pressing can densify the electrodes, which helps to reduce internal resistance and ensure long-term operation of Li/air batteries. The discharge capacity of #6-CIP was 1,272 mAh, and the average working voltage was 2.672 V.

TABLE 6

Key parameters of cell#5, cell#6 and cell#6-CIP

| Cell number | Dry cell (g) | Length × width (cm) | Carbon (g) | Electrolyte (g) | DME left (%) | Capacity (mAh) |
|---|---|---|---|---|---|---|
| #5 | 3.124 | 4.6 × 4.6 | 0.854 | 9.473 | 16.67 | 593 |
| #6 | 3.202 | 4.6 × 4.6 | 0.883 | 9.208 | 2.2 | 3 |
| #6-CIP | | | | | | 1272 |

Example 3

Use of Heat-Sealable Separator to Improve Interface Contact

Figure 13:
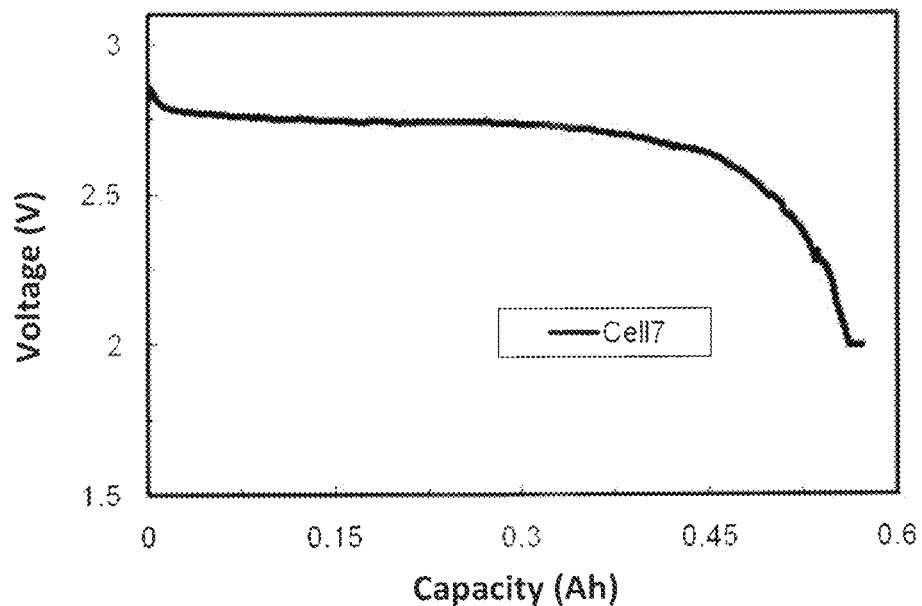
FIG. 13 is a graph of potential versus capacity of another embodiment of a Li/air cell.

Double-sided pouch cells with KETJENBLACK® EC-600JD carbon air electrodes were prepared as described above in Example 2. However, a heat-sealable separator (T100-30, Policell Technologies, Inc., Metuchen, N.J.) was used in place of CELGARD®-5550. The separator was heat-sealed to both the carbon and lithium foil at 100° C. and 500 psi. Table 7 summarizes the key parameters for Li/air cell #7. FIG. 13 shows the discharge profile of the cell.

TABLE 7

| Cell number | Dry cell (g) | Length × width (cm) | Carbon (g) | Electrolyte (g) | Capacity (mAh) |
|---|---|---|---|---|---|
| #7 | 2.551 | 4.1 × 4.1 | 0.467 | 6.425 | 572 |

Example 4

Use of PVDF-Coated CELGARD® 5550 Separator to Improve Interface Contact

Figure 14:
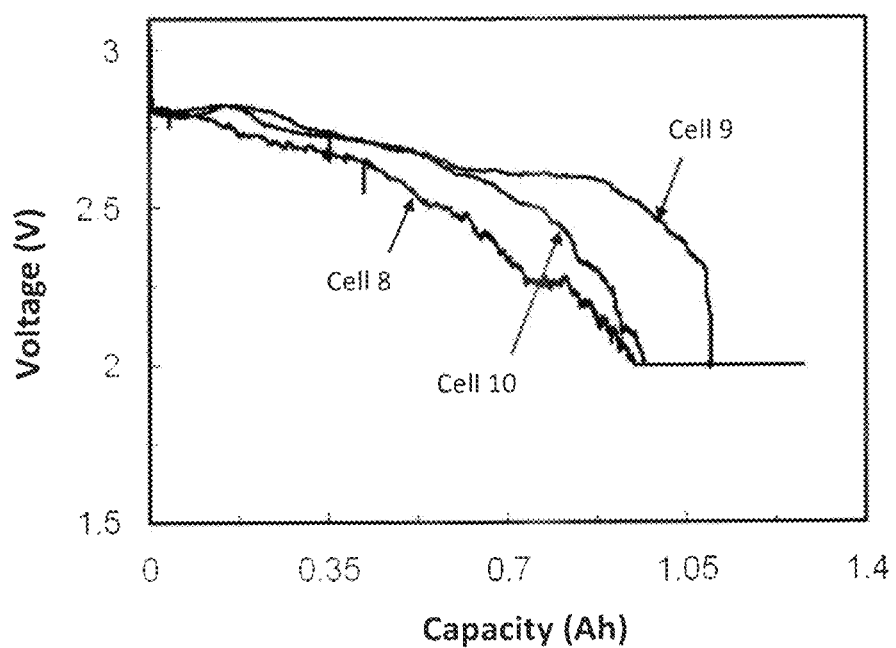
FIG. 14 is a graph of voltage versus capacity for additional embodiments of Li/air cells.

Double-sided pouch cells with KETJENBLACK® EC-600JD carbon air electrodes were prepared as described above in Example 2. However, PVDF-coated separators were prepared by immersing CELGARD® 5550 in 1% PVDF-HFP (LBG-1, KYNAR®, available from Arkema, Inc., Philadelphia, Pa.) in acetone solution for 5 min. The coated separator was dried in air and stored in an argon-filled glove box for later use. Three cells were prepared and tested: Cell #8 was partially soaked in electrolyte, cell #9 was prepared without thread binding but fully soaked in electrolyte, and cell #10 was prepared with thread binding and fully soaked in electrolyte. Their key parameters are listed in Table 8. The discharge voltage profile and capacity of these cells are shown in FIG. 14. The PVDF-coated separator significantly improved the production yield of the Li/air cells. All tested cells had a capacity of more than 1,100 mAh. The specific capacity was more than 2,500 mAh per gram of KB carbon, indicating that pouch cells can fully utilize the high capacity of KB and can be scaled up for high-capacity applications.

TABLE 8

Key parameters of pouch cells with PVDF-coated CELGARD ® Separator

| Cell | Dry cell (g) | L × W (cm) | Carbon (g) | Electrolyte (g) | Capacity (mAh) | Comment |
|---|---|---|---|---|---|---|
| #8 | 2.466 | 4.1 × 4.1 | 0.457 | 6.255 | 1,277 | Partial soaking |
| #9 | 2.742 | 4.1 × 4.1 | 0.444 | 7.212 | 1,200 | Fully soaked without thread binding |
| #10 | 2.778 | 4.1 × 4.1 | 0.444 | 6.335 | 1,166 | Fully saturated soaking with thread binding |

Example 5

Carbon Cathode with Current Collector Between Two Carbon Films

Figure 15:
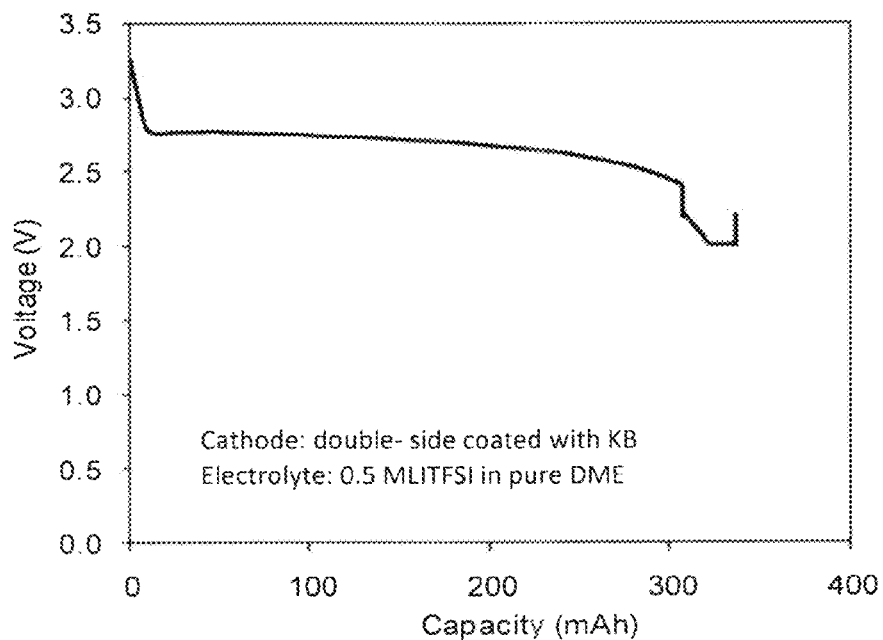
FIG. 15 is a graph of voltage versus capacity for an embodiment of a Li/air cell having a double-sided carbon cathode.

A double-sided pouch cell (similar to cell #4) was prepared as described above in Example 1. A carbon-based air cathode was used in which a KETJENBLACK® carbon film was laminated onto each side of a nickel mesh current collector coated with electroconductive paint. KETJENBLACK® EC600JD carbon was used (available from Akzo Nobel Polymer Chemicals, Chicago, Ill.). The electrolyte was 1 M LiTFSI in pure DME. DME has a lower viscosity than EC or PC); thus DME can be absorbed by the electrode easily and allows fast oxygen transfer. This electrolyte was selected to test the electrolyte loss rate of the sealing material (ME-LINEX® 301H, 80 gauge). FIG. 15 shows the discharge curve for this cell. Due to apparently poor contact between the two carbon films and the nickel mesh, the operating voltage quickly dropped to 2.6-2.7 V. The sample was tested for more than 10 days, giving a capacity of 340 mAh, which was lower than that of the pouch cells using the single-side carbon film cathodes.

Example 6

Hybrid Carbon Electrode

Figure 16:
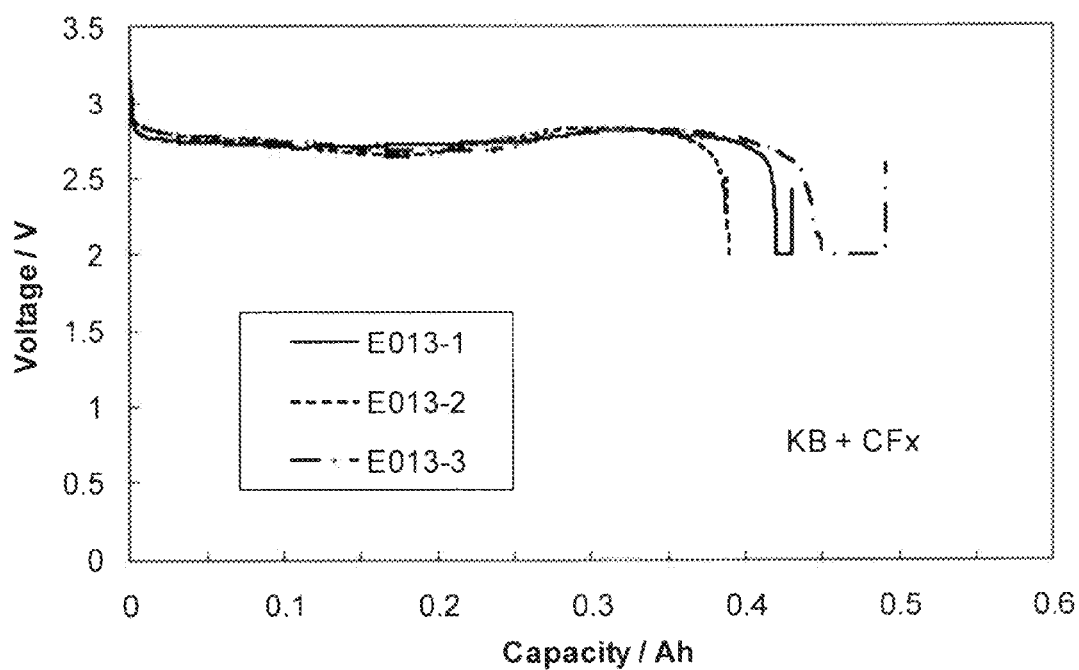
FIG. 16 is a graph of voltage versus capacity for embodiments of Li/air cells with hybrid cathodes.
Figure 17:
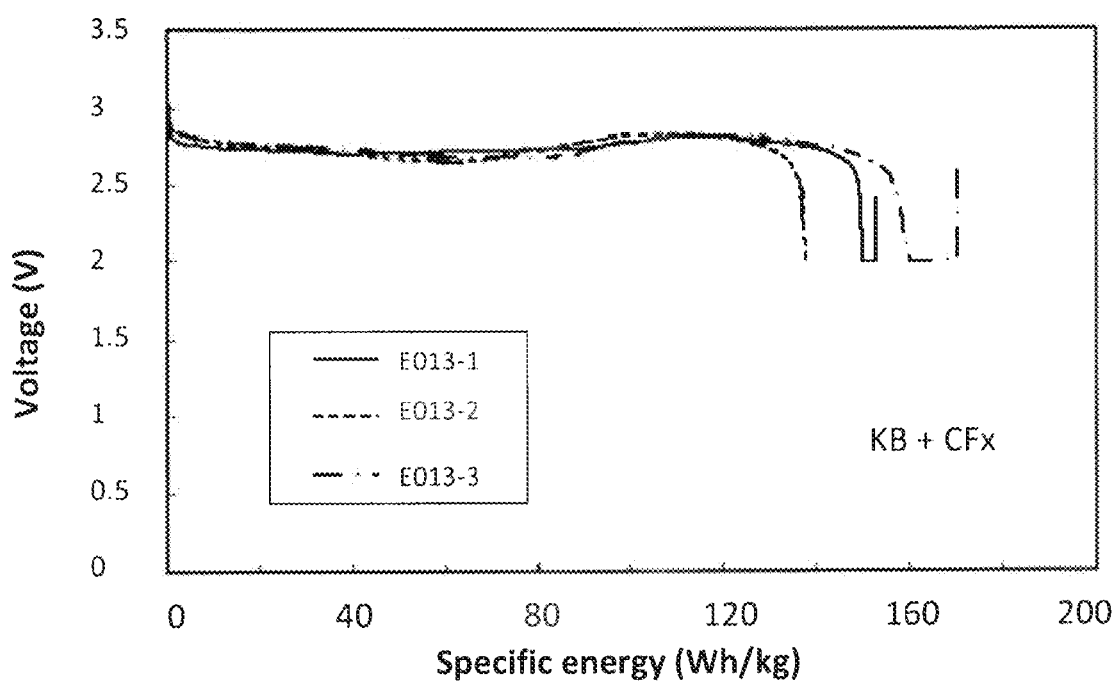
FIG. 17 is a graph of voltage versus specific energy for the Li/air cells of FIG. 16.

Double-sided pouch cells with KETJENBLACK® EC-600JD carbon based air electrodes were prepared as described above in Example 2. However, the air electrode comprised 55% KETJENBLACK® carbon, 30% $CF_x$ and 15% PTFE binder. The electrolyte was ELY-013 (1.0 M LiTFSI in PC/DME (1:1 wt)). The cells were tested in an open-air atmosphere with a typical relative humidity of ~20%. The cells demonstrated a capacity of 0.3-0.4 Ah and a specific energy of 130-150 Wh/kg. FIGS. 16-17 show the discharge performance of the cells. The sudden drop in voltage may be due to loss of electrolyte after 15 days.

Figure 18:
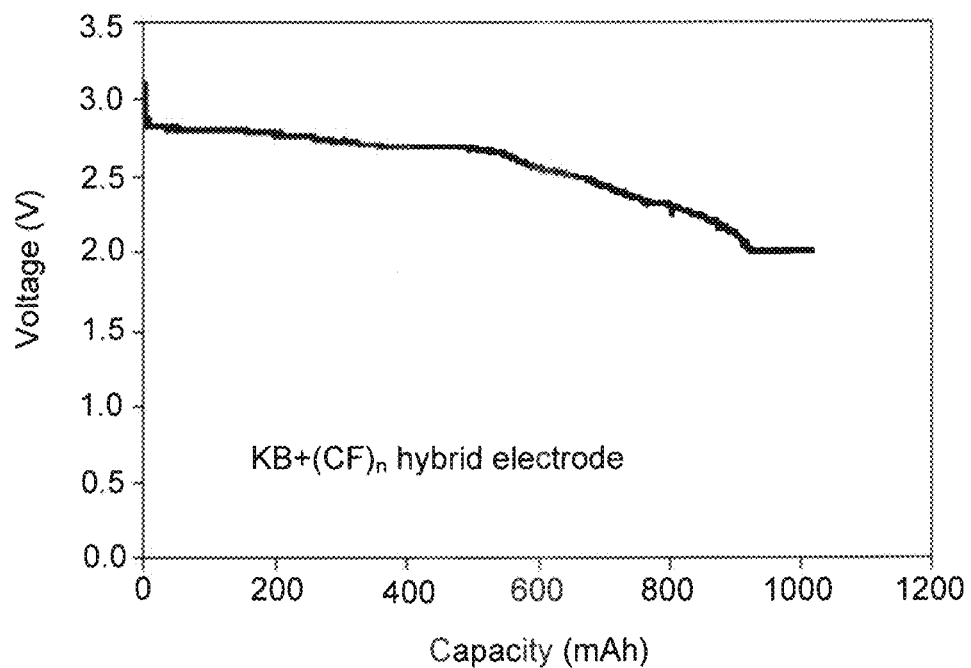
FIG. 18 is a graph of voltage versus capacity for one embodiment of a Li/air cell with a hybrid cathode.

Another pouch cell was assembled with a 4 cm×4 cm air electrode. The carbon loading was 22.4 mg/cm². FIG. 18 shows the discharge curve of this hybrid battery. The cell was discharged in ambient conditions for more than 26 days, delivering a total capacity of above 1 Ah and a discharge energy of 2.59 Wh. One advantage of using $CF_x$ in the hybrid electrode is that it reduces the amount of electrolyte absorbed in the cell without influencing its performance, which improves the specific energy due to the reduced overall mass of the cell. This advantage will be more significant when the pouch cells are discharged at high current density. As shown in Table 9, this pouch cell had a mass that was 20% less than the mass of a pouch cell with a KETJENBLACK® carbon double-sided cathode. With a total battery mass of 8.680 g, the specific energy for the whole pouch cell with the hybrid cathode is 300 Wh/kg.

TABLE 9

Weight Summary of 4 cm × 4 cm Pouch Cells

| | Dry cell (g) | Final Weight (g) | Type of Electrolyte used | OCV (V) |
|---|---|---|---|---|
| Pouch cell using double-side coated cathode | 2.982 | 10.887 | 1M LITFSI in pure DME | 3.238 |
| KB + $CF_x$ hybrid pouch cell | 3.110 | 8.680 | 1M LITFSI in PC:DME(1:1) | 3.107 |

Example 7

Aluminum Mesh Current Collector

Figure 19:
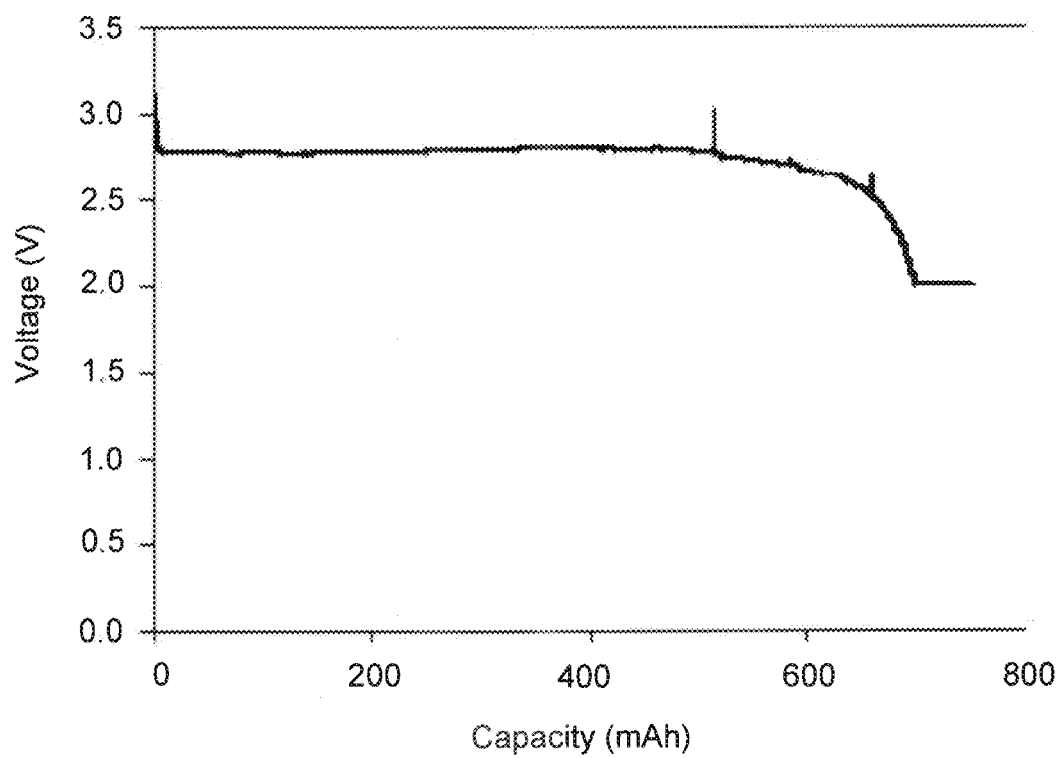
FIG. 19 is a graph of voltage versus capacity for one embodiment of a Li/air cell with an aluminum mesh current collector.

A pouch cell was prepared as described in Example 6. However, an aluminum mesh current collector (4 cm×4 cm) was used in place of the nickel mesh to further reduce the total weight of the pouch cell. The change was expected to increase specific energy of the battery by 10% compared to batteries with nickel mesh. The electrolyte was 1 M LiTFSI in PC:DME (1:2). Table 10 shows that the final pouch cell weighed 7.641 g, an approximately 10% weight reduction compared to the hybrid pouch cell shown in Table 9. However, due to the existence of $Al_2O_3$ on the aluminum mesh surface, the internal impedance (0.3-3Ω) of the whole cell was larger than that of the pouch cells using nickel mesh collectors whose impedance is usually less than 0.1Ω. The discharge curve of this cell at a current density of 0.05 mA/cm² is shown in FIG. 19. The operating voltage decreased to 2.77 V and then held at this plateau. After discharging for more than 3 days, the voltage was still around 2.77 V, suggesting that the substitution of an aluminum current collector for the nickel mesh is feasible.

TABLE 10

Weight Summary of Pouch Cell with Aluminum Mesh

| | Dry battery (g) | Final Weight (g) | Type of Electrolyte used | OCV (V) |
|---|---|---|---|---|
| Al mesh based pouch cell | 1.633 | 7.610 | 1M LITFSI in PC:DME (1:2) | 3.153 |

Example 8

Electrolyte Compositions

Double-sided pouch cells with KETJENBLACK® EC-600JD carbon-based air electrodes were prepared as described above in Example 2. Two electrolytes, ELY-003 (1.0 M LiTFSI in PC/EC (1:1 wt)) and ELY-013 (1.0 M LiTFSI in PC/DME (1:1 wt)) were evaluated. Because ELY-003 did not absorb well into the dry cells, ELY-090 (1.0 M LiTFSI in PC/EC (1:1 wt) plus 20% (w/w) DME) was used for soaking the cathodes. The DME was evacuated by vacuum (~10 mTorr) in the small chamber of a dry box for about 2 hours. From the weight of electrolyte before and after DME evacuation, it was calculated that DME in the final electrolyte was less than 3% by weight. After the cathodes were prepared and soaked with electrolyte, the wet cells were sealed into a bag of MELINEX® 301H/80 gauge. The above processes were carried out inside a dry box filled with purified argon where the moisture and oxygen was less than 1 ppm. The final cells were taken out to discharge at 0.05 mA/cm² until 2.0 V, and then at 2.0 V to 0.01 mA/cm² in open-air conditions (20% RH) at room temperature.

Figure 20:
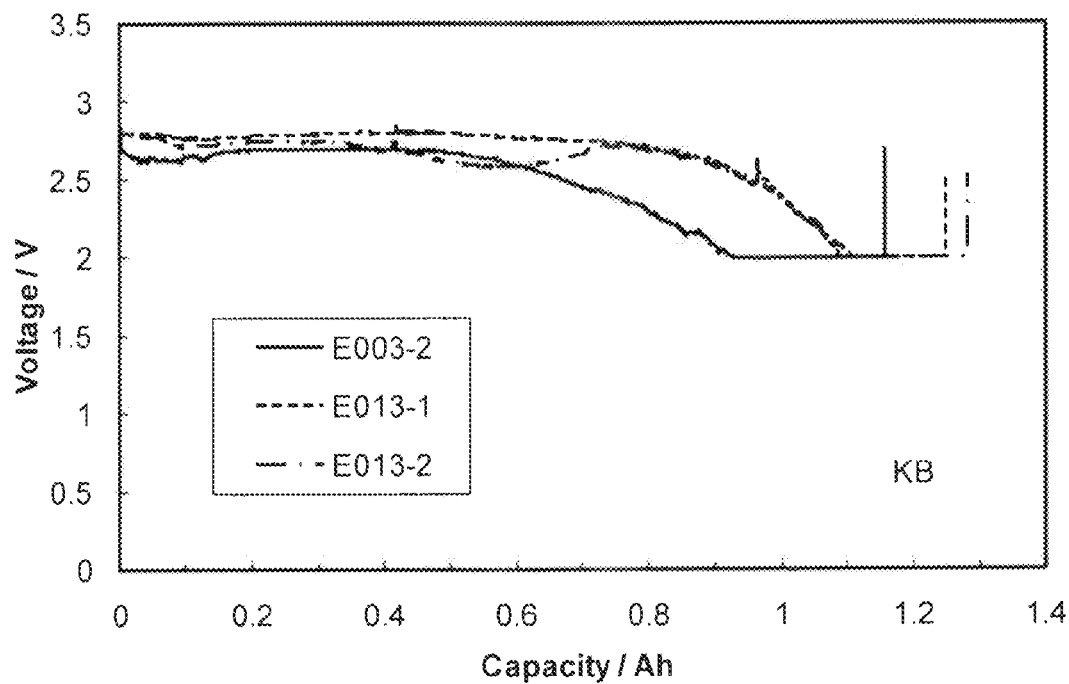
FIG. 20 is a graph of voltage versus capacity for embodiments of Li/air cells with different electrolytes.
Figure 21:
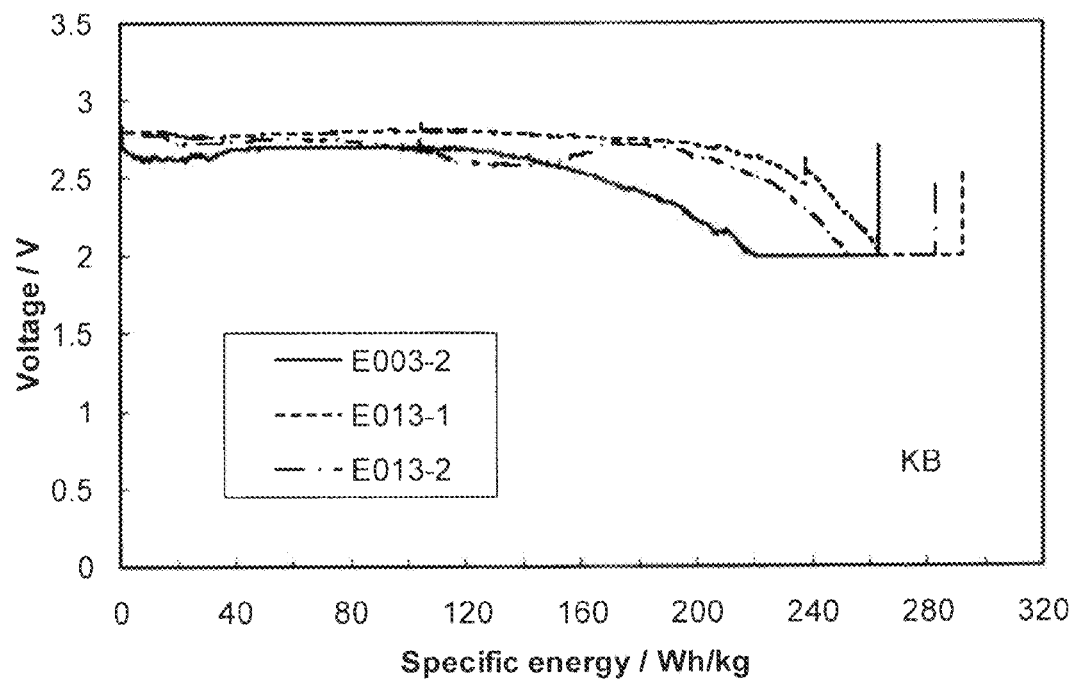
FIG. 21 is a graph of voltage versus specific energy for the Li/air cells of FIG. 20.

FIGS. 20 and 21 show the discharge capacity and specific energy of the Li/air pouch cells. Cells comprising ELY-013 (E013-1, -2) had a longer discharge time, larger capacity and higher energy density than ELY-003 (E-003-2); indicating that DME helps improve the discharge performance. For example, the Ely-013 cells had a discharge time of 27.5 days versus 25 days for the Ely-03 cell. The Ely-013 cell capacity was more than 1 Ah, and specific energy was 300 Wh/kg.

Example 9

Current Density Effect on Battery Capacity

Coin cells were prepared with KETJENBLACK® EC600JD (KB) carbon electrodes. The air electrode was prepared by mixing KB (Akzo Nobel) with Dupont TEFLON® PTFE-TE3859 fluoropolymer resin aqueous dispersion (60 wt % solids). The weight ratio of KB and PTFE after drying was 85:15. The mixture was laminated into a whole carbon layer by using a roller with adjustable pressure from 0 to 100 psi. Nickel mesh coated with conductive paint was embedded into the carbon layer and functioned as the current collector. To protect the air electrode from moisture attack, a porous PTFE film (3 mil thick, W. L. Gore & Associates, Inc) was laminated on the side of the electrode exposed to air in the test. Circular disks (1.98 cm²) with a 2-mm Ni tab on the edge were punched from the air electrode. The Li/air coin cells were assembled in an argon-filled MBRAUN® glove box (M. Braun, Inc., Stratham, N.H.) in which the moisture and oxygen content were less than 1 ppm. Type 2325 coin cell kits (CNRC, Canada) were used. The positive pans were machine-drilled with 19 holes (1.0 mm diameter), which were evenly distributed on the cell pans for air to pass through. The small tab on the circular electrode was spot welded onto the positive pan, allowing the flow of the electrons. A lithium disc (0.625-inch in diameter and thickness of 0.5 mm) was used as the anode.

The electrolyte was prepared by dissolving 1 mol lithium bis(trifluoromethane-sulfonyl)imide (LiTFSI, battery grade, Ferro) in ethylene carbonate (EC)/propylene carbonate (PC) (1:1 weight ratio). The salts and solvents used in the electrolyte were all battery grade and ordered from Ferro Corp. (Cleveland, Ohio). Whatman® GF/D glass microfiber filter paper (diameter 0.75 inch) was used as the separator because it can hold more electrolyte than the normal separator. Unless specified otherwise, 100 □L electrolyte was added to each cell.

The electrochemical tests were carried out on an Arbin BT-2000 Battery Tester at room temperature. The coin cells were put in a glove box filled with dry air to minimize the influence of moisture. The glove box had a gas inlet and outlet. The inside pressure was kept slightly positive by allowing the dry air to flow through continuously. The humidity inside the glove box was less than 1% RH as measured by a Dickson Handheld Temperature/Humidity/Dew Point Monitor. Unless mentioned otherwise, the cells were discharged at 0.05 mA/cm² to 2.0 V and then held at 2.0 V until the current was less than one-fifth of the value, i.e., 1/5=0.01 mA/cm².

Figure 22:
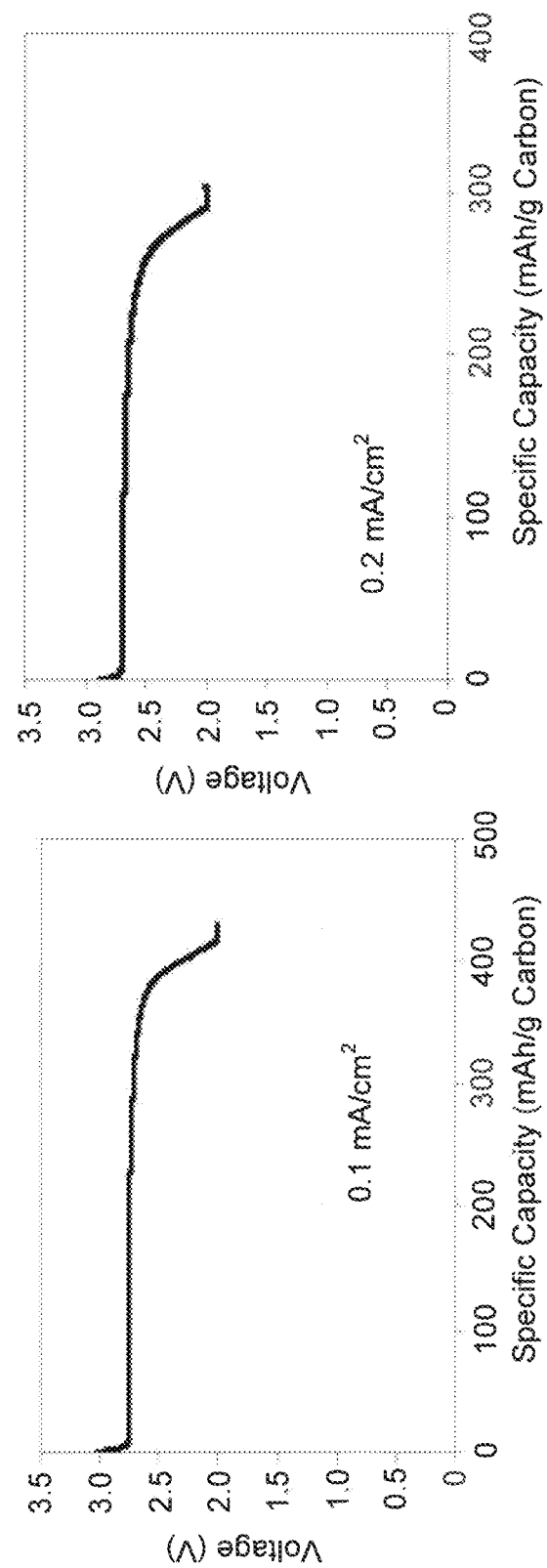
FIGS. 22A and 22B are graphs of voltage versus specific capacity for embodiments of Li/air cells at different current densities.

Cells were tested at current densities of 0.1 mA/cm² and 0.2 mA/cm². FIGS. 22A and 22B illustrate the effect of current density on specific capacity. When the current density was 0.1 mA/cm² (FIG. 22A), the capacity was 432 mAh/g (corresponding to 1,201 Wh/kg at a current density of 0.05 mA/cm²). The capacity decreased to 304 mAh/g at 0.2 mA/cm² (FIG. 22B). Meanwhile, the operation voltages dropped to 2.7-2.8 V due to the polarization. During discharge, $Li_2O/Li_2O_2$ is produced and deposits on the surfaces of the carbon particles in the cathode. The higher the current density, the quicker the surface area is blocked by $Li_2O/Li_2O_2$. The surface deposits prevent carbon contact with oxygen leading to a decreased capacity. Accordingly, current density and capacity are inversely related.

Example 10

Hybrid Electrode Effect on Battery Capacity

Effect of $MnO_2$

A single-sided hybrid electrode was prepared with 55 wt % KB, 30 wt % $MnO_2$, and 15% PTFE binder and a nickel mesh current collector, and placed into a coin cell. The hybrid electrode loading was 29.6 mg/cm². The electrolyte was 1 M lithium bis(trifluoromethanesulfonyl)imide (LiTFSI, battery grade, Ferro) in ethylene carbonate (EC)/propylene carbonate (PC) (1:1 weight ratio).

$MnO_2$ (from Enerize Corp., Coral Springs, Fla.) has a capacity of 233 mAh/g at a C/20 rate (i.e., a rate sufficient to discharge the full capacity of the battery in 20 hours). The operation voltage of $MnO_2$ overlaps with the main discharge plateau of KB at 2.8 V; thus two different electrochemical reactions occur in this range.

Figure 23:
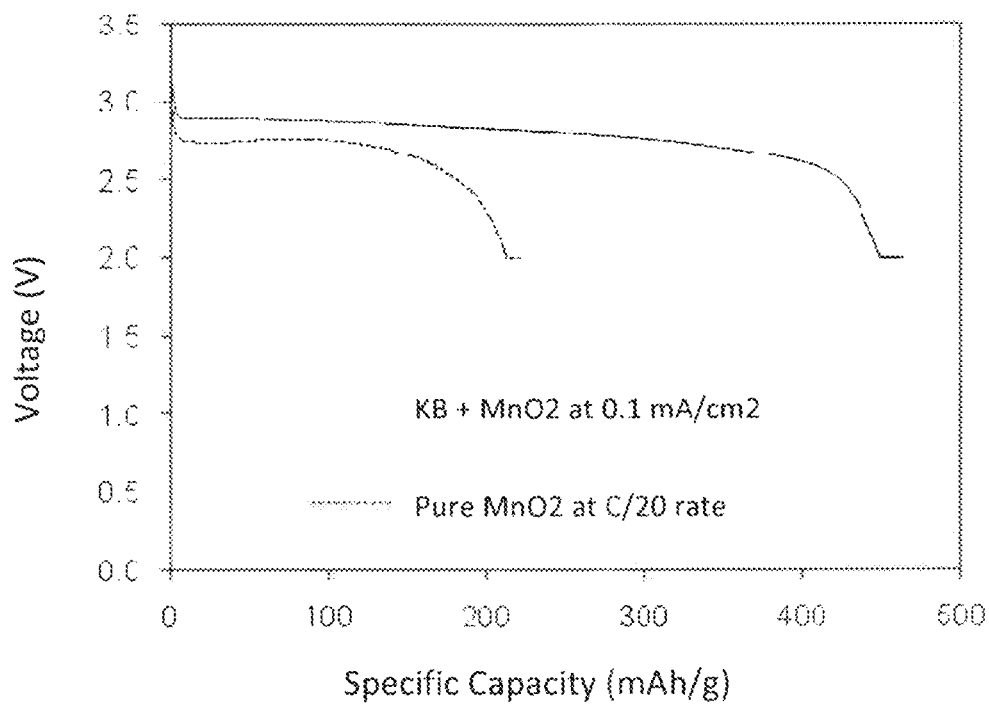
FIG. 23 is a graph of voltage versus specific capacity for one embodiment of a Li/air cell with a hybrid KETJEN-BLACK®/$MnO_2$ air electrode.

The discharge curve of the hybrid electrode, along with the discharge curve of pure $MnO_2$ in a primary lithium battery, is shown in FIG. 23. The discharge capacity of the $KB/MnO_2$ hybrid battery was 462 mAh/g total active materials at a current density of 0.1 mA/cm². This is only a 30 mAh/g increase in capacity compared with a pure KB electrode at this discharge rate. No further testing was carried out at a higher current rate. Decreased loading may help to improve the rate capability, but the limited capacity of pure $MnO_2$ makes it an undesirable candidate.

Effect of $V_2O_5$

A single-sided hybrid electrode was prepared with 55 wt % KB, 30 wt % $V_2O_5$, and 15% PTFE binder and placed into a coin cell. The hybrid electrode loading was 21.1 mg/cm². The electrolyte was 1 M lithium bis(trifluoromethanesulfonyl)imide (LiTFSI, battery grade, Ferro) in ethylene carbonate (EC)/propylene carbonate (PC) (1:1 weight ratio).

Pure $V_2O_5$ has three main discharge plateaus at 3.3 V, 3.0 V and 2.2 V. Thus its operation voltages can be combined with that of KETJENBLACK® carbon, increasing the total specific capacity and specific energy at high rates.

Figure 24:
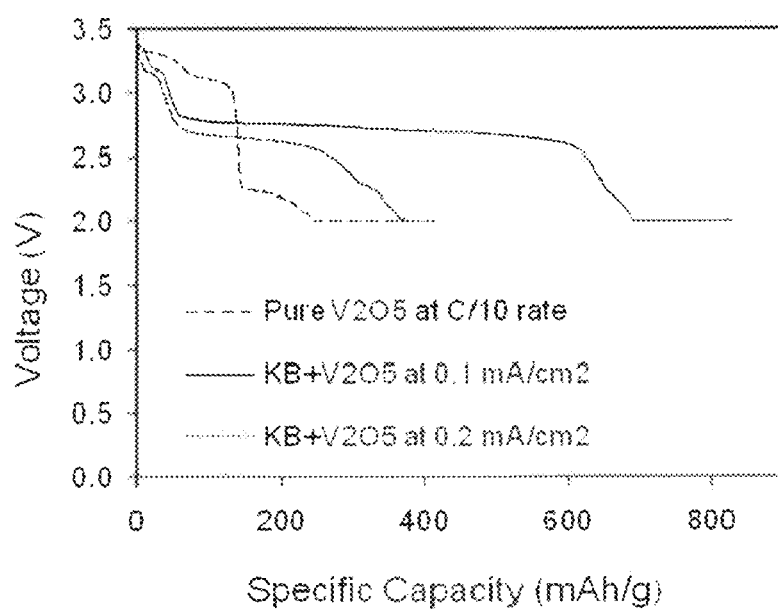
FIG. 24 is a graph of voltage versus specific capacity for one embodiment of a Li/air cell with a hybrid KETJEN-BLACK®/$V_2O_5$ air electrode.

The discharge curves of the hybrid electrode at 0.1 mA/cm² and 0.2 mA/cm², along with the discharge curve of pure $V_2O_5$, are shown in FIG. 24. The capacity of this hybrid electrode was 826 mAh/g at 0.1 mA/cm², which is 400 mAh/g higher than that of pure KETJENBLACK® carbon at the same current density. Polarization lowered the main operation voltage to 2.76 V. Even at 0.2 mA/cm², the specific capacity was still more than 400 mAh/g with a shortened operation voltage mainly at around 2.65 V.

Effect of $CF_x$

A single-sided hybrid electrode was prepared with 55 wt % KB, 30 wt % $CF_x$, and 15% PTFE binder and placed into a coin cell. The hybrid electrode loading was 22.4 mg/cm². The electrolyte was 1 M lithium bis(trifluoromethanesulfonyl) imide (LiTFSI, battery grade, Ferro) in ethylene carbonate (EC)/propylene carbonate (PC) (1:1 weight ratio).

Sub-fluorinated graphite fluoride $CF_x$ compounds are reported to have a high capacity. When the battery is discharged at C/10 rate, its theoretical specific capacity is as high as 864 mAh/g with an operation voltage at 2.5 V (literature value). The poor electrical conductivity of $CF_x$ can be compensated by mixing with KETJENBLACK® carbon, which has an excellent conductivity. Additionally, $CF_x$ powders are extremely hydrophobic, thus forming more air flow channels in the KB+$CF_x$ hybrid electrode. The hybrid electrode has plateaus at 2.8 V (KETJENBLACK® carbon) and 2.5 V $CF_x$. At low currents, the voltage maintains at 2.8 V, and the $CF_x$ does not participate in the reaction. At higher currents, the $CF_x$ participates, and the battery operates at a voltage of 2.5 V. Another advantage of using $CF_x$ in the hybrid electrode is that the amount of electrolyte absorbed by the cell is reduced by about 10% without negatively affecting the cell's performance. Because reducing the amount of electrolyte reduces the overall mass of the pouch cell, the specific energy of the cell is increased.

Figure 25:
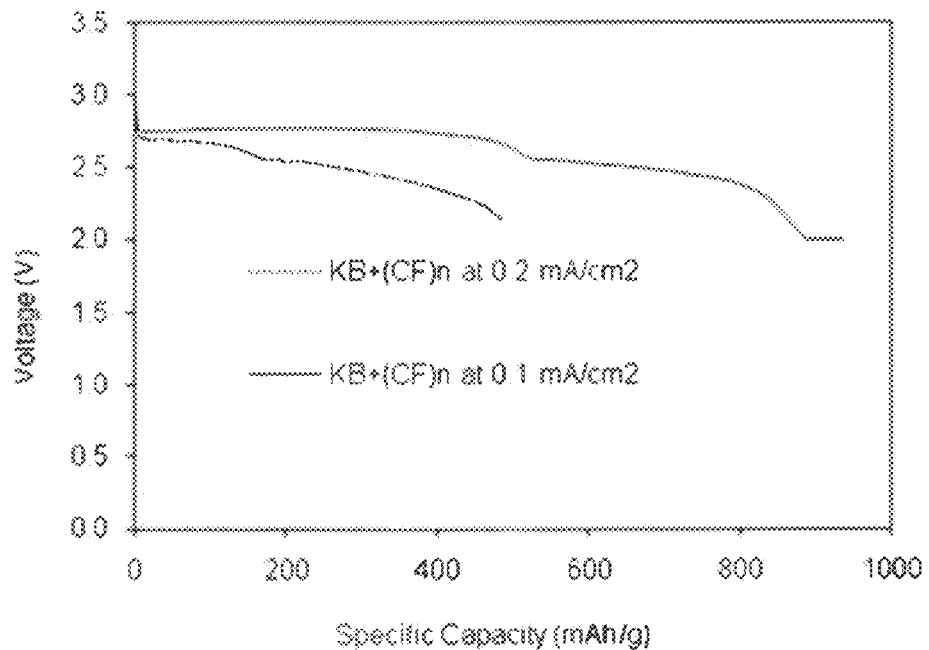
FIG. 25 is a graph of voltage versus specific capacity for one embodiment of a Li/air cell with a hybrid KETJEN-BLACK®/$CF_x$ air electrode.

The discharge curves of the hybrid electrode at 0.1 mA/cm$^2$ and 0.2 mA/cm$^2$ are shown in FIG. 25. Two different plateaus can be observed clearly, with the upper plateau mainly attributed to Li/oxygen reactions and lower one (2.5 V) belonging to the reaction between $CF_x$ and lithium. When discharged at 0.1 mA/cm$^2$ and 0.2 mA/cm$^2$, the specific capacity was 1,000 mAh/g and 520 mAh/g, respectively. The specific energy at 0.1 mA/cm$^2$ was 2,421 Wh/kg, which is almost doubled compared to a pure KB-based electrode.

Figure 26:
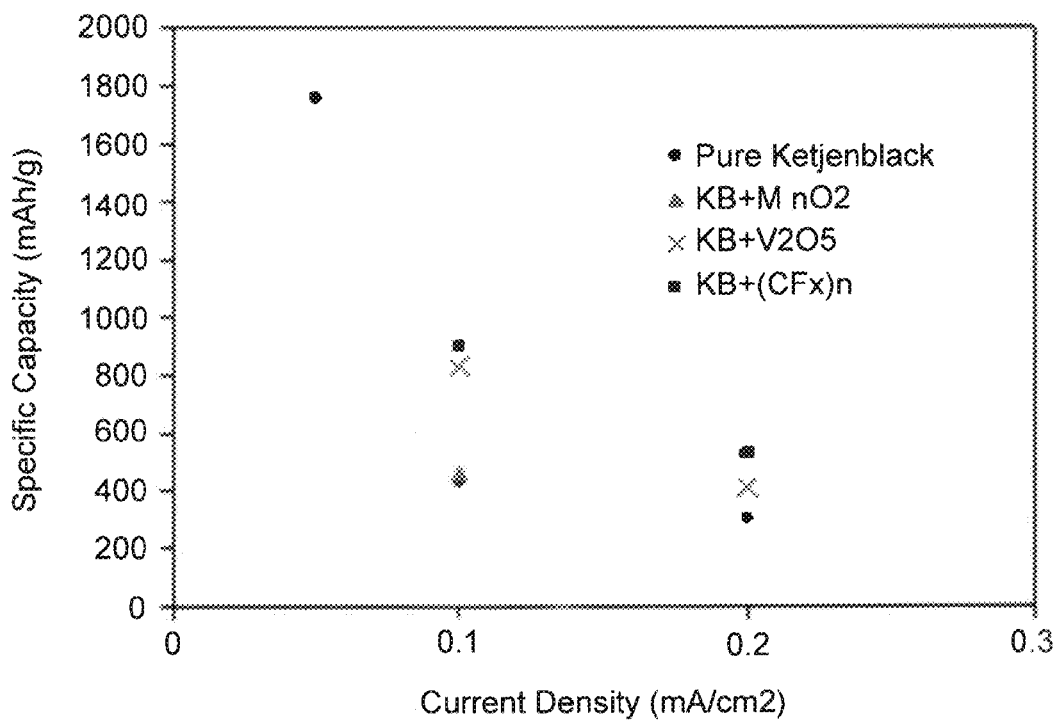
FIG. 26 is a comparison of the rate capabilities of different hybrid electrodes.

FIG. 26 summarizes the rate capabilities for the different hybrid air electrodes discussed above. $CF_x$ exhibits the highest capacity at increased rates.

Example 11

Effect of Nickel Foam Current Collector on Battery Capacity

A slurry of KETJENBLACK® carbon (85%) and polyvinylidene fluoride (PVDF) (15%) was prepared in N-methylpyrrolidone (NMP). A nickel foam disk (2 cm$^2$) was submerged into the slurry. The disk was sonicated for 5 min to allow the penetration of slurry into the foam structure. Unlike a whole carbon film, the KB mixture is distributed in the nickel foam randomly, providing spaces for the electrolyte. After heating, the loading of the carbon in the nickel foam was 5 mg/cm$^2$. A coin cell was assembled using the nickel foam as the current collector in the air electrode. All the other components are the same as in example 9. The amount of electrolyte (1 M lithium bis(trifluoromethanesulfonyl)imide (LiTFSI, battery grade, Ferro) in ethylene carbonate (EC)/ propylene carbonate (PC) (1:1 weight ratio) added into the coin cell was 150 μl. However, due to the foam structure of the current collector, there was no leakage. Thus sufficient amount of electrolyte was guaranteed in the test.

Figure 27:
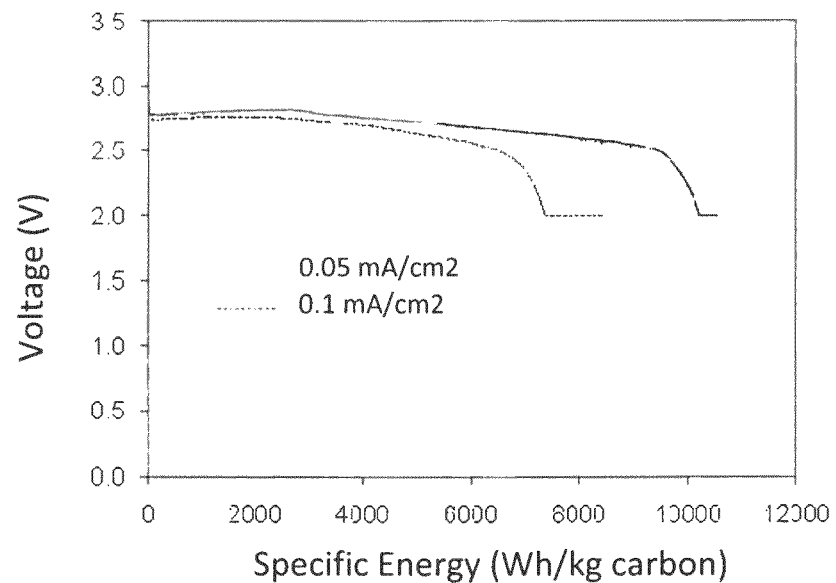
FIG. 27 is a graph of voltage versus specific energy for one embodiment of a Li/air cell with a nickel foam current collector.
Figure 28:
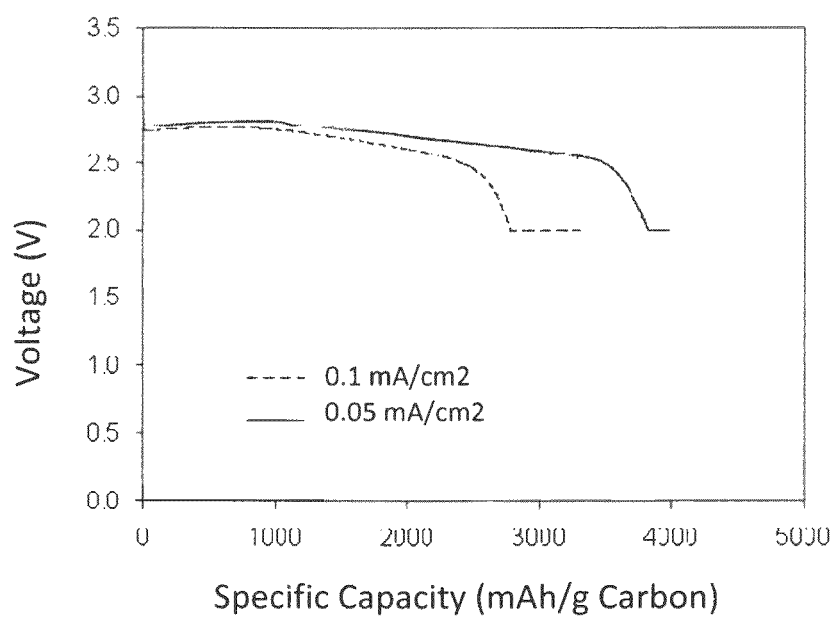
FIG. 28 is a graph of voltage versus specific capacity for the Li/air cell of FIG. 27.

This electrode structure exhibited very high specific capacity and substantially improved specific energy as shown in FIGS. 27 and 28. When discharged at a normal rate (0.05 mA/cm$^2$), the specific capacity was 4,000 mAh/g carbon, corresponding to a specific energy of more than 10,000 Wh/kg carbon. The capacity and energy per unit weight of carbon increased more than 200% compared with similar cells using nickel mesh current collectors due to the sufficient amount of electrolyte to wet the carbon at the reduced loading. Even at 0.1 mA/cm$^2$, the capacity only decreased slightly to 3,323 mAh/g carbon. However, the area-specific capacity of the cells decreased due to the decrease of the carbon loading per unit area.

Example 12

Effect of Electrolyte Contact Angle

The effects of various solvents on contact angle between the electrolyte and air electrode were investigated in coin cells similar to those described in Example 9. Battery-grade solvents ethylene carbonate (EC), propylene carbonate (PC), 1,2-dimethoxyethane (DME) and diethylene glycol dimethyl ether (i.e., diglyme, DG) were purchased from Ferro Corporation and used as received. Diethylene glycol diethyl ether (i.e., ethyl diglyme, EDG), diethylene glycol dibutyl ether (i.e., butyl diglyme, BDG), and dipropylene glycol dimethyl ether (i.e., diproglyme, DPG) were received gratis from Ferro Corporation. 1,2-Diethoxyethane (DEE) and 1-tert-butoxy-2-ethoxyethane (BEE) were purchased from Aldrich. All non-battery-grade solvents were dried with 4A molecular sieves. The moisture content in these solvents was tested on a Karl Fisher Titrator (Mettler DL37 KF Coulometer) and determined to contain less than 20 ppm before use.

Lithium hexafluorophosphate (LiPF$_6$, battery grade, Ferro), lithium bis(trifluoromethanesulfonyl)imide (LiTFSI, battery grade, Ferro), lithium perchlorate (LiClO$_4$, 99.99%, Aldrich), lithium iodide (LiI, anhydrous, 99.99%, Aldrich), lithium bromide (LiBr, anhydrous, 99.9+%, Aldrich), and lithium trifluoromethanesulfonate (LiSO$_3$CF$_3$, 99.995%, Aldrich) were purchased. Battery-grade lithium bis(oxalato) borate (LiBOB) was received gratis from Chemetall (Kings Mountain, N.C.). All lithium salts were used as received. Battery-grade lithium foil with a thickness of 0.5 mm was purchased from Honjo Metal, Japan.

The organic compounds, tris(pentafluorophenyl)borane (TPFPB), 12-crown-4,15-crown-5 and 18-crown-6, used as electrolyte additives or co-solvents were purchased from Aldrich. The liquid compounds were dried with 4A molecular sieves for days, and the solids were dried in a vacuum oven at 80° C. overnight before use.

All solvent mixtures and electrolytes were prepared in an MBraun glove box filled with argon (99.99%) where the moisture and oxygen content was less than 1 ppm. Contact angles were measured using a NRL C. A. Goniometer, Model No. 100-00-115 (Ramé-hart Instrument Co., Netcong, N.J.), at room temperature in an open-air atmosphere.

Figure 29:
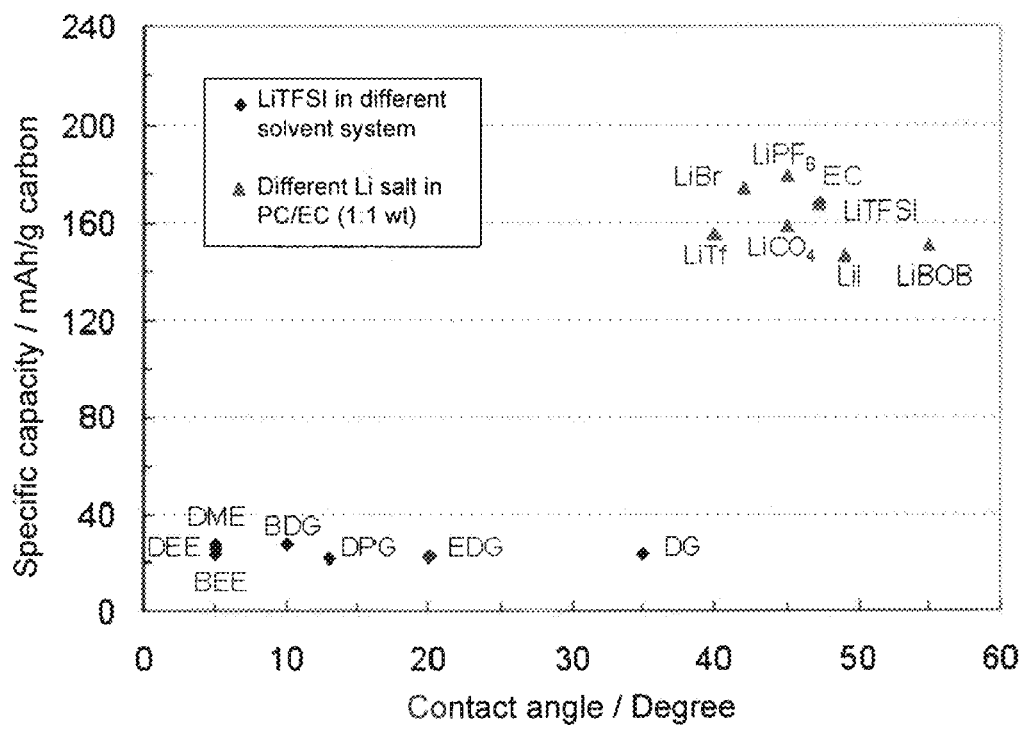
FIGS. 29-30 are graphs of specific capacity versus contact angle for Li/air cells having different electrolytes.
Figure 30:
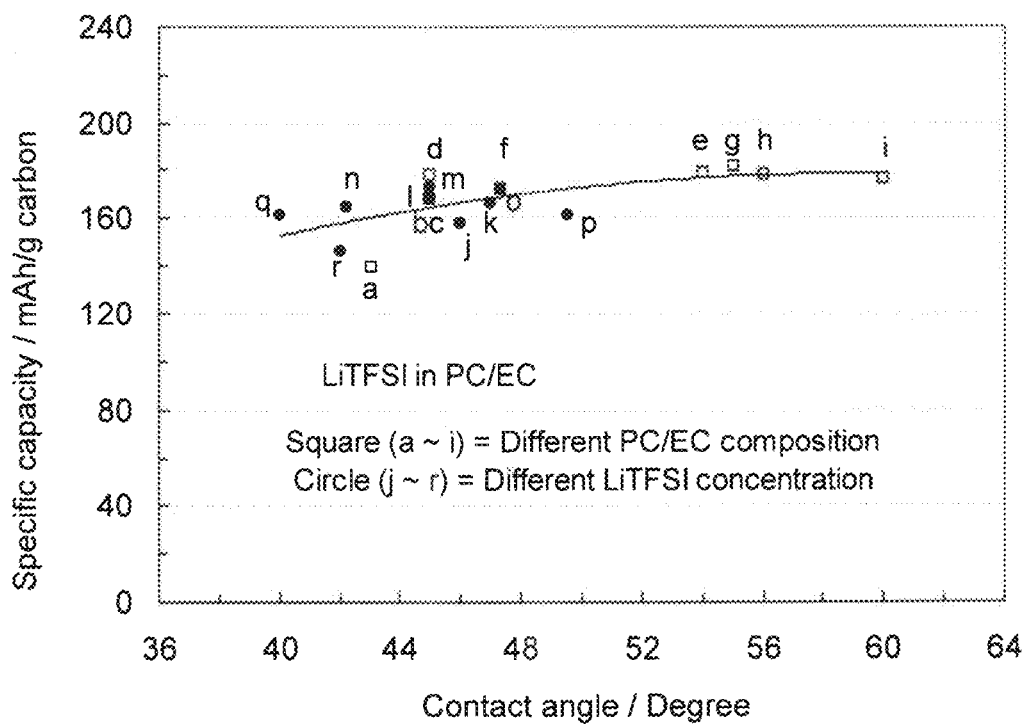

FIGS. 29-30 show the effect of the contact angle of an electrolyte at the carbon surface of the air electrode on the discharge capacity tested in dry air conditions at room temperature. FIG. 29 compares the effect on contact angle of electrolytes having 1.0M LiTFSI in different solvents mixed with PC at 1:1 weight ratio and 1.0 M different lithium salts in PC/EC (1:1 by wt). FIG. 30 compares the effect on contact angle of LiTFSI in a PC/EC electrolyte system where the salt concentrations and solvent mixture compositions are varied as shown in Table 11.

TABLE 11

Electrolyte compositions of LiTFSI in PC/EC mixtures for FIG. 30

| | Electrolyte composition | |
|---|---|---|
| Composition | Weight ratio of PC/EC mixture | LiTFSI molar concentration (M) |
| a | 1:0 | 1.0 |
| b | 9:1 | 1.0 |

TABLE 11-continued

Electrolyte compositions of LiTFSI in PC/EC mixtures for FIG. 30

| Composition | Electrolyte composition | |
|---|---|---|
| | Weight ratio of PC/EC mixture | LiTFSI molar concentration (M) |
| c | 4:1 | 1.0 |
| d | 7:3 | 1.0 |
| e | 3:2 | 1.0 |
| f | 1:1 | 1.0 |
| g | 2:3 | 1.0 |
| h | 3:7 | 1.0 |
| i | 1:4 | 1.0 |
| j | 1:1 | 0.5 |
| k | 1:1 | 0.6 |
| l | 1:1 | 0.7 |
| m | 1:1 | 0.8 |
| n | 1:1 | 0.9 |
| o | 1:1 | 1.0 |
| p | 1:1 | 1.1 |
| q | 1:1 | 1.2 |
| r | 1:1 | 1.4 |

As illustrated in FIG. 29, contrary to the effect of $O_2$ solubility in electrolytes containing different solvent mixtures of PC or different lithium salts on the discharge capacity (i.e., as $O_2$ solubility increases, capacity typically increases), when the contact angle of the electrolyte at the carbon surface of the air electrode is higher than 40°, the discharge capacity of a Li/air cell is high, with an average value of about 161.8 mAh/g; when the contact angle is below 40°, the discharge capacity is much lower, with an average value of about 23.6 mAh/g. There is nearly no change as the contact angle changes from 5° to 35°. For the electrolytes based on LiTFSI in PC/EC shown in FIG. 30, the discharge capacity increases with increasing contact angle of the electrolyte at the carbon surface of the air electrode.

It is, therefore, concluded that the electrolyte polarity is a more important parameter than the electrolyte viscosity, conductivity and $O_2$ solubility in determining the capacity of Li/air batteries discharged at a low rate. Electrolytes with a high polarity will generate more three-phase regions and lead to higher capacity in a Li/air battery.

Example 13

Effect of Crown Ether Additives

Two crown ethers (12-crown-4 and 15-crown-5) were evaluated in 2325-type coin cells using a commercially available air electrode for zinc/air batteries, the EFC electrode with Darco® G-60 carbon, which was prepared by DoppStein Enterprises, Inc. (Marietta, Ga.). The EFC air electrode was punched into discs with a diameter of 5/8", or 15.88 mm, and an electrode area of 1.98 cm². The disc air electrodes were cleaned, connected on the coin cell pans via spot welding and dried under vacuum at 80° C. overnight before use. A porous PFTE membrane was placed between the air electrode and the coin cell cover. One layer of glass microfiber filter paper (Whatman® GF/D) with a diameter of 3/4" was used as the separator between the air electrode and the anode. The electrolyte (1 M LiTFSI in PC/EC (1:1) plus varying concentrations of crown ether) was added onto the separator. During electrolyte preparation, it was found that the maximum solubility of 12-crown-4 in the control electrolyte, 1.0 M LiTFSI in PC/EC (1:1 wt), was less than 20% by weight; above that concentration, a large amount of crystals formed. However, more than 30% 15-crown-5 could be dissolved in 1.0 M LiTFSI in PC/EC (1:1 wt). A Li metal disc with a thickness of 0.5 mm and diameter of 5/8" (15.88 mm) was used as the anode, and a piece of stainless steel spacer with thickness of 0.034" (or 0.86 mm) was added to make good electrode contact. The cells were crimped inside a dry box filled with purified argon, rested overnight for electrolyte soaking, and then tested at room temperature in dry air conditions inside a glove box where the humidity was less than 1% RH unless otherwise specified. The cells were then discharged to 2.0 V vs. $Li^+/Li$ at a current rate of 0.05 mA/cm.

Viscosity was measured on a Brookfield DV-II+ Pro Cone/Plate Viscometer which is capable of measuring low viscosity liquids down to 0.3 mPa·s. Measurements were carried out at a spindle speed of 50 rpm and a shear rate of 192 $s^{-1}$, with the viscometer spindle/cup thermostated at 25.0° C. in a constant temperature oil bath which was supplied by a Brookfield Circulating Bath TC-502. A Brookfield viscosity standard Fluid 5 was used to calibrate the equipment before test. The standard sample yielded a viscosity of 4.78 mPa·s at 25.0° C. vs. the labeled value of 4.70 mPa·s at 25° C. Thus a 1.7% error was noticed.

Conductivity and oxygen solubility in the electrolytes were measured using an Oakton® 650 Series Multiparameter Meter. The $O_2$ solubility was measured in air where the partial pressure of $O_2$ was 0.21 atm, and the equilibration time was 30 minutes with occasionally stirring till the readings were constant. The conductivity probe and dissolved oxygen probe were calibrated using the Oakton standards. The electrolyte samples were kept at 25.0° C. in a constant temperature oil bath during test.

The contact angles of electrolytes on both the carbon surface and the PTFE surface of the air cathode were measured on a NRL C. A. Goniometer Model No. 100-00-115 at room temperature in open air atmosphere.

Figure 31:
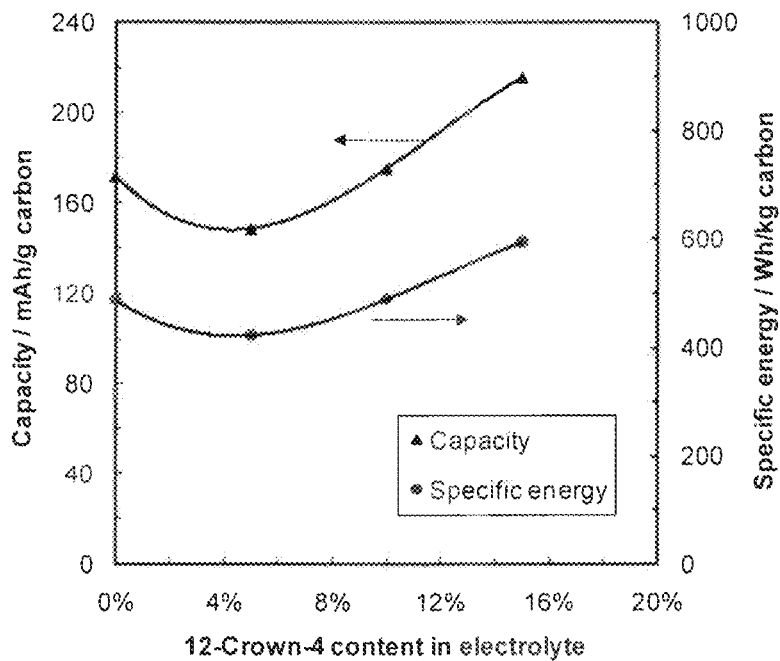
FIG. 31 is a graph of discharge capacity and specific energy versus concentration for one embodiment of a Li/air cell with an electrolyte including 12-crown-4.
Figure 32:
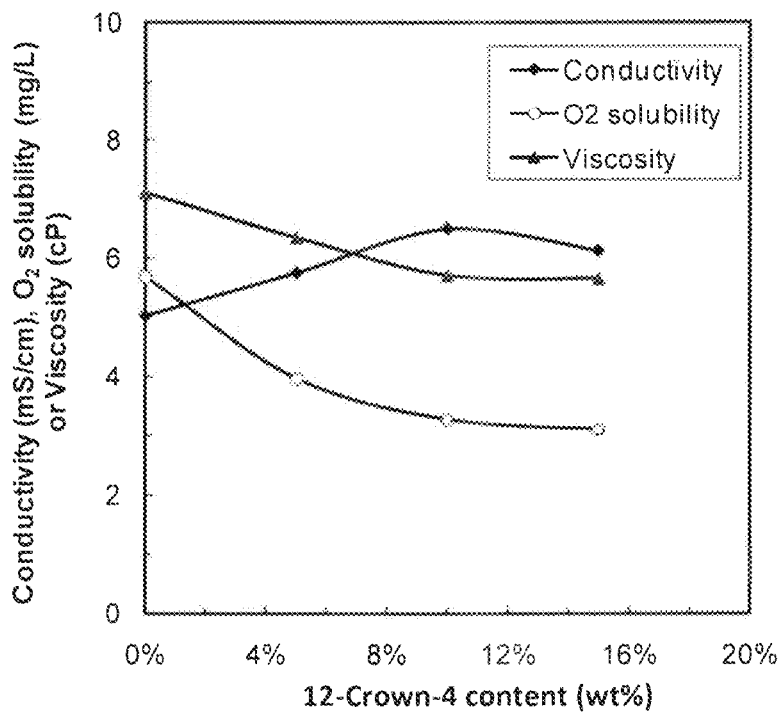
FIG. 32 is a graph of conductivity, dissolved oxygen, and viscosity versus concentration for the Li/air cell of FIG. 31.
Figure 33:
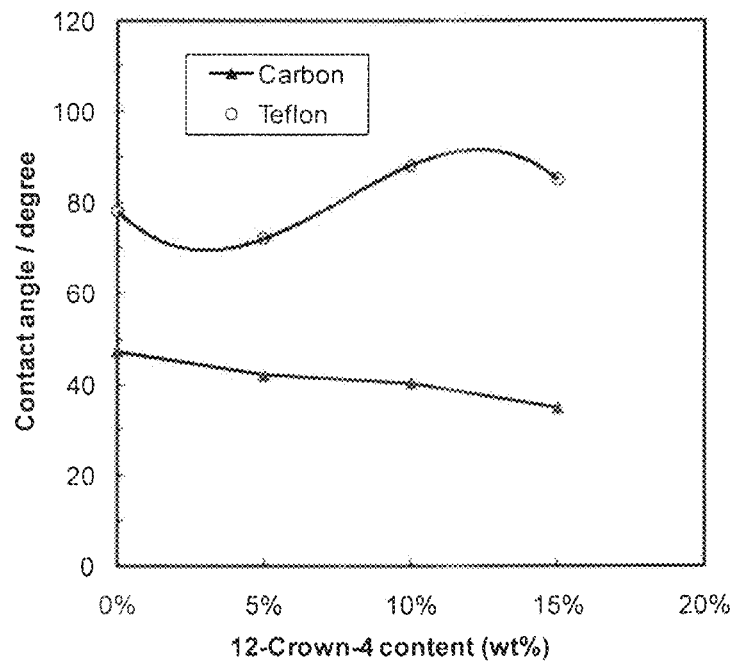
FIG. 33 is a graph of contact angle versus concentration for the Li/air cell of FIG. 31.

FIG. 31 shows the discharge capacity and specific energy of Li/air coin type cells with electrolytes containing different amounts of 12-crown-4. It is seen from FIG. 31 that a small amount of 12-crown-4 in electrolyte lowers the capacity and specific energy. The minimum performance was at 4%-5% content of the crown ether in electrolyte. Further increases in 12-crown-4 content led to higher capacity and specific energy. Addition of 15% 12-crown-4 in electrolyte led to a 30% increase in specific capacity as compared with control samples. The control electrolyte was 1.0 M LiTFSI in PC/EC (1:1 wt). FIG. 32 shows the conductivity, dissolved oxygen and viscosity of electrolytes containing different amounts of 12-crown-4 at 25° C. Increasing the amount of 12-crown-4 in the electrolyte led to a decrease in the dissolved oxygen content and viscosity of the electrolyte, but the ionic conductivity showed a maximum value at a concentration of 10% 12-crown-4. FIG. 33 illustrates the contact angles of these electrolytes at the surface of carbon and PTFE sides of the EFC air electrode at room temperature. The contact angle of the electrolyte at the carbon surface of the air electrode decreased steadily with increasing 12-crown-4 amount. The decreasing contact angle was probably due to the decrease of the electrolyte polarity with increasing 12-crown-4 because the crown ether is a low polarity organic compound. The decreased polarity is closer to that of the carbon material in the air electrode, meaning that the electrolyte would have a better wetting ability on the carbon electrode so the contact angle decreases. In contrast, however, the contact angle of the electrolyte at the PTFE (TEFLON®) surface demonstrated a lying down, S-type variation, i.e., decreasing-increasing-decreasing. Although the reason for the S-type variation of the electrolyte contact angle with the PTFE is not clear, the higher contact angle indicates poorer wetting ability of the electrolyte to the porous PTFE membrane. Thus, more pores in the PTFE membrane remain open for oxygen to pass through, resulting in a higher discharge performance.

Figure 34:
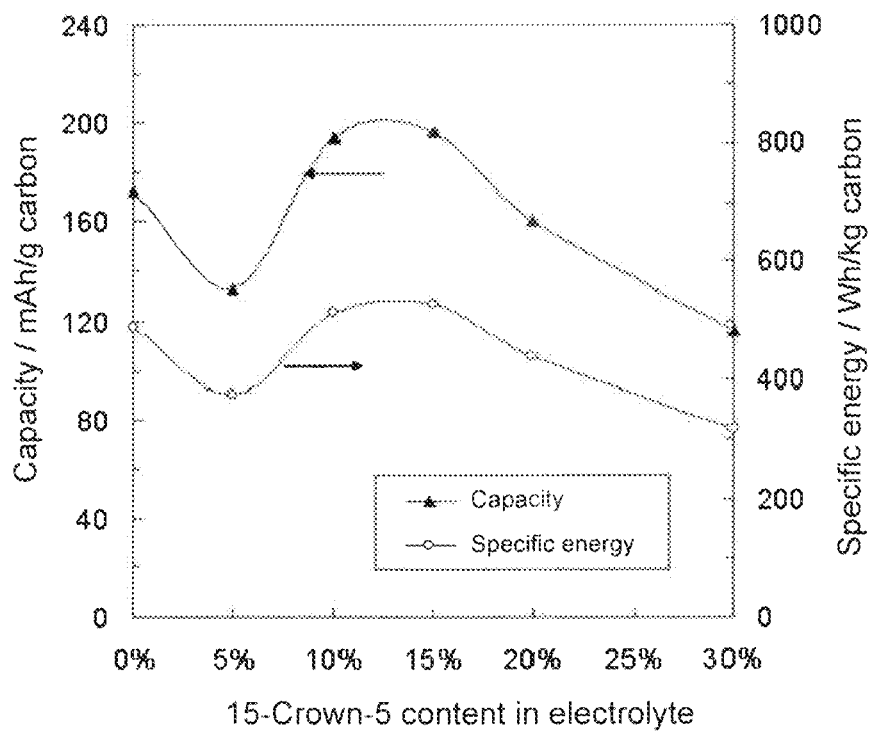
FIG. 34 is a graph of discharge capacity and specific energy versus concentration for one embodiment of a Li/air cell with an electrolyte including 15-crown-5.
Figure 35:
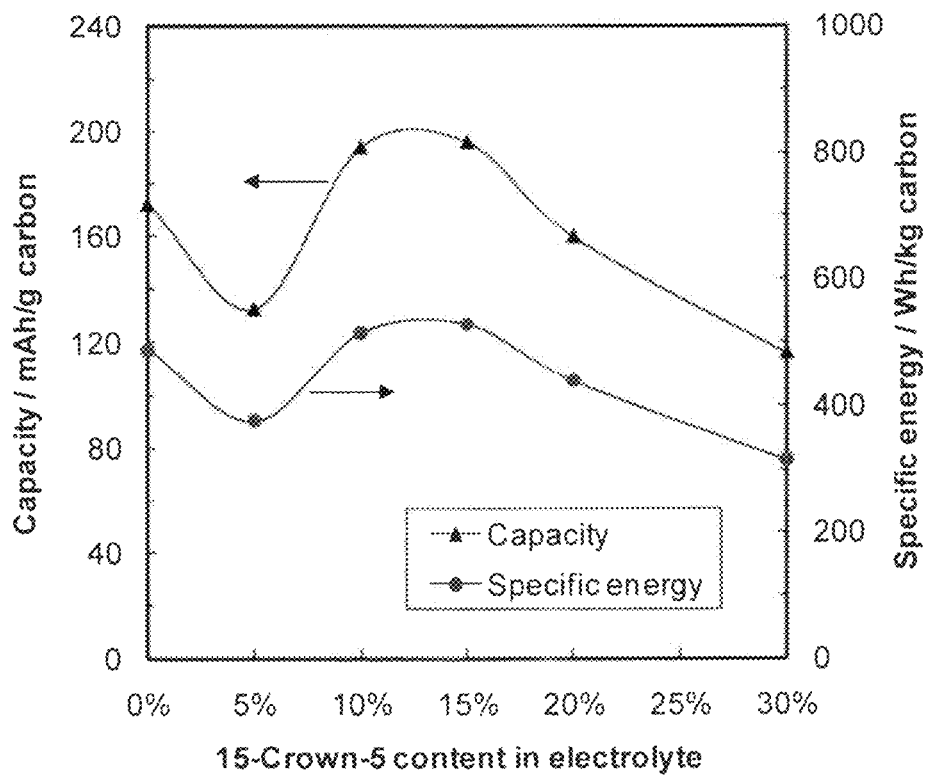
FIG. 35 is a graph of conductivity, dissolved oxygen, and viscosity versus concentration for the Li/air cell of FIG. 34.
Figure 36:
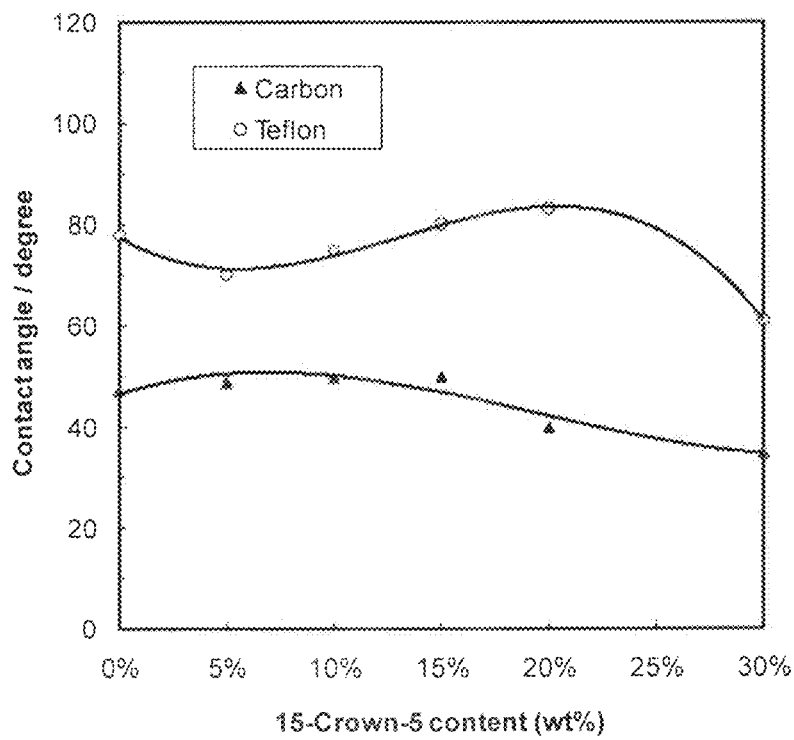
FIG. 36 is a graph of contact angle versus concentration for the Li/air cell of FIG. 34.

FIG. 34 shows the discharge capacity and specific energy of Li/air coin type cells with electrolytes containing different amounts of 15-crown-5. Similar to the 12-crown-4, low concentrations (4-5%) of 15-crown-5 in the electrolyte lowered the capacity and specific energy, but increasing 15-crown-5 content led to increased capacity and specific energy of Li/air batteries. A maximum discharge performance was located at a concentration of 12% 15-crown-5, which was just slightly higher than the capacity and specific energy of the control electrolyte. However, at even higher concentrations of 15-crown-5, both capacity and specific energy decreased rapidly, and the discharge performance was worse than the control. FIG. 35 shows the conductivity, dissolved oxygen and viscosity of electrolytes containing different amounts of 15-crown-5 at 25° C. With increasing concentrations of 15-crown-5, the dissolved oxygen content of the electrolyte dropped quickly and then stabilized. The viscosity initially decreased, but increased again after reaching a minimum at around 14% of 15-crown-5. The ionic conductivity first increased and then decreased, reaching a flat maximum value at concentrations from 10% to 15% of 15-crown-5. FIG. 36 illustrates the contact angles of these electrolytes at the surface of the carbon and PTFE sides of the EFC air electrode at room temperature. The contact angle variation of the electrolytes at the carbon surface of the air electrode with increasing 15-crown-5 content was different from that at the PTFE surface of the air electrode. The contact angle at the carbon surface of the air electrode initially increased slightly, but then decreased with increasing 15-crown-5 concentrations greater than 15%. However, the contact angle at the PTFE surface showed a lying down, S-type variation, i.e., decreasing-increasing-decreasing, which was very similar to that of 12-crown-4.

Example 14

Effect of Stack Loading

The effect of coin cell construction was evaluated in 2325-type coin cells with single-sided, 1.0 mm thick KETJENBLACK® carbon air electrodes. The air electrode was punched into discs with a diameter of ⅝" (or 15.88 mm) and an electrode area of 1.98 cm². The disc air electrodes were cleaned, connected on the coin cell pans via spot welding and dried under vacuum at 80° C. overnight before use. One layer of glass microfiber filter paper (Whatman® GF/D) with a diameter of ¾" was used as the separator. The electrolyte (1.0 M LiTFSI in PC/EC (1:1 wt), 200 µl) was added onto the separator. A Li metal disc with a thickness of 0.5 mm and diameter of ⅝" (15.88 mm) was used as the anode. Some cells included a thick stainless steel spacer (0.034" (or 0.86 mm)) to increase the stack loading (inner pressure) of the cells. In other cells, no stainless steel spacer was used but the electrode contact was still good. The cells were crimped inside a dry box filled with purified argon, rested overnight for electrolyte soaking, and then tested at room temperature in dry air conditions inside a glove box where the humidity was less than 1% RH. The cells were discharged to 2.0 V vs. Li$^+$/Li at a current rate of 0.05 mA/cm².

Figure 37:
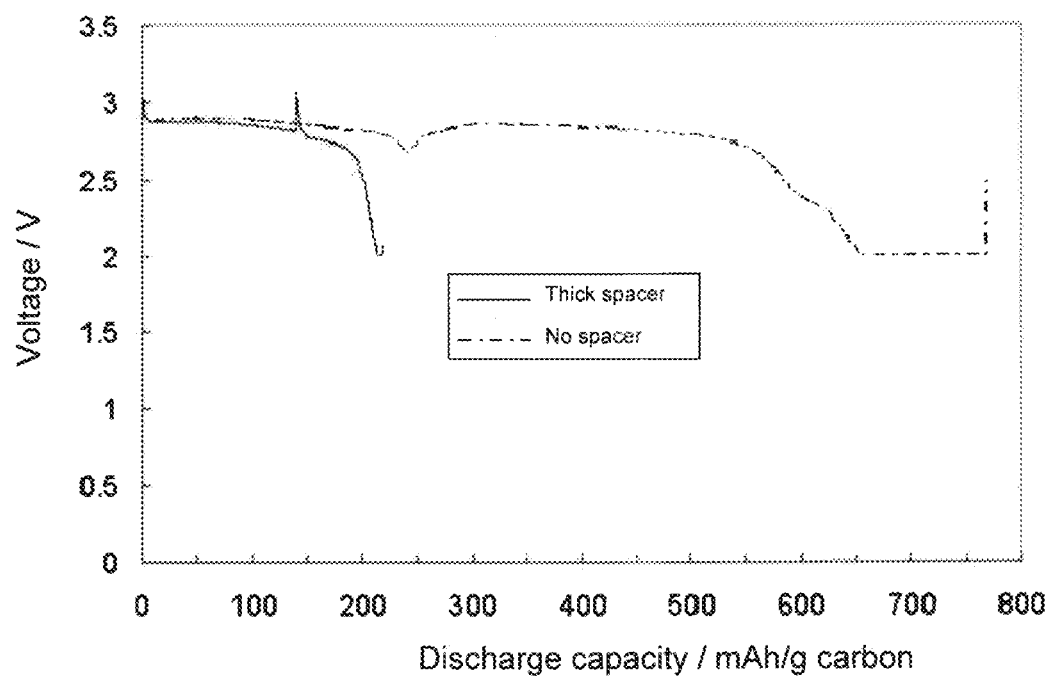
FIG. 37 is a graph of voltage versus discharge capacity for Li/air cells with and without a stainless steel spacer to increase the stack loading.

FIG. 37 shows the discharge performance of Li/air coin cells with different stack loadings or inner pressures. As shown in FIG. 37, Li/air cells with the thick spacer to increase the stack loading had much lower capacity than cells without spacer, meaning the cell construction also has some effect on the cell discharge performance. Without being bound by any particular theory of operation, it is believed that the added pressure from the thick spacer reduced the amount of electrolyte contained in the air electrode, thus reducing the capacity. The effect of electrolyte amount was further investigated in Example 15.

Example 15

Effect of Electrolyte Amount

The effect of electrolyte amount was evaluated in 2325-type coin cells with single-sided, 1.0 mm thick KETJENBLACK® carbon air electrodes. The air electrode was punched into discs with a diameter of ⅝" (or 15.88 mm) and an electrode area of 1.98 cm². The disc air electrodes were cleaned, connected on the coin cell pans via spot welding and dried under vacuum at 80° C. overnight before use. One layer of glass microfiber filter paper (Whatman® GF/D) with a diameter of ¾" was used as the separator. The desired volume, 100 µl or 150 µl, of electrolyte (1.0 M LiTFSI in PC/EC (1:1 wt)) was added onto the separator. A Li metal disc with a thickness of 0.5 mm and diameter of ⅝" (15.88 mm) was used as the anode. No spacer or spring was used. The cells were crimped inside a dry box filled with purified argon, rested overnight for electrolyte soaking, and then tested at room temperature in dry air conditions inside a glove box where the humidity was less than 1% RH. The cells were discharged to 2.0 V vs. Li$^+$/Li at a current rate of 0.05 mA/cm².

Figure 38:
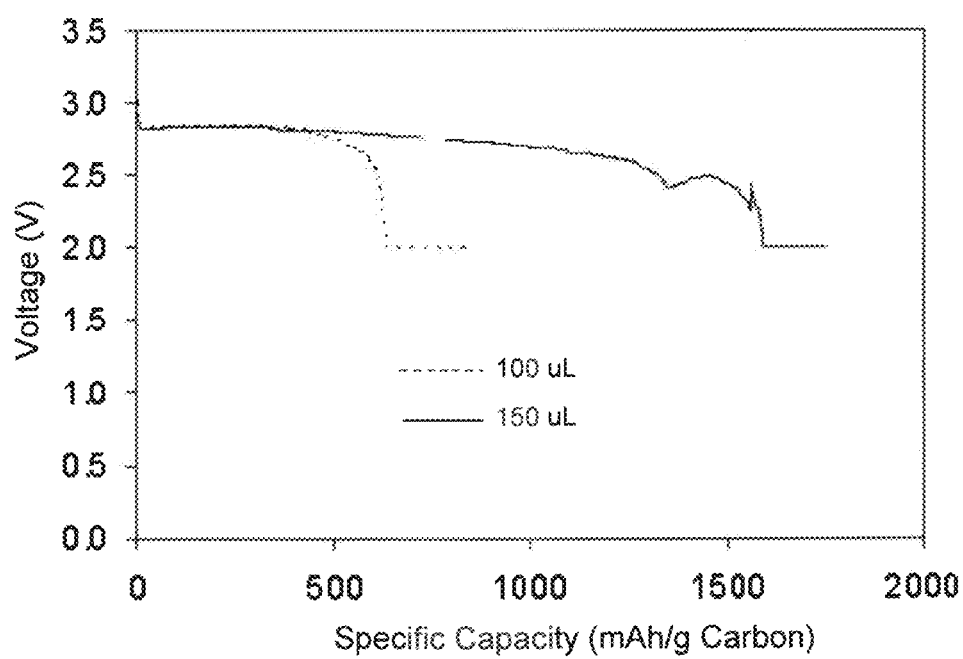
FIG. 38 is a graph of voltage versus specific capacity for Li/air cells with varying amounts of electrolyte.

FIG. 38 compares the discharge curves of two comparable cells with different electrolyte amounts (the spike in the figure comes from a power outage). The cell comprising 100 µl electrolyte had a capacity of 900 mAh/g carbon. When 150 µl electrolyte was used in the coin cell, the capacity dramatically increased to 1,756 mAh/g carbon with a specific energy of 4,614 Wh/kg carbon. The carbon loadings of both air electrodes were the same at 15 mg/cm² with similar thickness. Thus, the difference in specific capacity can be attributed to the fact that the KB carbon-based air electrode was not fully utilized when the electrolyte amount was insufficient to wet all the pores in the structure. It may be possible to obtain even more capacity if more electrolyte was added to the coin cell. However, for the coin cells, 150 µl is the maximum amount of electrolyte that can be added in without leakage through the holes on the negative shells which were designed for the flow of oxygen.

Figure 39:
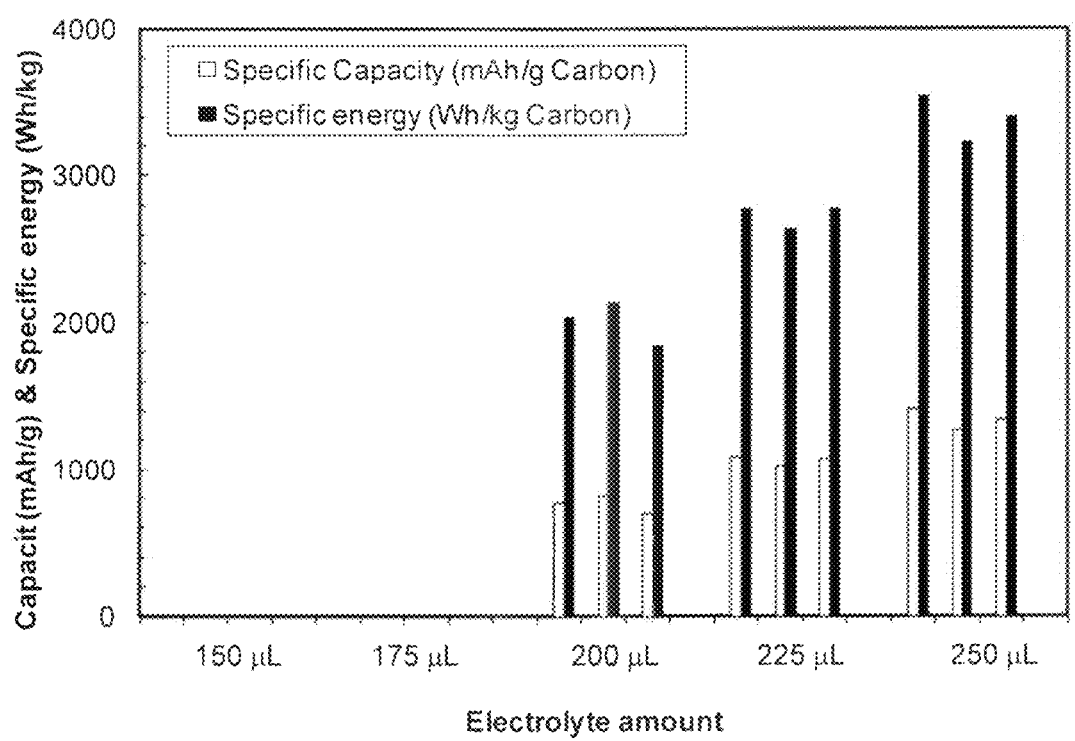
FIG. 39 is a bar graph of capacity and specific energy for Li/air cells with varying amounts of electrolyte.

FIG. 39 shows the discharge performance of Li/air coin cells with 1.0 mm thick KETJENBLACK® carbon air electrodes and different electrolyte amounts, where the cells were constructed only with the air electrode, glass fiber GF/D as separator, lithium disc and electrolyte, but without spacer or spring, thus allowing increased amounts of electrolyte to be added. The carbon loading of the air electrodes was 25 mg/cm². As seen in FIG. 39, the electrolyte amount had a significant effect on the cell discharge performance. It was found that when electrolyte was added at 150 µL or 175 µL, the cells' voltage dropped to 2 V (i.e., the set cut-off voltage) once the discharge process started and could not be further discharged. When the electrolyte amount was more than 200 µL, the cells could be discharged. As the electrolyte amount was increased from 200 µL to 250 µL, the discharge capacity and specific energy of the cells increased significantly from 750 mAh/g and 2,000 Wh/kg to 1,300 mAh/g and 3,400 Wh/kg.

Example 16

Carbon-Based Air Electrode Preparation

Carbon Preparation:
The carbon mix used to make the air electrodes was prepared as described below. In some cases, the carbon was coated with catalyst (~2.5% QSI™-nano Manganese (nMnO$_x$) in the dried film, from Quantum Sphere Inc., Santa Ana, Calif.) and mixed with Teflon binder (~8% Teflon® 30b in the dried film, DuPont) before feeding into a calender machine.

Approximately 50 g KETJENBLACK® EC-600JD (KB) was mixed with about 600 ml distilled water and allowed to soak for about 15 minutes. The slurry was then mechanically mixed for 30 min-1 h. About 1.3 g Nano-MnO$_x$ powder was added to the beaker with 20 mL distilled water, and the beaker was placed into a water-containing ultrasonic bath for 20 minutes. The catalyst dispersion was dropped into the above solution slowly during the mixing process. About 15 g PTFE (TE-3859, Dupont Fluoropolymer dispersion, 60% solids) was added into the mixture and stirred for another 1 h. The mechanical mixing process was controlled to mix thoroughly such that most particles were coated with PTFE. Because the viscosity of the slurry will change during mixing, both stirring speed and slurry concentration (by adding water) can be adjusted during operation.

The mixture was then filtered and dried in oven at 95° C. overnight. The weight ratio of KB and PTFE after drying was 85:15. The dried carbon mixture was conditioned through a screen colander before being fed into the roller of the calender machine. The dried mixture was laminated into a carbon film using a roller with adjustable pressure from 0-100 psi.

In some embodiments, to improve the homogeneity of the catalyst distribution, the KB powder was poured directly into a KMnO$_4$ (3% (w/w)) solution. The purple color of the solution disappeared quickly, suggesting the reduction of the MnO$_4^-$ ions. The subsequent steps were the same as described above.

Screen Preparation:

Nickel mesh was sprayed with conductive paint (Acheson EB-020A) and air dried. It was then cured at 150° C. for about 5 min.

Electrode Preparation:

The nickel mesh cathode current collector was embedded into the carbon layer. To minimize moisture penetration, a porous PTFE film (3 □m thick, W. L. Gore & Associates, Inc., Elkton, Md.) was laminated on one side of the air electrode exposed to air in the test.

Electrolyte Preparation:

The electrolyte was prepared by dissolving lithium bis (trifluoromethane-sulfonyl)imide (LiTFSI, battery grade, Ferro) in ethylene carbonate (EC)/propylene carbonate (PC) (1:1 weight ratio) to produce a 1 M solution.

Figure 40:
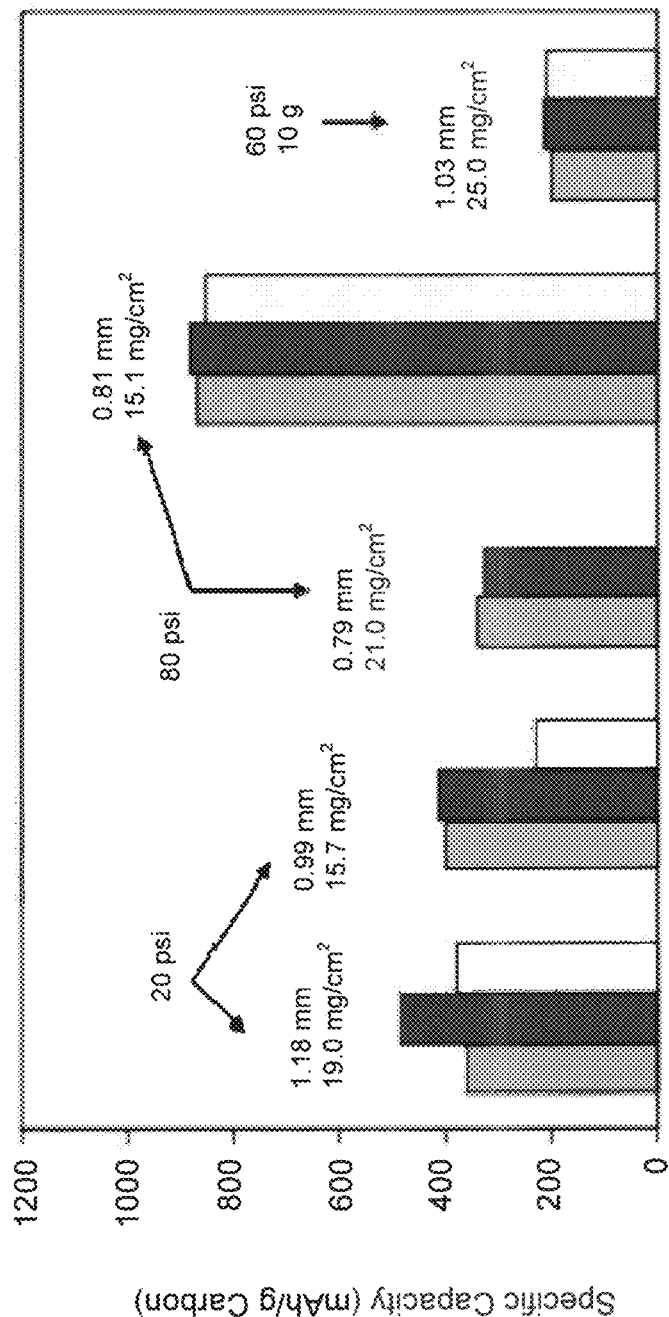
FIG. 40 is a bar graph of specific capacity for carbon-based air electrodes with different thicknesses and carbon loadings.

Results:

The operating parameters of the pressure-controlled roller to prepare KETJENBLACK®-based air electrode are compared in Table 11. No catalyst was added during the preparation of dry fluid mixtures. The higher weight of the starting dry mixture resulted in the higher final loading on the carbon sheet, but higher pressure only leads to a small increase in the carbon loading. We also noticed that air electrode density (0.15 to 0.24 g/cm$^3$) made by KB was smaller than those made by other type of carbons. The air electrodes listed in Table 11 had been tested to screen the optimum parameters. Their capacities are plotted in FIG. 40. When a pressure of 20 psi was used to prepare the carbon sheet, 5 grams of the mixture had a loading of ~19.0 mg/cm$^2$ while 2 gram of the mixtures had a loading of 15.7 mg/cm$^2$. Both of them were relatively thick electrodes among the electrodes listed in Table 11. For these two electrodes, the fluctuation of the capacities among parallel tests was larger than that of other electrodes due to their relatively low densities and higher thickness. The pore volume could not be fully utilized in these electrodes. This phenomenon was also observed in a 1.03-mm thick electrode pressed by applying 60 psi on 10 grams of the mixtures. When 80 psi pressure was used, an electrode with a loading of 21.0 mg/cm$^2$ delivered about 330 mAh/g capacity, while an electrode with a loading of 15.1 mg/cm$^2$ reached more than 850 mAh/g. Even though the thicknesses were similar, the 21.0 mg/cm$^2$ electrode was more compacted than the electrode with 15.1 mg/cm$^2$ loading. As a result, the diffusion path and rate of the oxygen diffusion in the porous electrode was reduced, leading to a decreased capacity.

TABLE 11

Parameters for Air Electrode Preparation

| Mass of mixture (g) | Pressure (psi) | Roller Speed (cm/min) | Thickness of Carbon Sheet (mm) | Carbon Loading (mg/cm$^2$) | Carbon Density (mg/cm$^3$) |
|---|---|---|---|---|---|
| 2 | 20 | 110 | 0.99 | 15.7 | 158.6 |
| 2 | 80 | 110 | 0.81 | 15.1 | 186.4 |
| 5 | 20 | 110 | 1.18 | 19.0 | 161.0 |
| 5 | 40 | 110 | 1.01 | 19.5 | 193.1 |
| 5 | 60 | 110 | 0.98 | 20.0 | 204.1 |
| 5 | 80 | 110 | 0.79 | 21.0 | 265.8 |
| 10 | 60 | 105 | 1.03 | 25.0 | 242.7 |

Figure 41:
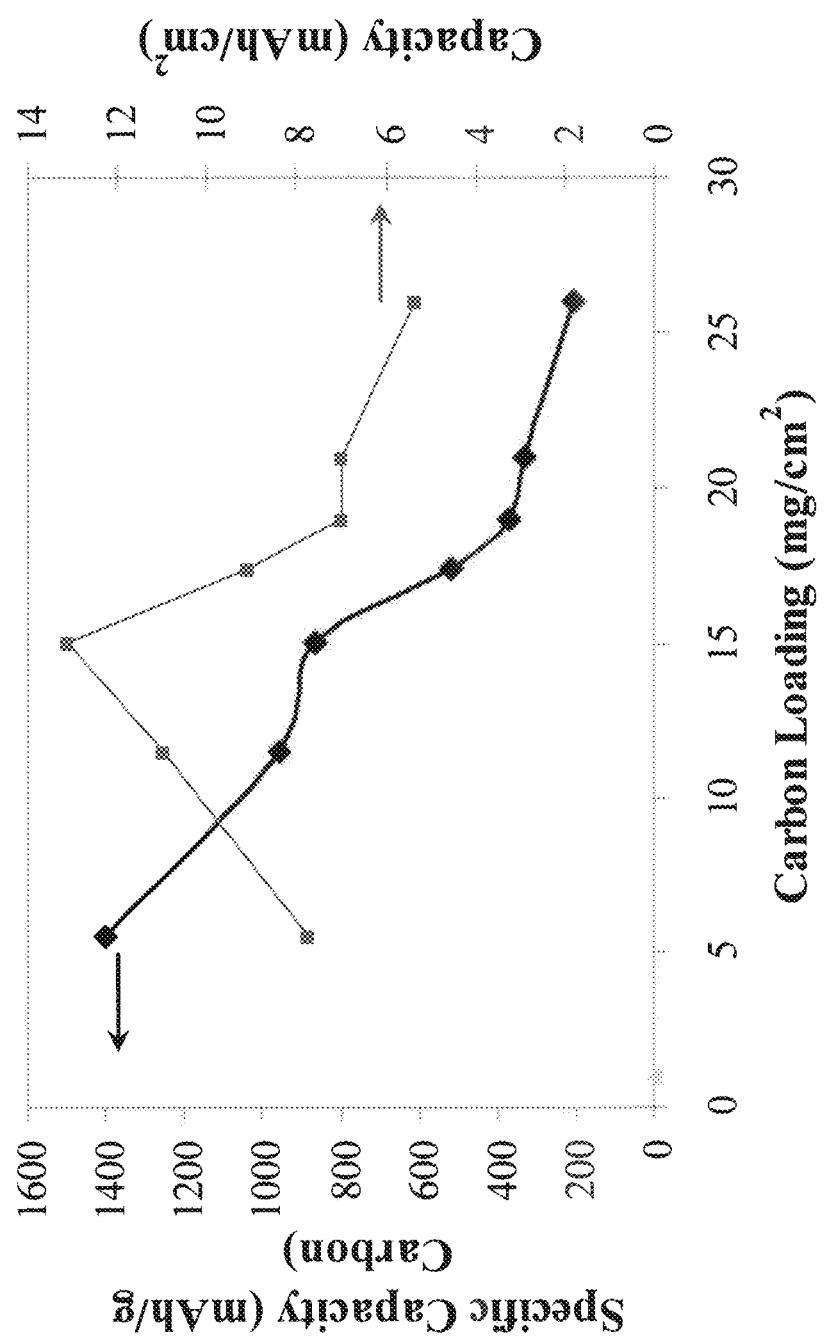
FIG. 41 is a graph illustrating the relationships between carbon loading, specific capacity, and area-specific capacity for carbon-based air electrodes.

FIG. 41 illustrates the relationships between carbon loading, specific capacity and area-specific capacity. Interestingly, the area specific capacity does not have a linear relationship with the carbon loading. Instead, a maximum area specific capacity of 13.1 mAh/cm$^2$ was found at a carbon loading of 15.1 mg/cm$^2$. Further increasing or decreasing the carbon loading reduced the area-specific capacity. The capacity data in FIG. 41 is higher than other literature-reported values for similar carbon loadings. There were two reasons for the improvement. First, the electrolyte was stable in air, providing good oxygen solubility and appropriate viscosity, which were important for the oxygen to transfer. Second, the binder used in the air electrode was PTFE instead of PVDF; PTFE is more hydrophobic than the PVDF, thus providing more air-flow channels in the electrode.

Example 17

Double-Sided Pouch Cell with Glass Fiber Separator and 1.0 M LiTFSI in PC/EC (1:1 wt)+20 wt % DME Double-sided pouch cells with two KETJENBLACK® EC-600JD (KB) carbon-based air electrodes were prepared. An air electrode film comprising KB 85% and PTFE 15% by wt (4.0 cm×4.0 cm) was laminated with a Ni mesh (coated with electroconductive paint) having a tab extending from the mesh. The thickness of the air electrode with the Ni mesh was 0.8 mm. The air electrode had a carbon loading rate of 14.9 mg/cm$^2$. Two electrodes were prepared. The separator was glass fiber filter paper GF/C from Aldrich, 4.0 cm×4.0 cm, 2 pieces. The anode was 3.8 cm×3.8 cm×0.5 mm thick Li metal pressed onto a copper mesh current collector. The electrolyte was 1.0 M LiTFSI in PC/EC (1:1 wt)+20 wt % DME.

The two air electrodes were welded together at the tabs by spot welding (with the Ni mesh facing outside), dried in a vacuum oven at about 62° C. overnight, and then transferred into the dry box filled with purified argon. The Li/Cu mesh electrode was placed in between two pieces of glass fiber filter paper, and then the whole construct was carefully placed between the connected two air electrodes. The four edges of this dry cell pack were sealed with heat sealable tape, during which the dry cell was tightly pressed with two pieces of stainless steel plates by clips. The 4-edge sealed dry cell weighed 2.421 g.

The dry cell was put into a Petri dish. About 2.9 g electrolyte—ELY-090 (1.0 M LiTFSI in PC/EC (1:1 wt)+20% DME)—was dropwise added and evenly distributed onto the upper side of the dry cell. During the absorption of electrolyte, the Petri dish was covered with a larger Petri dish. When no free electrolyte was observed at the upper face of the dry cell, the cell was turned, allowing the other side to face up. Another 2.9 g ELY-090 was added dropwise and evenly distributed onto the new face of the cell, and the Petri dish was again covered during electrolyte absorption. When all of the electrolyte was absorbed, the cell was weighed again, and it was found that the total electrolyte weight absorbed by the cell was 5.758 g.

The cell absorbed with electrolyte was quickly but carefully sealed into a package of MELINEX® H301-80G. After sealing and cutting the extra MELINEX® membrane, the final cell was weighed and the total weight was 8.387 g. The open-circuit voltage (OCV) was tested as 3.084 V, and the cell resistance was less than 0.1 ohm. The cell was then taken out of the dry box and tested in open air where the humidity was about 20% RH. The discharge conditions were 0.05 mA/cm$^2$ to 2.0 V, then at 2.0 V till the current reached 0.01 mA/cm$^2$.

Figure 42:
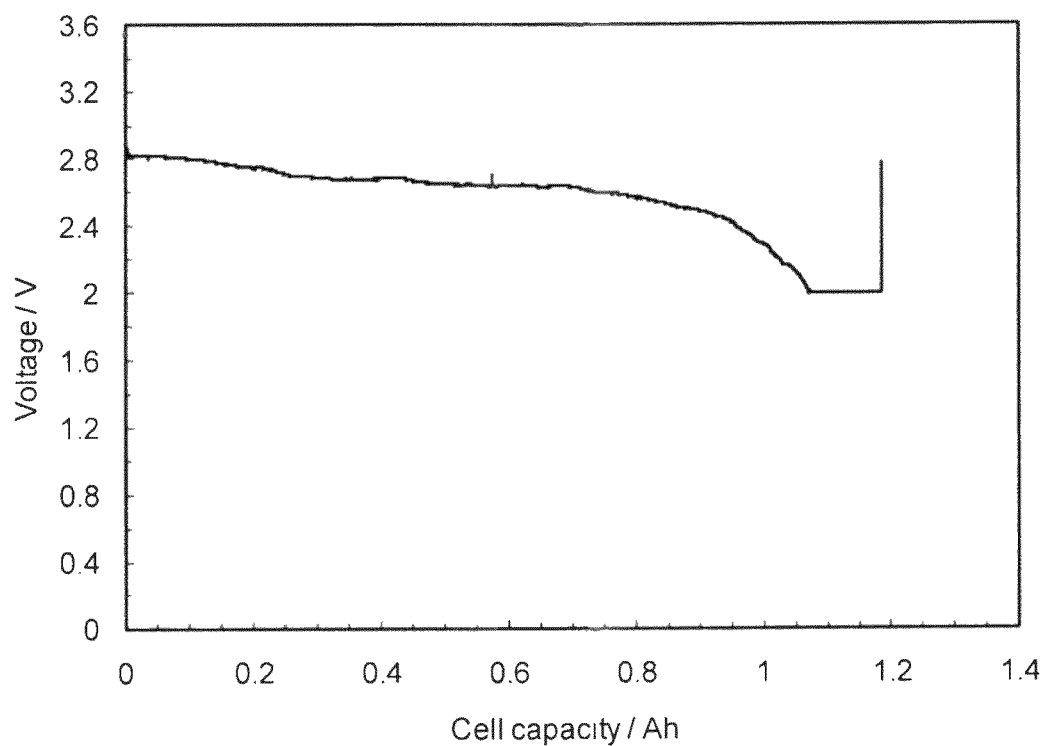
FIG. 42 is a graph of voltage versus cell capacity for one embodiment of a Li/air cell.
Figure 43:
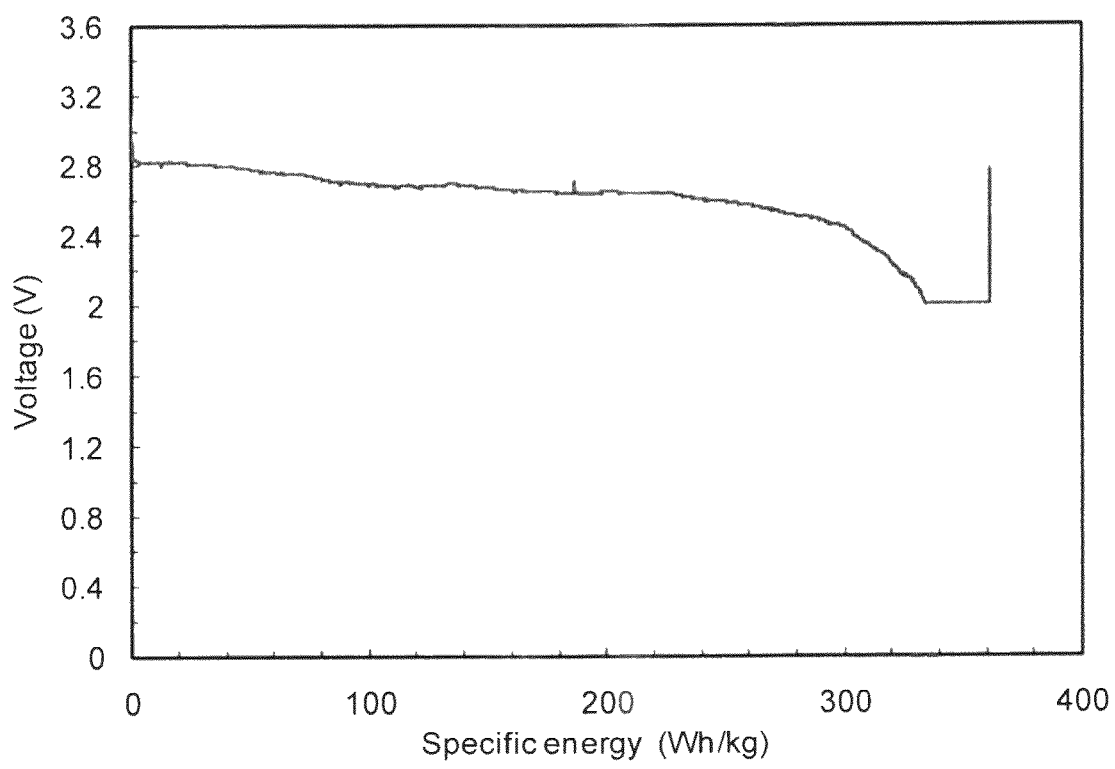
FIG. 43 is a graph of voltage versus specific energy for the Li/air cell of FIG. 42.

The cell capacity was 1185.4 mAh, and the specific energy of the complete cell (including the package) was 361.6 Wh/kg. The discharge profiles are shown in FIGS. 42-43.

In a disclosed embodiment, a metal/air battery comprises an anode having a first surface and a second surface, an anode current collector, a first air electrode, a cathode current collector, a first separator disposed between the first surface of the anode and the air electrode, an electrolyte, and an oxygen-permeable membrane completely encasing the battery. The oxygen-permeable membrane further comprises a first layer comprising biaxially-oriented polyethylene terephthalate, and a second layer adjacent the first layer comprising a terephthalate/isophthalate copolyester of ethylene glycol, wherein the second layer is a thermal bonding layer. In some embodiments, the oxygen-permeable membrane has a thickness of 5 to 200 µm. The oxygen-permeable membrane may further comprise a polymeric perfluoro compound. The polymeric perfluoro compound may be poly(perfluoropropylene oxide co-perfluoroformaldehyde). In some embodiments, the oxygen-permeable membrane has a mass that is less than 10% of a total mass of the metal/air battery.

In some embodiments, the electrolyte comprises a lithium salt and at least one solvent. The electrolyte may include lithium hexafluorophosphate, lithium bis(trifluoromethanesulfonyl)imide, lithium perchlorate, lithium bromide, lithium trifluoromethanesulfonate, or mixtures thereof. The electrolyte also may include ethylene carbonate, propylene carbonate, dimethyl ether, or combinations thereof. In one embodiment, the electrolyte comprises 1 M lithium bis(trifluormethane sulfone imide) in propylene carbonate/ethylene carbonate (1:1 by weight). The electrolyte may comprise a lithium salt, at least one solvent, and a crown ether. The crown ether is present in the electrolyte at a concentration of up to 30% by weight, or at a concentration of 10-20% by weight. In some embodiments, the electrolyte comprises aqueous potassium hydroxide. The aqueous potassium hydroxide has a concentration of 1 M to 7 M.

In a disclosed embodiment, the first air electrode comprises carbon powder, and an ion insertion material in the carbon powder. The mass ratio of the ion insertion material to the carbon powder ranges from 0.1 to 2. The ion insertion material has a discharge voltage between 1.0 V and 3.5 V. The ion insertion material is a lithium insertion compound. The ion insertion material comprises $CF_x$ (0.5<x<2), $Cu_4O(PO_4)_2$, $AgV_2O_{5.5}$, $Ag_2CrO_4$, $V_2O_5$, $V_8O_{13}$, $V_3O_8$, $VO_2$, $VO_x$ (0.1<x<3), $Cr_2O_5$, $Cr_3O_8$, $MnO_2$, $MnO_x$ (1<x<3), Mn-based oxide polymer, quinone polymer, $MoO_3$, $MoO_x$ (1<x<3), $TiO_2$, $TiO_x$ (1<x<3), $Li_4Ti_5O_{12}$, S, $Li_xS$ (0<x<2), $TiS_2$, or mixtures thereof. In some embodiments, the ion insertion material is $CF_x$ (0.5<n<2), $V_2O_5$, S, $Li_xS$ (0<x<2), or $MnO_2$. The carbon powder has a pore volume of 0.5 to 10 cm$^3$/g, preferably 4.80-5.10 cm$^3$/g. In another embodiment, the first air electrode further includes a binder and has a composition of 55% carbon powder, 15% binder, and 30% ion insertion material by weight. In one embodiment, the ion insertion material is $CF_x$. The first air electrode further may comprise polytetrafluoroethylene. The cathode current collector is disposed between two layers of the first air electrode. In some embodiments, the metal/air battery further includes a second air electrode.

In a disclosed embodiment, the first separator comprises a heat-sealable, porous material, and the first separator is sealed between the anode and the first air electrode. The first separator may comprise a porous polypropylene membrane, a porous polyethylene membrane, porous multilayer polypropylene and polyethylene membrane, or a porous monolayer polypropylene membrane laminated to a polypropylene nonwoven fabric.

In a disclosed embodiment, the anode is lithium, and the battery is operable in ambient air for at least 5 days In a disclosed embodiment, a lithium/air battery comprises an anode current collector, a lithium metal anode having a first surface and a second surface, wherein the first surface of the lithium metal anode is in electrical contact with the anode current collector, a separator having a first surface and a second surface, wherein the first surface of the separator is in physical contact with the second surface of the lithium anode, an ion insertion material layer having a first surface and a second surface, wherein the first surface of the ion insertion material layer is in physical contact with the second surface of the separator, a cathode current collector having a first surface and a second surface, wherein the first surface of the cathode current collector is in electrical contact with the second surface of the ion insertion material layer, a carbon-based air electrode having a first surface and a second surface, wherein the first surface of the carbon-based air electrode is in electrical contact with the second surface of the cathode current collector, and a gas distribution membrane having a first surface and a second surface, wherein the first surface of the gas distribution membrane is in physical contact with the second surface of the carbon-based air electrode.

In a disclosed embodiment, the carbon-based air electrode comprises carbon powder, and a plurality of porous, hydrophobic fibers dispersed within the carbon powder. The carbon powder has a pore volume of 0.5 to 10 cm$^3$/g, preferably 4.80-5.10 cm$^3$/g. The porous, hydrophobic fibers are polyester fibers with one more holes in the core, goose down, polytetrafluoroethylene fibers, woven hollow fiber cloth, or combinations thereof.

In a disclosed embodiment, the ion insertion material is $CF_x$ (0.5<x<2), $Cu_4O(PO_4)_2$, $AgV_2O_{5.5}$, $Ag_2CrO_4$, $V_2O_5$, $V_6O_{13}$, $V_3O_5$, $VO_2$, $VO_x$ (0.1<x<3), $Cr_2O_5$, $Cr_3O_8$, $MnO_2$, $MnO_x$ (1<x<3), Mn-based oxide polymer, quinone polymer, $MoO_3$, $MoO_x$ (1<x<3), $TiO_2$, $TiO_x$ (1<x<3), $Li_4Ti_5O_{12}$, S, $Li_xS$ (0<x<2), $TiS_2$, or mixtures thereof. The mass ratio of the ion insertion material to carbon in the carbon-based air electrode ranges from 0.1 to 2, or from 0.2 to 0.8.

In a disclosed embodiment, the gas distribution membrane is hydrophobic. The gas distribution membrane may have an oxygen:water vapor permeation ratio greater than 3:1. A gas diffusion barrier may be deposited on the second surface of the gas distribution membrane. The gas diffusion barrier has a thickness from 5 μm to 200 μm. In one embodiment, the gas distribution membrane is polytetrafluoroethylene.

In a disclosed embodiment, an air electrode comprises carbon powder, wherein the carbon powder has a pore volume of 4.80-5.10 cm$^3$/g, a current collector in electrical contact with the carbon powder, and an ion insertion material, wherein the mass ratio of the ion insertion material to carbon powder is 0.1 to 2. The mass ratio of the ion insertion material to carbon powder may range from 0.2 to 0.8. The ion insertion material is $CF_x$ (0.5<x<2), $Cu_4O(PO_4)_2$, $AgV_2O_{5.5}$, $Ag_2CrO_4$, $V_2O_5$, $V_6O_{13}$, $V_3O_8$, $VO_2$, $VO_x$ (0.1<x<3), $Cr_2O_5$, $Cr_3O_8$, $MnO_2$, $MnO_x$ (1<x<3), Mn-based oxide polymer, quinone polymer, $MoO_3$, $MoO_x$ (1<x<3), $TiO_2$, $TiO_x$ (1<x<3), $Li_4Ti_5O_{12}$, S, $Li_xS$ (0<x<2), $TiS_2$, or mixtures thereof. The ion insertion material and carbon powder may comprise a mixture adhered directly to the current collector. In another embodiment, the carbon powder forms a layer adhered to a first surface of the current collector and the ion insertion material forms a layer adhered to a second surface of the current collector.

A disclosed method of preparing an air electrode comprises preparing a first film, the first film comprising carbon powder and a binder, adhering the first film to a first side of a current collector to form a dry air electrode, soaking the dry air electrode in an electrolyte solution to form a soaked air electrode, wherein the electrolyte solution comprises dimethyl ether and a second solvent selected from ethylene carbonate, propylene carbonate, and mixtures thereof, and applying a vacuum to the soaked air electrode, wherein dimethyl ether is evacuated from the soaked air electrode. The electrolyte solution further comprises lithium hexafluorophosphate, lithium bis(trifluoromethanesulfonyl)imide, lithium perchlorate, lithium bromide, lithium trifluoromethanesulfonate, or mixtures thereof. The electrolyte solution comprises 1-50% (w/w) dimethyl ether before applying the vacuum. The electrolyte solution comprises less than 3% (w/w) dimethyl ether after dimethyl ether evacuation. The carbon powder has a pore volume of 4.80-5.10 cm$^3$/g.

In a disclosed embodiment, preparing the first film further comprises adding an ion insertion material having a discharge voltage between 1.0 V and 3.5 V vs. Li/Li$^+$. The ion insertion comprises one or more of the group $CF_x$ (0.5<x<2), $Cu_4O(PO_4)_2$, $AgV_2O_{5.5}$, $Ag_2CrO_4$, $V_2O_5$, $V_6O_{13}$, $V_3O_8$, $VO_2$, $VO_x$ (0.1<x<3), $Cr_2O_5$, $Cr_3O_8$, $MnO_2$, $MnO_x$ (1<x<3), Mn-based oxide polymer, quinone polymer, $MoO_3$, $MoO_x$ (1<x<3), $TiO_2$, $TiO_x$ (1<x<3), $Li_4Ti_5O_{12}$, S, $Li_xS$ (0<x<2), and $TiS_2$. In one embodiment, preparing the first film further comprises combining 55% carbon powder, 15% binder, and 30% of an ion insertion material by weight to form the first film. In one embodiment, preparing the first film further comprises adding $CF_x$ to the carbon powder and/or the binder to form the first film.

In a disclosed embodiment, the method further comprises preparing a second film, and adhering the second film to a second side of the current collector to form a double-sided air electrode. Preparing the second film comprises combining carbon powder and a binder. In one embodiment, the second film comprises an ion insertion material, and the first film does not include an ion insertion material.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:
1. A lithium/air battery, comprising:
an anode current collector;
a lithium metal anode having a first surface and a second surface, wherein the first surface of the lithium metal anode is in electrical contact with the anode current collector;
a separator having a first surface and a second surface, wherein the first surface of the separator is in physical contact with the second surface of the lithium anode;
an ion insertion material layer having a first surface and a second surface, wherein the first surface of the ion insertion material layer is in physical contact with the second surface of the separator;
a cathode current collector having a first surface and a second surface, wherein the first surface of the cathode current collector is in electrical contact with the second surface of the ion insertion material layer;
a carbon-based air electrode having a first surface and a second surface, wherein the first surface of the carbon-based air electrode is in electrical contact with the second surface of the cathode current collector; and
a gas diffusion membrane having a first surface and a second surface, wherein the first surface of the gas distribution membrane is in physical contact with the second surface of the carbon-based air electrode.

2. The hybrid lithium/air battery of claim 1 wherein the carbon-based air electrode comprises:
carbon powder; and
a plurality of porous, hydrophobic fibers dispersed within the carbon powder.

3. The hybrid lithium/air battery of claim 2 wherein the carbon powder has a pore volume of 0.5 to 10 cm$^3$/g.

4. The hybrid lithium/air battery of claim 2 wherein the porous, hydrophobic fibers are polyester fibers with one more holes in a core thereof, goose down, polytetrafluoroethylene fibers, woven hollow fiber cloth, or combinations thereof.

5. The hybrid lithium/air battery of claim 2 wherein the ion insertion material is $CF_x$ (0.5<x<2), $Cu_4O(PO_4)_2$, $AgV_2O_{5.5}$, $Ag_2CrO_4$, $V_2O_5$, $V_6O_{13}$, $V_3O_8$, $VO_2$, $VO_x$ (0.1<x<3), $Cr_2O_5$, $Cr_3O_6$, $MnO_2$, $MnO_x$ (1<x<3), Mn-based oxide polymer, quinone polymer, $MoO_3$, $MoO_x$ (1<x<3), $TiO_2$, $TiO_x$ (1<x<3), $Li_4Ti_5O_{12}$, S, $Li_xS$ (0<x<2), $TiS_2$, or mixtures thereof.

6. The hybrid lithium/air battery of claim 1 wherein the mass ratio of the ion insertion material to carbon in the carbon-based air electrode ranges from 0.1 to 2.

7. The hybrid lithium/air battery of claim 1 wherein the mass ratio of the ion insertion material to carbon in the carbon-based air electrode ranges from 0.2 to 0.8.

8. The hybrid lithium/air battery of claim 1 wherein the gas diffusion membrane has an oxygen:water vapor permeation ratio greater than 3:1.

9. The hybrid lithium/air battery of claim 1, wherein the gas diffusion membrane has a thickness from 5 μm to 200 μm.

10. The hybrid lithium/air battery of claim 1, further comprising a gas distribution membrane positioned between the second surface of the carbon-based air electrode and the first surface of the gas diffusion membrane.

11. The hybrid lithium/air battery of claim 10 wherein the gas distribution membrane is hydrophobic.

12. The hybrid lithium/air battery of claim 10 wherein the gas distribution membrane is polytetrafluoroethylene and the gas diffusion membrane is high density polyethylene or polyester.

* * * * *

UNITED STATES PATENT AND TRADEMARK OFFICE
CERTIFICATE OF CORRECTION

PATENT NO. : 8,765,278 B2
APPLICATION NO. : 13/910065
DATED : July 1, 2014
INVENTOR(S) : Ji-Guang Zhang et al.

Page 1 of 1

It is certified that error appears in the above-identified patent and that said Letters Patent is hereby corrected as shown below:

In the Claims:

Column 42, line 41, "with one more" should read --with one or more--.

Signed and Sealed this
First Day of March, 2016

Michelle K. Lee
*Director of the United States Patent and Trademark Office*